United States Patent
Fukui et al.

(10) Patent No.: US 7,019,227 B2
(45) Date of Patent: Mar. 28, 2006

(54) ENABLER OF TEACHING PENDANT

(75) Inventors: Takao Fukui, Osaka (JP); Kenji Miyauchi, Osaka (JP); Kazuya Okada, Osaka (JP); Yasushi Kamino, Osaka (JP); Ken Maeda, Osaka (JP); Yoshio Sekino, Osaka (JP); Masaki Nobuhiro, Osaka (JP)

(73) Assignee: Idec Izumi Corporation, Osaka (JP)

( * ) Notice: Subject to any disclaimer, the term of this patent is extended or adjusted under 35 U.S.C. 154(b) by 468 days.

(21) Appl. No.: 10/363,815

(22) PCT Filed: Aug. 22, 2001

(86) PCT No.: PCT/JP01/07192

§ 371 (c)(1),
(2), (4) Date: Mar. 6, 2003

(87) PCT Pub. No.: WO02/21552

PCT Pub. Date: Mar. 14, 2002

(65) Prior Publication Data

US 2003/0184164 A1   Oct. 2, 2003

(30) Foreign Application Priority Data

Sep. 6, 2000  (JP) ............................. 2000-270846

(51) Int. Cl.
*H01H 9/28* (2006.01)

(52) U.S. Cl. ............................. 200/43.17; 200/51 LM; 200/522

(58) Field of Classification Search ............ 200/43.17, 200/51 LM, 522
See application file for complete search history.

(56) References Cited

U.S. PATENT DOCUMENTS

| 6,160,324 | A | 12/2000 | Terada et al. |
| 6,180,898 | B1 | 1/2001 | Terada et al. |
| 6,627,830 | B1 * | 9/2003 | Fukui et al. ................. 200/434 |
| 6,911,609 | B1 * | 6/2005 | Miyauchi et al. ........ 200/43.17 |

FOREIGN PATENT DOCUMENTS

| EP | 0 927 611 | 7/1999 |
| EP | 0 960 697 | 12/1999 |
| JP | 10-291189 | 11/1998 |
| JP | 11-58289 | 3/1999 |
| JP | 11-077579 | 3/1999 |
| JP | 11-329136 | 11/1999 |
| WO | WO 98/47672 | 10/1998 |
| WO | WO 99/10138 | 3/1999 |

\* cited by examiner

*Primary Examiner*—Lincoln Donovan
(74) *Attorney, Agent, or Firm*—Jordan and Hamburg LLP

(57) ABSTRACT

In a case where a left-hand push-button switch is ON, a second relay RL2 is electrically de-energized to open a normally close contact RL2-1 of the second relay RL2 so that a relay contact circuit RC is opened. If, in this state, a right-hand push-button switch is shifted to a second OFF state, a normally close contact R3-1 of the right-hand push-button switch is opened. Thus, a third relay RL3 is not electrically de-energized and a first and a second circuits are in cutoff until both the right-hand and the left-hand push-button switches are returned to a first OFF state.

17 Claims, 37 Drawing Sheets

ENABLER OF TEACHING PENDANT

TECHNICAL FIELD

The present invention relates to an enabler for teaching pendant which includes a push-button switch adapted to be shifted from a first OFF state to an ON state as operatively associated with increased push-button depression and then to a second OFF state as operatively associated with further increased push-button depression.

BACKGROUND ART

In cases where, for example, a manual operation is performed on numerically controlled machines such as robots, an operator often enters a dangerous area to carry out his job. In such cases, a pendant with a push-button switch, such as called an enable switch (or deadman switch), is used for obviating an accident associated with contact with any one of operating machines during the execution of his job.

As shown in FIG. 30, a teaching pendant 101 includes a pendant body 103, opposite end portions of which define grip portions 105a, 105b to be held by respective hands, and which has a centrally located liquid crystal display (hereinafter referred to as "LCD") 107. As viewing a screen of the LCD 107, the operator may properly manipulate, with his thumbs or the like, a plural number of operation keys 109a, 109b and other operation keys arranged along the opposite sides of the LCD 107, thereby teaching data, such as a program, to a robot or controlling the robot.

In this case, the teaching operation or the like to the robot is not enabled by merely manipulating the operation keys 109a, 109b. As shown in FIG. 31, an arrangement is made such that the robot is disabled for program teaching or control unless operation sections 111a, 111b of a push-button switch (not shown) disposed on back sides of the grip portions of the pendant body 103 are manipulated to shift the push-button switch to an ON state before the operation keys 109a, 109b are manipulated.

As shown in FIG. 32, a snap-action type push-button switch, for example, may be used as such a push-button switch disposed at the teaching pendant.

As shown in FIG. 32, the push-button switch 113 includes a switch case 115 having a rectangular shape in plan; a push button 117 depressibly supported by the switch case 115; a normally close contact 119, as an auxiliary contact, and a pair of c-contacts 121a, 121b disposed in the switch case 115; and a pair of switching mechanisms 123a, 123b disposed in the push button 117 and operatively associated with pressing-down on the push button 117 for switching the c-contacts 121a, 121b between an open position and a close position.

The normally close contact 119 includes a movable member 127 disposed within the switch case 115 as projecting toward the push button 117 (upward) and urged upward by a helical spring 125 disposed thereunder; a pair of movable terminals 129a, 129b attached to the movable member 127; and a pair of stationary terminals 131a, 131b adapted to be brought into or out of contact with the corresponding movable terminals 129a, 129b. In an initial state, the movable member 127 is urged upward by the helical spring 125, so that the normally close contact 119 is closed with the movable terminals 129a, 129b thereof contacting the stationary terminals 131a, 131b thereof.

The c-contacts 121a, 121b have a snap action configuration, individually including a movable terminal 133a, 133b; a normally close stationary terminal 135a, 135b and a normally open stationary terminal 137a, 137b disposed above and below the movable terminal 133a, 133b, respectively; an operative member 139a, 139b for moving the movable terminal 133a, 133b between the normally close stationary terminal 135a, 135b and the normally open stationary terminal 137a, 137b; and a helical spring 141a, 141b anchored to the operative member 139a, 139b and to the movable terminal 133a, 133b. When the c-contacts 121a, 121b are in an initial state or in a first OFF state, the movable terminals 133a, 133b are in contact with the normally close stationary terminals 135a, 135b, as spaced away from the normally open stationary terminals 137a, 137b.

The switching mechanisms 123a, 123b are disposed in an accommodating portion 143 defined in the push button 117. The switching mechanisms 123a, 123b individually include a pressing piece 145a, 145b for pressing the respective operative member 139a, 139b of the c-contact 121a, 121b; a slide block 147a, 147b for depressing the respective pressing piece 145a, 145b as operatively associated with pressing-down on the push button 117; and a pressing shaft 149a, 149b engaged with the respective slide block 147a, 147b.

The pressing shafts 149a, 149b are formed with a respective pair of flanges 151a, 151b at a respective upper end thereof. The pressing shafts 149a, 149b are formed with a slope 153a, 153b at one of the flange pair 151a, 151b, respectively. The pressing shafts 149a, 149b are of a hollow structure such that helical springs 155a, 155b anchored to an upper inside surface of the accommodating portion 143 are anchored to respective places within the pressing shafts 149a, 149b.

The slide blocks 147a, 147b are individually formed with a cavity 157a, 157b vertically extended therethrough, whereas the pressing shafts 149a, 149b are inserted through the cavities 157a, 157b, respectively. The slide blocks 147a, 147b are individually formed with a slope 159a, 159b at an inside wall of one end thereof, the slopes 159a, 159b engaged with the corresponding slopes 153a, 153b of the pressing shafts 149a, 149b. Helical springs 161a, 161b are disposed in individual spaces between the one end of the slide block 147a and a side wall of the accommodating portion 143 and between the one end of the slide block 147b and the other side wall of the accommodating portion 143. The helical springs 161a, 161b urge the slide blocks 147a, 147b toward the center of the push button 117. The respective other end of the slide blocks 147a, 147b is adapted to be pressed against a respective upper end of the pressing pieces 145a, 145b.

When the push button 117 of the push-button switch 113 in the initial state shown in FIG. 32 or in the first OFF state is depressed, the pressing pieces 145a, 145b push down the operative members 139a, 139b of the c-contacts 121a, 121b as operatively associated with pressing-down on the push button 117, thereby moving the movable terminals 133a, 133b away from the normally close stationary terminals 135a, 135b and into contact with the normally open stationary terminals 137a, 137b, as shown in FIG. 33. Thus, the push-button switch 113 is shifted to an ON state.

When the push button 117 of the push-button switch 113 in the ON state is further depressed, the slopes 159a, 159b of the slide blocks 147a, 147b slide on the slopes 153a, 153b of the pressing shafts 149a, 149b, so that the slide blocks 147a, 147b are moved outwardly relative to the pushbutton 117, as shown in FIG. 34. The movements of the slide blocks 147a, 147b release the individual other ends thereof from the engagement with the individual upper ends of the pressing pieces 145a, 145b which, in turn, are allowed to move upwardly to release the pressure on the operative members 139a, 139b. This causes the movable terminals 133a, 133b to move away from the normally open stationary terminals 137a, 137b and to come into contact with the normally close stationary terminals 135a, 135b. Thus, the push-button switch 113 in the ON state is shifted to a second OFF state.

That is, the push-button switch 113 permits key entry via the teaching pendant 101 only when the two c-contacts 121a, 121b are in the ON state. Furthermore, the push-button switch 113 can be set to any of three positions (the first OFF state, the ON state and the second OFF state) according to the amounts of depression of the push button 117. Hence, the push-button switch provides for a tangible indication of intent of the operator manually operating the machines, thus ensuring the safety of the operator.

Next, an example of circuit connections of the teaching pendant having the above arrangement will be described with reference to FIG. 35.

As shown in FIG. 35, the teaching pendant comprises three circuits which include a first, a second and a third circuits. In the first circuit, one R1 of c-contacts of a right-hand push-button switch and one L1 of c-contacts of a left-hand push-button switch are connected in parallel. In the second circuit, the other c-contact R2 of the right-hand push-button switch and the other c-contact L2 of the left-hand push-button switch are connected in parallel. In the third circuit, a normally close contact R3 of the right-hand push-button switch and a normally close contact L3 of the left-hand push-button switch are connected in series.

Based on such circuit connections, the teaching pendant 101 is enabled for data entry by way of either the right or left hand manipulating the push-button switch for driving the first and second circuits into conduction. Therefore, even in a case where the right hand is fatigued by holding the operation section depressed in order to enable the program teaching, for example, the teaching pendant may be kept enabled for teaching by the left hand, in turn, which depresses the operation section. In addition, the machines can be deactivated by either the right or left hand manipulating the push-button switch to shift the push-button switch to the second OFF state. This leads to an enhanced safety of the operator who is carrying out his job.

It is noted here that NC1-R and NC2-R are equivalent to the normally close stationary terminals 135a, 135b of the c-contacts R1, R2 (the same as the c-contacts 121a, 121b shown in FIG. 32, for example) constituting the right-hand push-button switch; that NO1-R, NO2-R are equivalent to the normally open stationary terminals 137a, 137b of the c-contacts 121a, 121b constituting the right-hand push-button switch; and that C1-R and C2-R are equivalent to the movable terminals 133a, 133b of the c-contacts R1, R2 constituting the right-hand push-button switch.

Likewise, NC1-L, NC2-L are equivalent to the normally close stationary terminals 135a, 135b of the c-contacts L1, L2 (the same as the c-contacts 121a, 121b shown in FIG. 32, for example) constituting the left-hand push-button switch; NO1-L, NO2-L are equivalent to the normally open stationary terminals 137a, 137b of the c-contacts L1, L2 constituting the left-hand push-button switch; and C1-L and C2-L are equivalent to the movable terminals 133a, 133b of the c-contacts L1, L2 constituting the left-hand push-button switch. On the other hand, R3 and L3 are each equivalent to the normally close contact 119 constituting the right-hand or left-hand push-button switch.

In a case where the operator is aware of some potential danger while performing the teaching operation via the teaching pendant with the left-hand push-button switch held in the ON state, for example, it is also possible to deactivate the machines by driving the third circuit into cutoff, as shown in FIG. 36, which is established by depressing the right-hand push-button switch to shift the same to the second OFF state.

In this case, if the pressure on the right-hand push-button switch is released to return the same to the first OFF state while the left-hand push-button switch is maintained in the ON state, as shown in FIG. 37, the first, second and third circuits are brought into conduction again so that the left-hand push-button switch in the ON state is active. Therefore, despite the right-hand push-button switch shifted to the second OFF state as emergency measure, the machines are so quickly enabled for teaching before both the push-button switches are returned to the initial or first OFF state. Consequently, the teaching pendant suffers poor reliability.

It is an object of the present invention to provide an enabler for teaching pendant which ensures that once either the right-hand or the left-hand push-button switch is shifted to the second OFF state, the teaching pendant is never enabled before both the push-button switches are shifted to the first OFF state.

DISCLOSURE OF THE INVENTION

According to the present invention for achieving the above object, an enabler for teaching pendant comprises a push-button switch capable of being shifted from a first OFF state (undepressed) to an ON state and then to a second OFF state as operatively associated with push-button depressions and of establishing an enable state when assuming the ON state, the enable state where a predetermined operation of an industrial machine is permitted, the enabler characterized in that the push-button switch comprises a switch case; a push button depressibly supported by the case; at least one primary contact including a stationary terminal disposed in the case, and a movable terminal shifted from an away position to a contact position and then to the away position relative to the stationary terminal as operatively associated with pressing-down on the push button; and at least one auxiliary contact disposed in the case and designed to be closed when the primary contact is in the first OFF state and to be opened when the primary contact is in the second OFF state; that a left-hand operation section to be gripped by the left hand and a right-hand operation section to be gripped by the right hand are provided at a pendant body; that the push-button switches for left hand and for right hand are disposed at individual inside portions of the both operation sections in order to be manipulated by gripping; that the left-hand push-button switch and the right-hand push-button switch are electrically connected in a manner that the enable state is established by switching ON at least either one of the left-hand push-button switch and the right-hand push-button switch; and that inhibition means is provided for inhibiting the enable state for a period of time between when at least either one of the left-hand push-button switch and the right-hand push-button switch is shifted to the second OFF state and when both the left-hand push-button switch and the right-hand push-button switch are returned to the first OFF state.

According to this arrangement, once either one of the push-button switches is shifted to the second OFF state, the inhibition means can inhibit the enable state despite the ON state of the other push-button switch until both the push-button switches are returned to the first OFF state.

Therefore, even in a case where the left-hand push-button switch in the second OFF state is released to be returned to the ON state and then to the first OFF state while the right-hand push-button switch is maintained in the ON state, the enable state is never established despite the right-hand push-button switch in the ON state. Thus, the safety during operations can be enhanced.

In another aspect of the present invention, the enabler for teaching pendant is characterized in that the at least one primary contact of the left-hand push-button switch is connected in parallel with the at least one primary contact of the right-hand push-button switch to form a parallel circuit; that the auxiliary contact of the left-hand push-button switch is connected in series with the auxiliary contact of the right-hand push-button switch to form a series circuit; and that the inhibition means comprises: a detection unit for detecting an open or close state of the parallel circuit and an open or close state of the series circuit; and a retention unit for retaining the parallel circuit in the open state for a period of time between the detection of the open state of the parallel circuit and the open state of the series circuit, and the detection of the open state of the parallel circuit and the close state of the series circuit.

According to this arrangement, after the open state of both the parallel circuit and the series circuit is detected by the detection unit, the retention unit maintains the parallel circuit in the open state until the series circuit, with the open parallel circuit, is closed. Therefore, in a case where with the left-hand push-button switch in the ON state or the parallel circuit in the close state, the right-hand push-button switch is shifted to the second OFF state thereby to open the parallel circuit and the series circuit, the enable state is never established before both the push-button switches are released. Thus, the safety of the teaching pendant can be enhanced.

It is noted here that the detection unit may comprise a relay circuit, or alternatively comprise an electronic circuit including a switching element, such as a bipolar transistor or a unipolar transistor like a field-effect transistor, and a control circuit for the switching element.

In another aspect of the present invention, the enabler for teaching pendant is characterized in that the left-hand and right-hand push-button switches include two of the primary contacts, respectively; that one of the primary contacts of the left-hand push-button switch is connected in parallel with one of the primary contacts of the right-hand push-button switch to form a first parallel circuit; that the other primary contact of the left-hand push-button switch is connected in parallel with the other primary contact of the right-hand push-button switch to form a second parallel circuit; that the auxiliary contact of the left-hand push-button switch is connected in series with the auxiliary contact of the right-hand push-button switch to form a series circuit; and that the inhibition means comprises: a first relay, a coil of which is electrically energized by switching ON the primary contact of the left-hand push-button switch in the first or second parallel circuit; a second relay, a coil of which is electrically energized by switching ON the primary contact of the right-hand push-button switch in the first or second parallel circuit; a relay contact circuit having a respective normally close contact of the first and second relays connected in series, and connected in parallel with the series circuit; a third relay, a coil of which is electrically energized by switching ON the both normally close contacts in the relay contact circuit; a first normally open contact of the third relay connected in series with the series circuit; a second normally open contact of the third relay connected in series with the primary contact of the left-hand push-button switch in the first or second parallel circuit, thus serving to conduct the coil of the first relay; a third normally open contact of the third relay connected in series with the primary contact of the right-hand push-button switch in the first or second parallel circuit, thus serving to conduct the coil of the second relay; and a fourth normally open contact of the third relay connected in series with the second or first parallel circuit, not serving to conduct the coil of the first nor second relay.

According to this arrangement, in a case where the right-hand push-button switch is ON, for example, the second relay is electrically de-energized to open the normally close contact thereof and hence, the relay contact circuit is opened. If, in this state, the left-hand push-button switch is shifted to the second OFF state, the auxiliary contact of the left-hand push-button switch is opened. Accordingly, the third relay is not electrically de-energized and the first and second parallel circuits are cut off until both the right-hand and left-hand push-button switches are returned to the first OFF state.

Therefore, once either one of the push-button switches is shifted to the second OFF state, the teaching pendant cannot be enabled despite the ON state of the other push-button switch, before both the push-button switches are returned to the first OFF state. Thus, the safety of the teaching pendant can be enhanced.

In another aspect of the present invention, the enabler for teaching pendant is characterized in that the left-hand and right-hand push-button switches include two of the primary contacts, respectively; that one of the primary contacts of the left-hand push-button switch is connected in parallel with one of the primary contacts of the right-hand push-button switch to form a first parallel circuit; that the other primary contact of the left-hand push-button switch is connected in parallel with the other primary contact of the right-hand push-button switch to form a second parallel circuit; that the detection unit comprises: a first relay, a coil of which is electrically energized by switching ON the primary contact of the left-hand push-button switch in the first or second parallel circuit; a second relay, a coil of which is electrically energized by switching ON the primary contact of the right-hand push-button switch in the first or second parallel circuit; a relay contact circuit having a respective normally close contact of the first and second relays connected in series, and connected in parallel with the series circuit; a third relay, a coil of which is electrically energized by switching ON the both normally close contacts in the relay contact circuit; and a first normally open contact of the third relay connected in series with the series circuit; and that the retention unit comprises: a second normally open contact of the third relay connected in series with the primary contact of the left-hand push-button switch in the first or second parallel circuit, thus serving to conduct the coil of the first relay; a third normally open contact of the third relay connected in series with the primary contact of the right-hand push-button switch in the first or second parallel circuit, thus serving to conduct the coil of the second relay; and a fourth normally open contact of the third relay connected in series with the second or first parallel circuit, not serving to conduct the coil of the first nor second relay.

According to this arrangement, the detection unit comprises three relays whereas the retention unit comprises the contacts adapted to be opened or closed by electrically energizing or de-energizing the relays. In a case where the right-hand push-button switch is ON, for example, the second relay is electrically de-energized to open the normally close contact thereof and hence, the relay contact circuit is opened.

If, at this time, the left-hand push-button switch is shifted to the second OFF state, the auxiliary contact of the left-hand push-button switch is opened. Accordingly, the third relay is not electrically de-energized and the first and second circuits are cut off until both the right-hand and left-hand push-button switches are returned to the first OFF state.

Therefore, once either one of the push-button switches is shifted to the second OFF state, the teaching pendant cannot be enabled despite the ON state of the other push-button switch, before both the push-button switches are returned to the first OFF state. Thus, the safety of the teaching pendant can be enhanced.

In another aspect of the present invention, the enabler for teaching pendant is characterized in that the both push-button switches each comprise, as the auxiliary contact, a first auxiliary contact which is closed when the both primary contacts are in the first OFF state and which is opened in the ON state and in the second OFF state, and a second auxiliary contact which is closed when the both primary contacts are in the first OFF state and in the ON state and which is opened in the second OFF state; that the at least one primary contact of the left-hand push-button switch is connected in parallel with the at least one primary contact of the right-hand push-button switch to form a parallel circuit; that the first auxiliary contact of the left-hand push-button switch is connected in series with the first auxiliary contact of the right-hand push-button switch to form a first series circuit; that the second auxiliary contact of the left-hand push-button switch is connected in series with the second auxiliary contact of the right-hand push-button switch to form a second series circuit; and that the inhibition means comprises: a detection unit for detecting an open or close state of the parallel circuit and an open or close state of the first or second series circuit; and a retention unit for retaining the parallel circuit in the open state for a period of time between when the detection unit detects the open state of the parallel circuit and the open state of the second series circuit, and when the detection unit detects the open state of the parallel circuit and the close state of the first series circuit.

According to this arrangement, in a case where the right-hand push-button switch is ON, for example, the first auxiliary contact of the right-hand push-button switch is open so that the first series circuit is open. If, in this state, the left-hand push-button switch is shifted to the second OFF state, the second auxiliary contact of the left-hand push-button switch is opened so that the second series circuit is opened. Accordingly, the retention unit maintains the parallel circuit in the open state for disabling the teaching pendant to teach until the open state of the parallel circuit and the close state of the first series circuit are detected by the detection unit. Thus, the safety of the teaching pendant can be enhanced.

It is noted here that the detection unit may comprise a relay circuit, or alternatively comprise an electronic circuit including a switching element, such as a bipolar transistor or a unipolar transistor like a field-effect transistor, and a control circuit for the switching element.

In another aspect of the present invention, the enabler for teaching pendant is characterized in that the both push-button switches each comprise, as the auxiliary contact, a first auxiliary contact which is closed when the both primary contacts are in the first OFF state and which is opened in the ON state and in the second OFF state, and a second auxiliary contact which is closed when the both primary contacts are in the first OFF state and in the ON state and which is opened in the second OFF state; that the at least one primary contact of the left-hand push-button switch is connected in parallel with the at least one primary contact of the right-hand push-button switch to form a parallel circuit; that the first auxiliary contact of the left-hand push-button switch is connected in series with the first auxiliary contact of the right-hand push-button switch to form a first series circuit; that the second auxiliary contact of the left-hand push-button switch is connected in series with the second auxiliary contact of the right-hand push-button switch to form a second series circuit which is connected in parallel with the first series circuit; and that the inhibition means comprises: a fourth relay, a coil of which is electrically energized by switching ON the both auxiliary contacts in the first series circuit; a first normally open contact of the fourth relay connected in series with the second series circuit; and a second normally open contact of the fourth relay connected in series with the parallel circuit.

According to this arrangement, in a case where the right-hand push-button switch is ON, for example, the first auxiliary contact of the right-hand push-button switch is open so that the first series circuit is open. If, in this state, the left-hand push-button switch is shifted to the second OFF state, the second auxiliary contact of the left-hand push-button switch is opened so that the second series circuit is opened. Thus, the fourth relay is electrically de-energized to cut off the parallel circuit.

Therefore, once either one of the push-button switches is manually shifted to the second OFF state, the teaching pendant cannot be enabled despite the ON state of the other push-button switch, before both the push-button switches are returned to the first OFF state. Thus, the safety of the teaching pendant can be enhanced.

In another aspect of the present invention, the enabler for teaching pendant is characterized in that the both push-button switches each comprise, as the auxiliary contact, a first auxiliary contact which is closed when the both primary contacts are in the first OFF state and which is opened in the ON state and in the second OFF state, and a second auxiliary contact which is closed when the both primary contacts are in the first OFF state and in the ON state and which is opened in the second OFF state; that the at least one primary contact of the left-hand push-button switch is connected in parallel with the at least one primary contact of the right-hand push-button switch to form a parallel circuit; that the first auxiliary contact of the left-hand push-button switch is connected in series with the first auxiliary contact of the right-hand push-button switch to form a first series circuit; that the second auxiliary contact of the left-hand push-button switch is connected in series with the second auxiliary contact of the right-hand push-button switch to form a second series circuit which is connected in parallel with the first series circuit; that the inhibition means comprises: a fifth relay, a coil of which is electrically energized by switching ON the both auxiliary contacts in the first series circuit; and a normally open contact of the fifth relay connected in series with the second series circuit, and that the parallel circuit is connected in series with the first series circuit.

According to this arrangement, in a case where the right-hand push-button switch is ON, for example, the first auxiliary contact of the right-hand push-button switch is open so that the first series circuit is open. If, in this state, the left-hand push-button switch is shifted to the second OFF state, the second auxiliary contact of the left-hand push-button switch is opened to open the second series circuit. Thus, the parallel circuit connected with the first and second series circuits is cut off.

Therefore, once either one of the push-button switches is manually shifted to the second OFF state, the teaching pendant cannot be enabled despite the ON state of the other push-button switch, before both the push-button switches are returned to the first OFF state. Thus, the safety of the teaching pendant can be enhanced.

In another aspect of the present invention, the enabler for teaching pendant is characterized in that the both push-button switches each comprise, as the auxiliary contact, a first auxiliary contact which is closed when the both primary contacts are in the first OFF state and which is opened in the ON state and in the second OFF state, and a second auxiliary contact which is closed when the both primary contacts are in the first OFF state and in the ON state and which is opened in the second OFF state; that the at least one primary contact of the left-hand push-button switch is connected in parallel with the at least one primary contact of the right-hand push-button switch to form a parallel circuit; that the first auxiliary contact of the left-hand push-button switch is connected in series with the first auxiliary contact of the right-hand push-button switch to form a first series circuit; that the second auxiliary contact of the left-hand push-button switch is connected in series with the second auxiliary contact of the right-hand push-button switch to form a second series circuit; that the inhibition means comprises a sixth relay including a normally open contact and a c-contact, and a seventh relay including a normally open contact and a c-contact; that the normally open contact of the sixth relay and the normally open contact of the seventh relay are connected in series with the parallel circuit; that a normally close terminal of the c-contact of the sixth relay and a normally close terminal of the c-contact of the seventh relay are connected to opposite ends of the first series circuit; and that a normally open terminal of the c-contact of the sixth relay and a normally open terminal of the c-contact of the seventh relay are connected to opposite ends of the second series circuit.

According to this arrangement, in a case where the right-hand push-button switch is ON, for example, the first auxiliary contact of the right-hand push-button switch is open so that the first series circuit is open. If, in this state, the left-hand push-button switch is shifted to the second OFF state, the second auxiliary contact of the left-hand push-button switch is opened so that the second series circuit is opened. Thus, the sixth and seventh relays are electrically de-energized to cut off the parallel circuit.

Therefore, once either one of the push-button switches is manually shifted to the second OFF state, the teaching pendant cannot be enabled despite the ON state of the other push-button switch, before both the push-button switches are returned to the first OFF state. Thus, the safety of the teaching pendant can be enhanced.

It is noted here that the c-contacts of the sixth and seventh relays are connected to the first and second series circuits. Therefore, in the event that either one of the c-contacts is fused, the two c-contacts are incapable of assuming the same open or close state even though both the push-button switches are returned to the first OFF state from the state where either one of the push-button switches is in the second OFF state. Accordingly, the sixth and seventh relays are not electrically energized. This ensures that the teaching pendant cannot be enabled despite the ON state of the push-button switch, and also facilitates the detection of any failed contact.

In another aspect of the present invention, the enabler for teaching pendant is characterized in that the left-hand and the right-hand push-button switches include two of the primary contacts, respectively; that the both push-button switches each comprise, as the auxiliary contact, a first auxiliary contact which is closed when the both primary contacts are in the first OFF state and which is opened in the ON state and in the second OFF state, and a second auxiliary contact which is closed when the both primary contacts are in the first OFF state and in the ON state and which is opened in the second OFF state; that one of the primary contacts of the left-hand push-button switch is connected in parallel with one of the primary contacts of the right-hand push-button switch to form a first parallel circuit; that the other of the primary contacts of the left-hand push-button switch is connected in parallel with the other of the primary contacts of the right-hand push-button switch to form a second parallel circuit; that the first auxiliary contact of the left-hand push-button switch is connected in series with the first auxiliary contact of the right-hand push-button switch to form a first series circuit; that the second auxiliary contact of the left-hand push-button switch is connected in series with the second auxiliary contact of the right-hand push-button switch to form a second series circuit; that the inhibition means comprises an eighth relay including a normally open contact and a c-contact, and a ninth relay including a normally open contact and a c-contact; that either one of the normally open contact of the eighth relay and the normally open contact of the ninth relay is connected in series with the first parallel circuit; that the remaining normally open contact of the eighth or ninth relay is connected in series with the second parallel circuit; that a normally close terminal of the c-contact of the eighth relay and a normally close terminal of the c-contact of the ninth relay are connected to opposite ends of the first series circuit; and that a normally open terminal of the c-contact of the eighth relay and a normally open terminal of the c-contact of the ninth relay are connected to opposite ends of the second series circuit.

According to this arrangement, in a case where the right-hand push-button switch is ON, for example, the first auxiliary contact of the right-hand push-button switch is open so that the first series circuit is open. If, in this state, the left-hand push-button switch is shifted to the second OFF state, the second auxiliary contact of the left-hand push-button switch is opened so that the second series circuit is opened. Thus, the eighth and ninth relays are electrically de-energized to cut off the first and second parallel circuits.

Therefore, once either one of the push-button switches is manually shifted to the second OFF state, the teaching pendant cannot be enabled despite the ON state of the other push-button switch, before both of the push-button switches are returned to the first OFF state. Thus, the safety of the teaching pendant can be enhanced.

In another aspect of the present invention, the enabler for teaching pendant is characterized in that the both push-button switches each comprise, as the auxiliary contact, a first auxiliary contact which is closed when the both primary contacts are in the first OFF state and which is opened in the ON state and in the second OFF state, and a second auxiliary contact which is closed when the both primary contacts are in the first OFF state and in the ON state and which is opened in the second OFF state; that the at least one primary contact of the left-hand push-button switch is connected in parallel with the at least one primary contact of the right-hand push-button switch to form a parallel circuit; that the first auxiliary contact of the left-hand push-button switch is connected in series with the first auxiliary contact of the right-hand push-button switch to form a first series circuit; that the second auxiliary contact of the left-hand push-button switch is connected in series with the second auxiliary contact of the right-hand push-button switch to form a second series circuit; that the inhibition means comprises a tenth relay including a first and a second normally open contact and a normally close contact, the second normally open contact and the normally close contact of which are simultaneously switched, and an eleventh relay including a first and a second normally open contact and a normally close contact, the second normally open contact and the normally close contact of which are simultaneously switched; that the first normally open contact of the tenth relay and the first normally open contact of the eleventh relay are connected in series with the parallel circuit; that the normally close contact of the tenth relay and the normally close contact of the eleventh relay are connected in series with the first series circuit; and that the second normally open contact of the tenth relay and the second normally open contact of the eleventh relay are connected in series with the second series circuit.

According to this arrangement, in a case where the right-hand push-button switch is ON, for example, the first auxiliary contact of the right-hand push-button switch is open so that the first series circuit is open. If, in this state, the left-hand push-button switch is shifted to the second OFF state, the second auxiliary contact of the left-hand push-button switch is opened so that the second series circuit is opened. Thus, the tenth and eleventh relays are electrically de-energized to cut off the parallel circuit.

Therefore, once either one of the push-button switches is manually shifted to the second OFF state, the teaching pendant cannot be enabled regardless of the ON or OFF state of the other push-button switch, before both the push-button switches are returned to the first OFF state. Thus, the safety of the teaching pendant can be enhanced.

It is noted here that the second normally open contacts and the normally close contacts of the tenth and eleventh relays are switched simultaneously. Therefore, in the event that any of the second normally open contacts and the normally close contacts is fused, the first and second series circuits are in different open/close states even though both the push-button switches are returned to the first OFF state from the second OFF state. Accordingly, the tenth and eleventh relays are not electrically energized. This ensures that the teaching pendant cannot be enabled despite the ON state of either one of the push-button switches, and also facilitates the detection of any failed contact.

In another aspect of the present invention, the enabler for teaching pendant is characterized in that the left-hand and the right-hand push-button switches include two of the primary contacts, respectively; that the both push-button switches each comprise, as the auxiliary contact, a first auxiliary contact which is closed when the both primary contacts are in the first OFF state and which is opened in the ON state and in the second OFF state, and a second auxiliary contact which is closed when the both primary contacts are in the first OFF state and in the ON state and which is opened in the second OFF state; that one of the primary contacts of the left-hand push-button switch is connected in parallel with one of the primary contacts of the right-hand push-button switch to form a first parallel circuit; that the other of the primary contacts of the left-hand push-button switch is connected in parallel with the other of the primary contacts of the right-hand push-button switch to form a second parallel circuit; that the first auxiliary contact of the left-hand push-button switch is connected in series with the first auxiliary contact of the right-hand push-button switch to form a first series circuit; that the second auxiliary contact of the left-hand push-button switch is connected in series with the second auxiliary contact of the right-hand push-button switch to form a second series circuit; that the inhibition means comprises a twelfth relay including a first and a second normally open contact and a normally close contact, the second normally open contact and the normally close contact of which are simultaneously switched, and a thirteenth relay including a first and a second normally open contact and a normally close contact, the second normally open contact and the normally close contact of which are simultaneously switched; that either one of the first normally open contact of the twelfth relay and the first normally open contact of the thirteenth relay is connected in series with the first parallel circuit; that the remaining first normally open contact of the twelfth or thirteenth relay is connected in series with the second parallel circuit; that the normally close contact of the twelfth relay and the normally close contact of the thirteenth relay are connected in series with the first series circuit; and that the second normally open contact of the twelfth relay and the second normally open contact of the thirteenth relay are connected in series with the second series circuit.

According to this arrangement, in a case where the right-hand push-button switch is ON, for example, the first auxiliary contact of the right-hand push-button switch is open so that the first series circuit is open. If, in this state, the left-hand push-button switch is shifted to the second OFF state, the second auxiliary contact of the left-hand push-button switch is opened so that the second series circuit is opened. Thus, the twelfth and thirteenth relays are electrically de-energized to cut off the first and second parallel circuits.

Therefore, once either one of the push-button switches is manually shifted to the second OFF state, the teaching pendant cannot be enabled regardless of the ON or OFF state of the other push-button switch, before both the push-button switches are returned to the first OFF state. Thus, the safety of the teaching pendant can be enhanced.

In another aspect of the present invention, the enabler for teaching pendant is characterized in that the relays or the detection unit is disposed on a circuit substrate in the pendant body or in the switch case of the left-hand or right-hand push-button switch. According to this arrangement, the teaching pendant can be reduced in size because the relays or the detection unit is contained in the pendant body or the switch case.

In an alternative arrangement, the relays or the detection unit may be disposed in a relay box provided externally of the pendant body. For instance, a known relay module may be used for constructing the enabler for teaching pendant. In this case, the teaching pendant itself has a simple structure.

Figure 1:
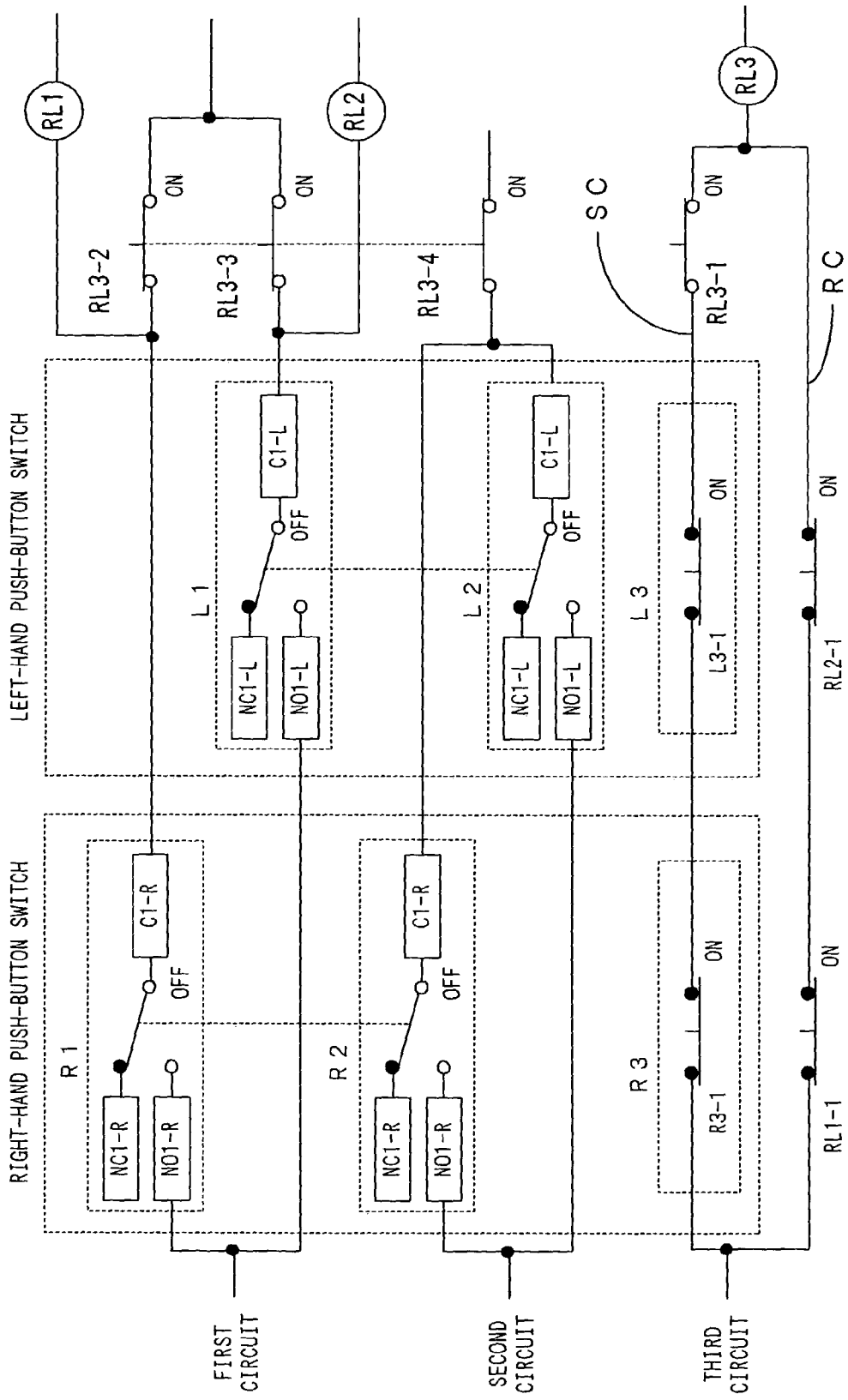
FIG. 1 is a circuit connection diagram illustrative of operations of a first embodiment of the present invention.

BEST MODES FOR CARRYING-OUT THE INVENTION (First Embodiment)

A first embodiment of the present invention will be described with reference to FIGS. 1 to 4, which are circuit connection diagrams of a teaching pendant. In the figures, the same reference characters as those of the conventional example represent identical or equivalent parts to those of the conventional example, respectively.

Figure 32:
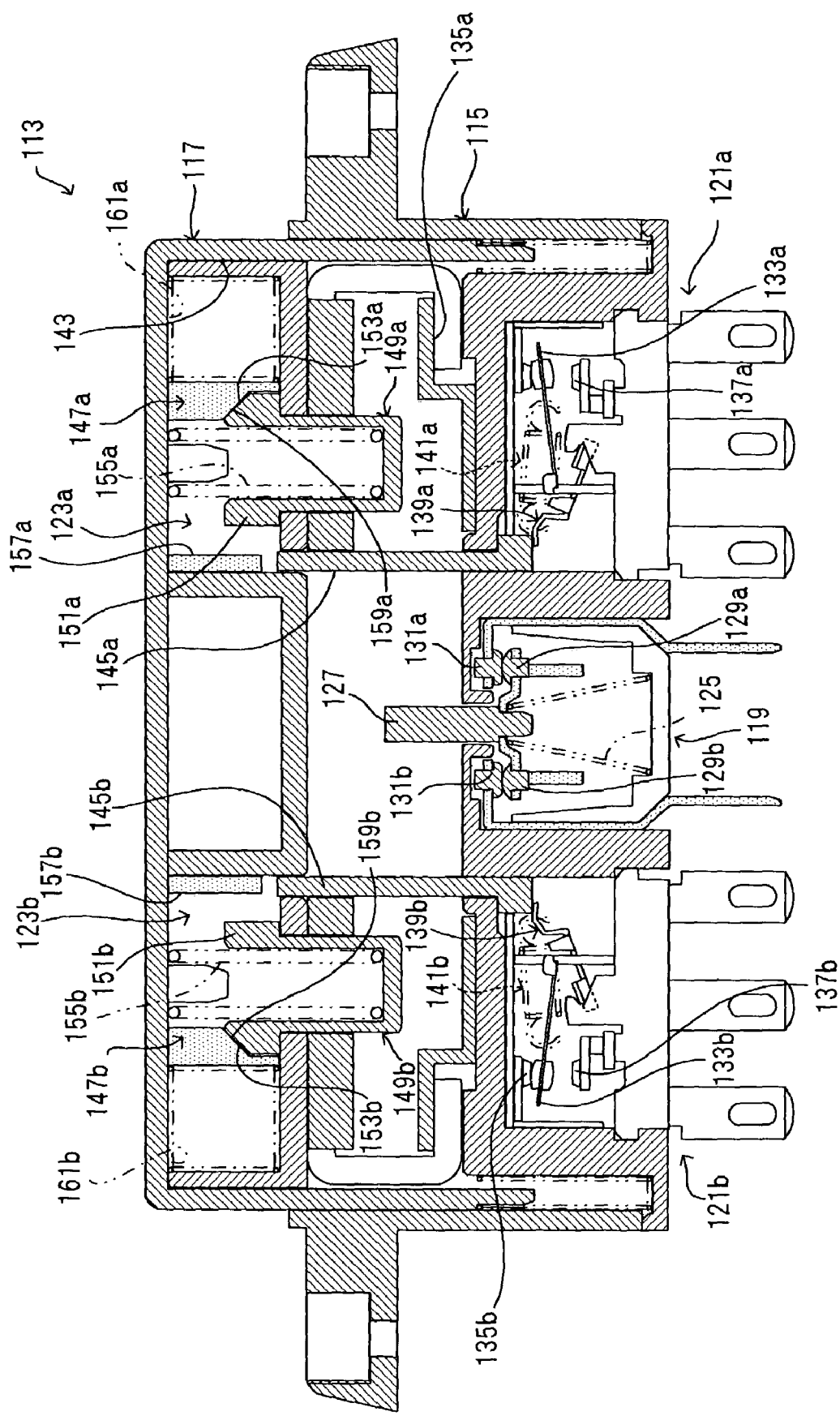
FIG. 32 is a schematic diagram showing a construction of a conventional push-button switch.
Figure 33:
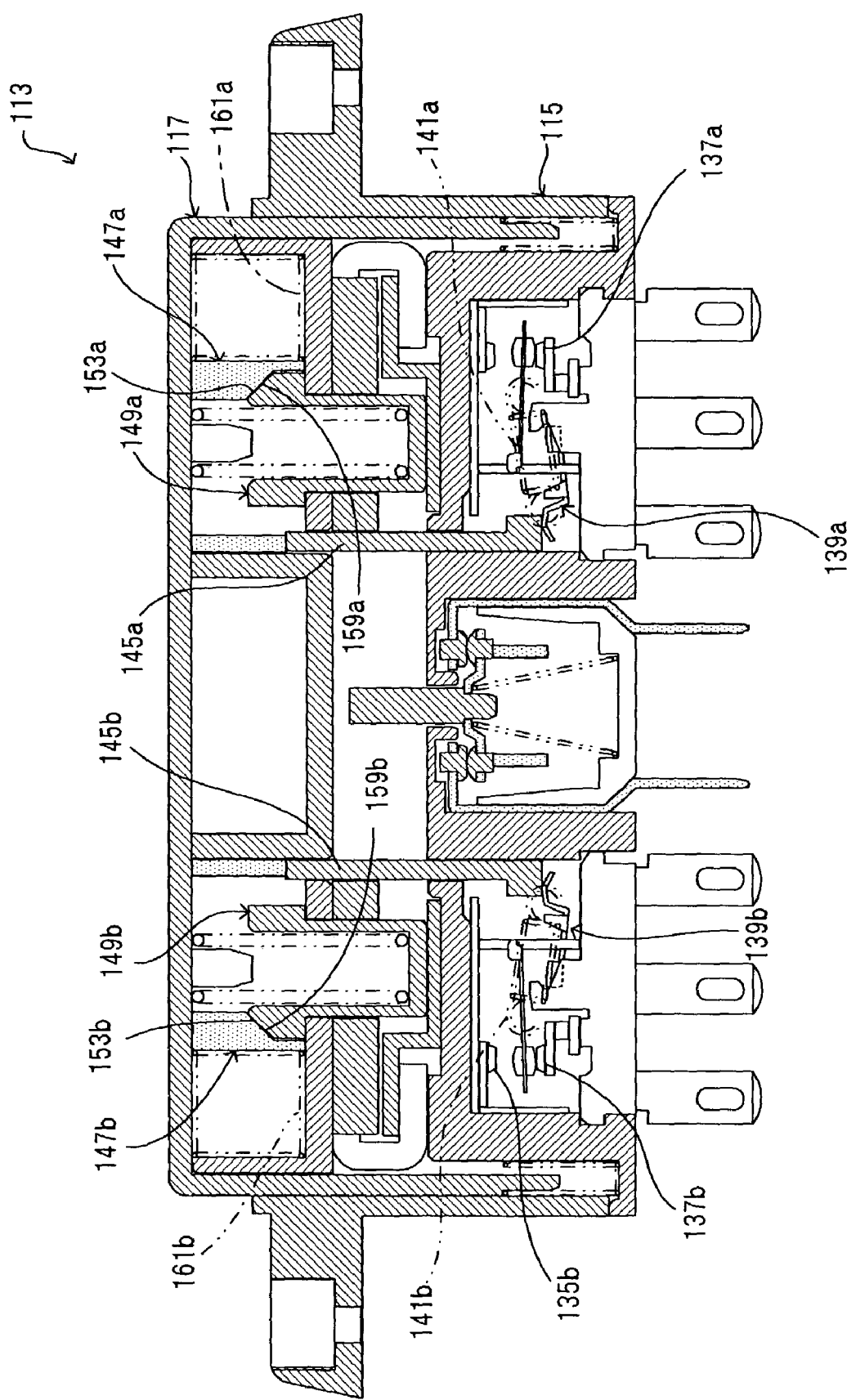
FIG. 33 is a diagram illustrative of operations of the conventional push-button switch.
Figure 34:
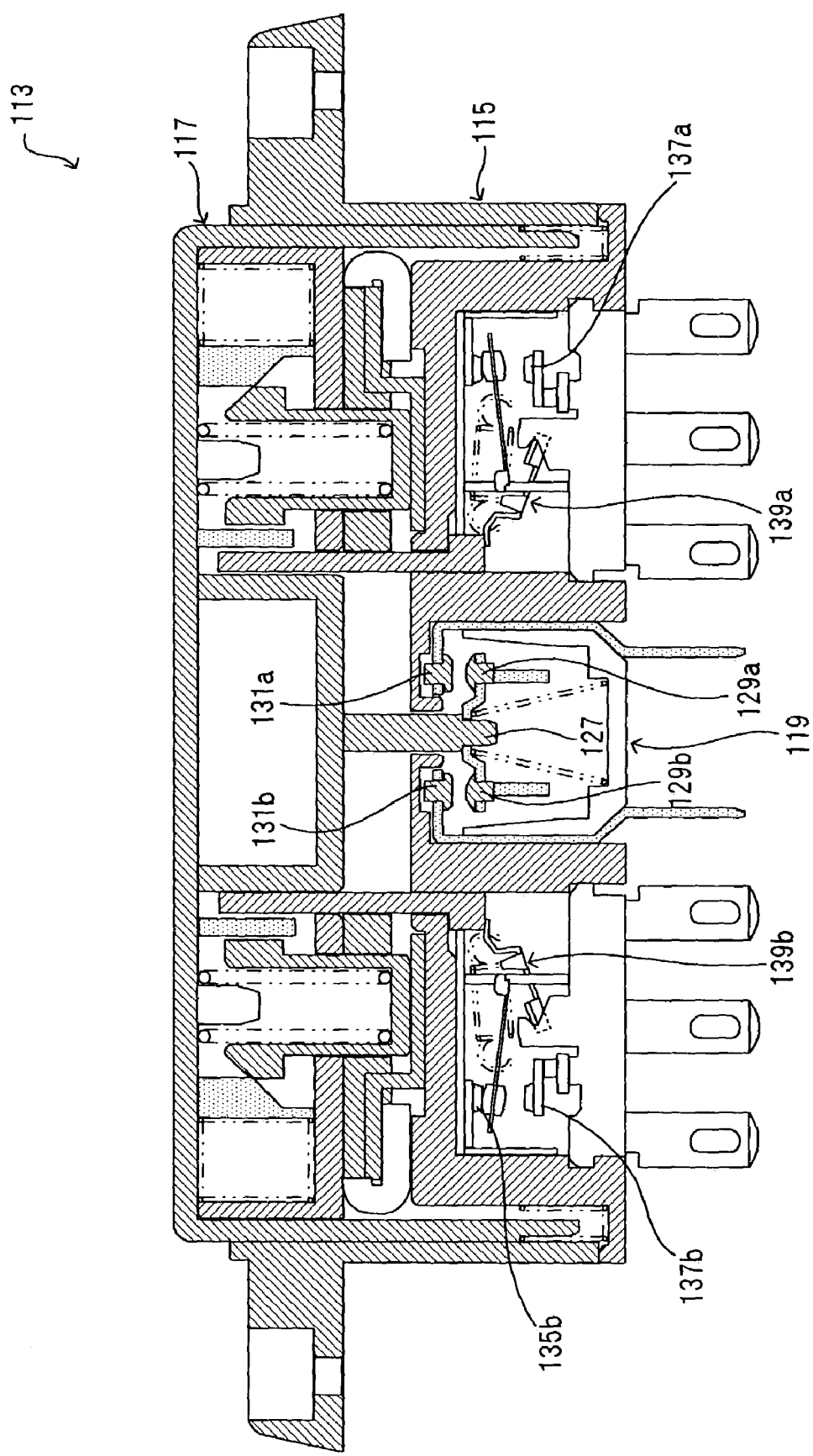
FIG. 34 is a diagram illustrative of the operations of the conventional push-button switch.
Figure 35:
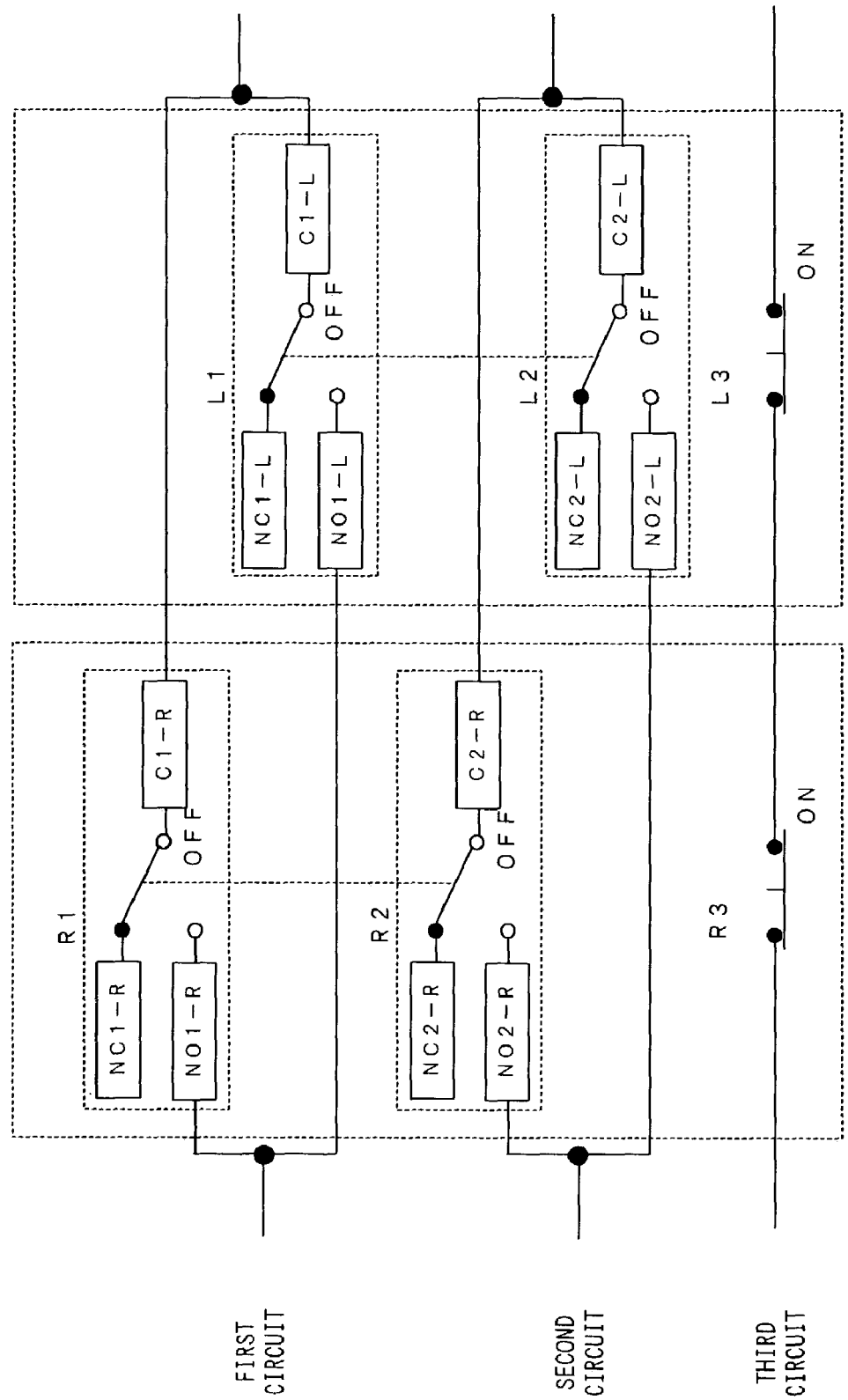
FIG. 35 is a diagram showing circuit connections of the conventional push-button switch.
Figure 36:
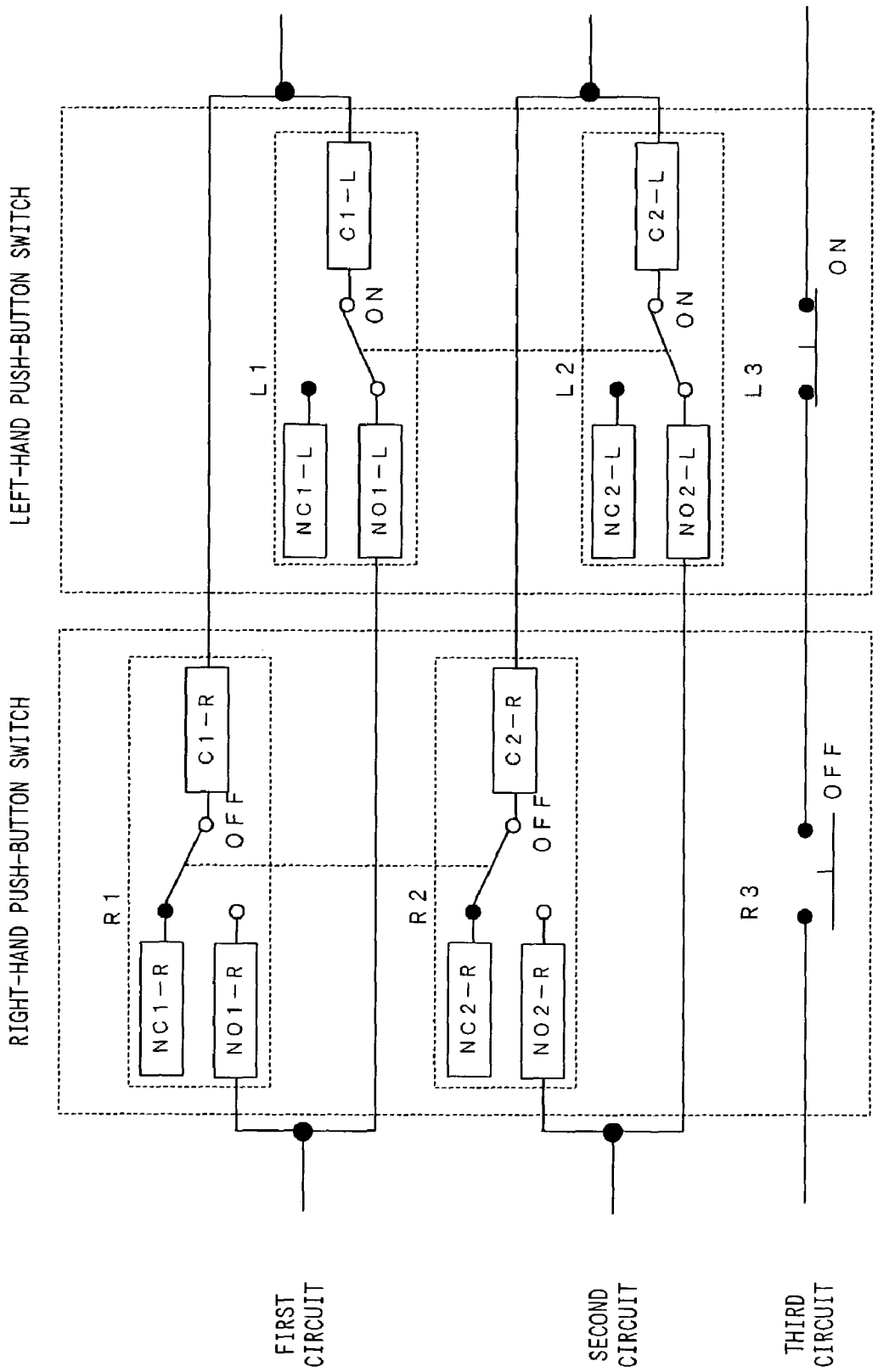
FIG. 36 is a diagram showing the circuit connections of the conventional push-button switch.
Figure 37:
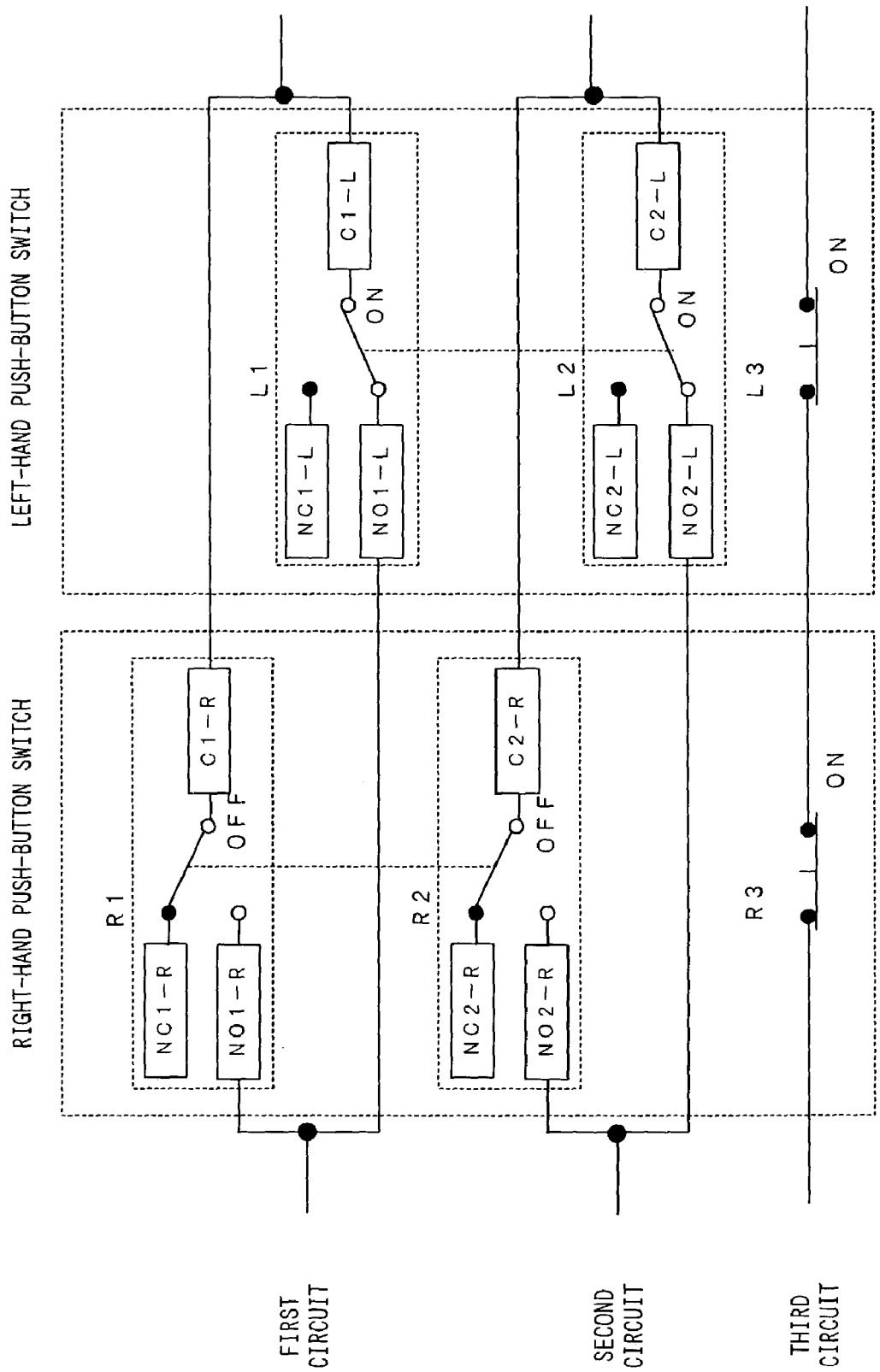
FIG. 37 is a diagram showing the circuit connections of the conventional push-button switch.

Essential configurations of the teaching pendant of the embodiment and a push-button switch disposed therein are substantially the same as those of the conventional example shown in FIGS. 32 to 34. Therefore, the following description principally discusses differences from the prior art referring to these figures as well, so that redundant descriptions may be obviated. According to this embodiment, the teaching pendant has different circuit connections from those of the prior art.

As shown in FIG. 1, the teaching pendant comprises three circuits including a first, a second and a third circuit, which are provided with a first relay RL1 and a second relay RL2 each including one normally close contact, and a third relay RL3 including four normally close contacts. The first to third relays RL1 to RL3 are equivalent to a first to third relays of the present invention, respectively.

In the first circuit, one R1 of c-contacts of a right-hand push-button switch is connected in parallel with one L1 of c-contacts of a left-hand push-button switch to form a first parallel circuit. The c-contact R1 is connected in series with a second normally open contact RL3-2 of the third relay RL3, whereas the c-contact L1 is connected in series with a third normally open contact RL3-3 of the third relay RL3. In addition, the first relay RL1 is connected between the c-contact R1 and the second normally open contact RL3-2 such that a coil of the first relay is electrically energized by switching ON the c-contact R1. Likewise, the second relay RL2 is connected between the c-contact L1 and the third normally open contact RL3-3 such that the second relay is electrically energized by switching ON the c-contact L1.

In the second circuit, the other c-contact R2 of the right-hand push-button switch is connected in parallel with the other c-contact L2 of the left-hand push-button switch to form a second parallel circuit, which is connected in series with a fourth normally open contact RL3-4 of the third relay RL3.

In the third circuit, a normally close contact R3 of the right-hand push-button switch, a normally close contact L3 of the left-hand push-button switch, and a first normally open contact RL3-1 of the third relay RL3 are connected in series to form a series circuit SC. The series circuit SC is connected in parallel with a relay contact circuit RC to form a third parallel circuit. The relay contact circuit RC includes a normally close contact RL1-1 of the first relay RL1 and a normally close contact RL2-1 of the second relay RL2 connected in series. In addition, the third parallel circuit is connected in series with the third relay RL3, a coil of which is electrically energized by switching ON both of the normally close contacts RL1-1, RL2-1 of the relay contact circuit RC.

Figure 2:
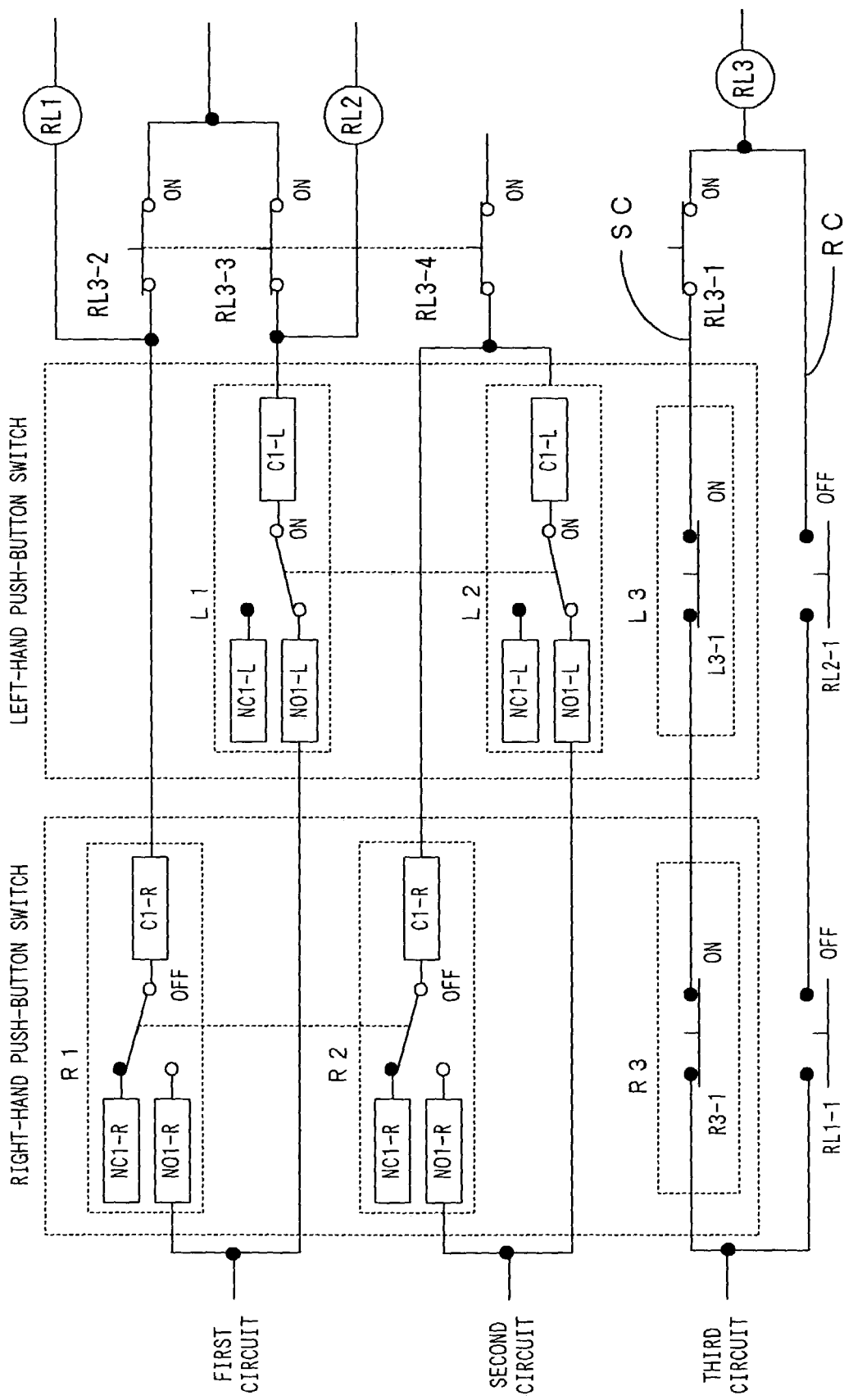
FIG. 2 is a circuit connection diagram illustrative of the operations of the first embodiment hereof.

Now referring to FIGS. 1 to 3, operations of the teaching pendant of the embodiment will be described.

When the left-hand push-button switch in an initial state (undepressed) shown in FIG. 1 is shifted to an ON state, the two c-contacts L1, L2 of the left-hand push-button switch are switched ON. Hence, the c-contact L1 on one side electrically energizes the first relay RL1 and the second relay RL2, so that the normally close contacts RL1-1, RL2-1 of the first relay RL1 and the second relay RL2 in the third circuit are switched OFF (opened), as shown in FIG. 2. This state is an enable state for teaching operation wherein an operator is allowed to perform the teaching operation to an industrial machine such as an industrial robot.

Figure 3:
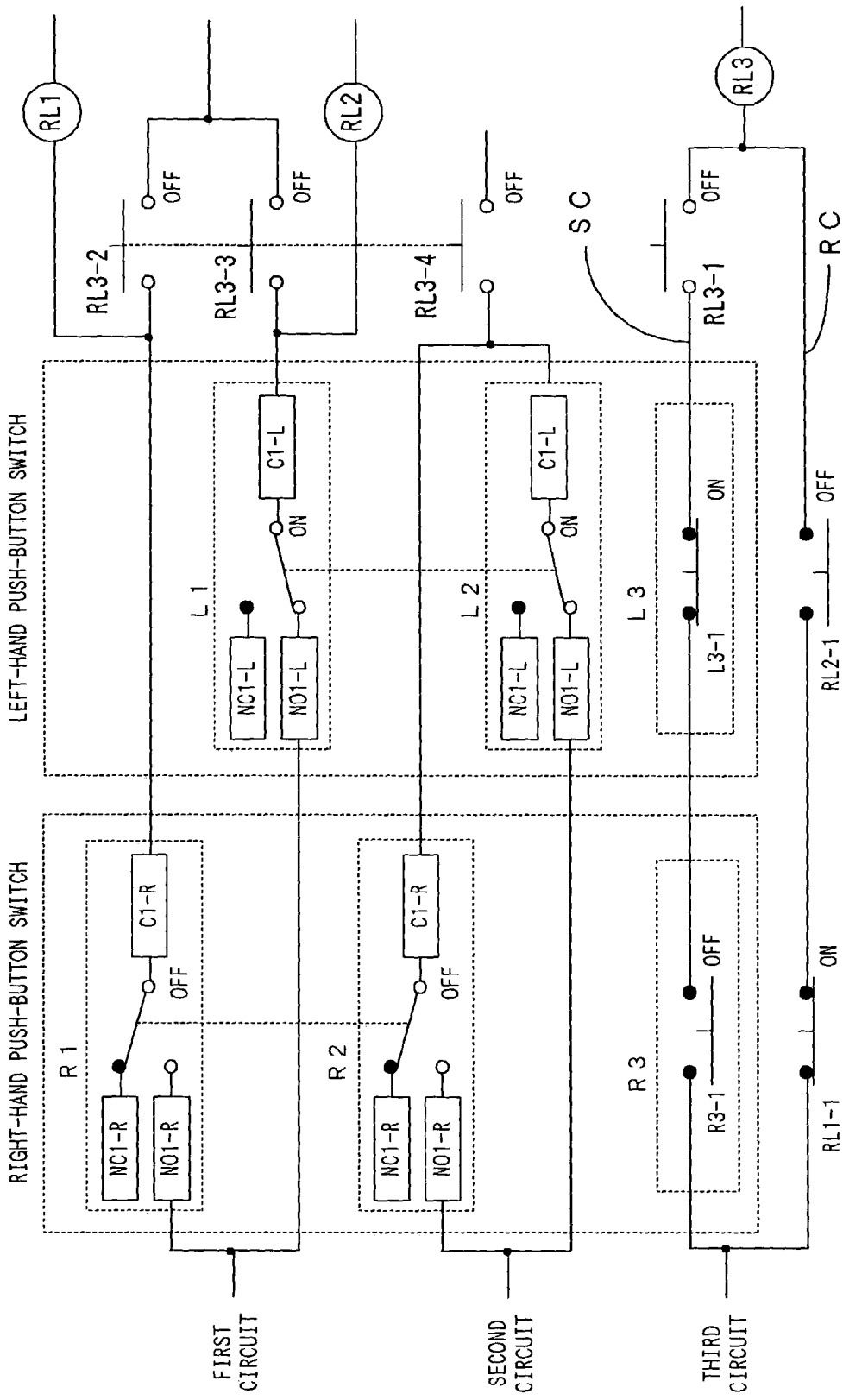
FIG. 3 is a circuit connection diagram illustrative of the operations of the first embodiment hereof.

If, in this state, the operator being aware of any potential danger shifts the right-hand push-button switch to a second OFF state by depressing the same, the normally close contact R3 of the right-hand push-button switch in the third circuit is switched OFF thereby driving the third circuit into cutoff, as shown in FIG. 3. Hence, the first relay RL1 and the third relay RL3 are electrically de-energized. Accordingly, the normally close contact RL1-1 of the first relay RL1 is returned to the ON position (closed) whereas the first to fourth normally open contacts RL3-1 to RL3-4 of the third relay RL3 are switched OFF (opened) so that the first and second circuits are cut off. This brings the teaching pendant 101 into a disable state for teaching operation.

Figure 4:
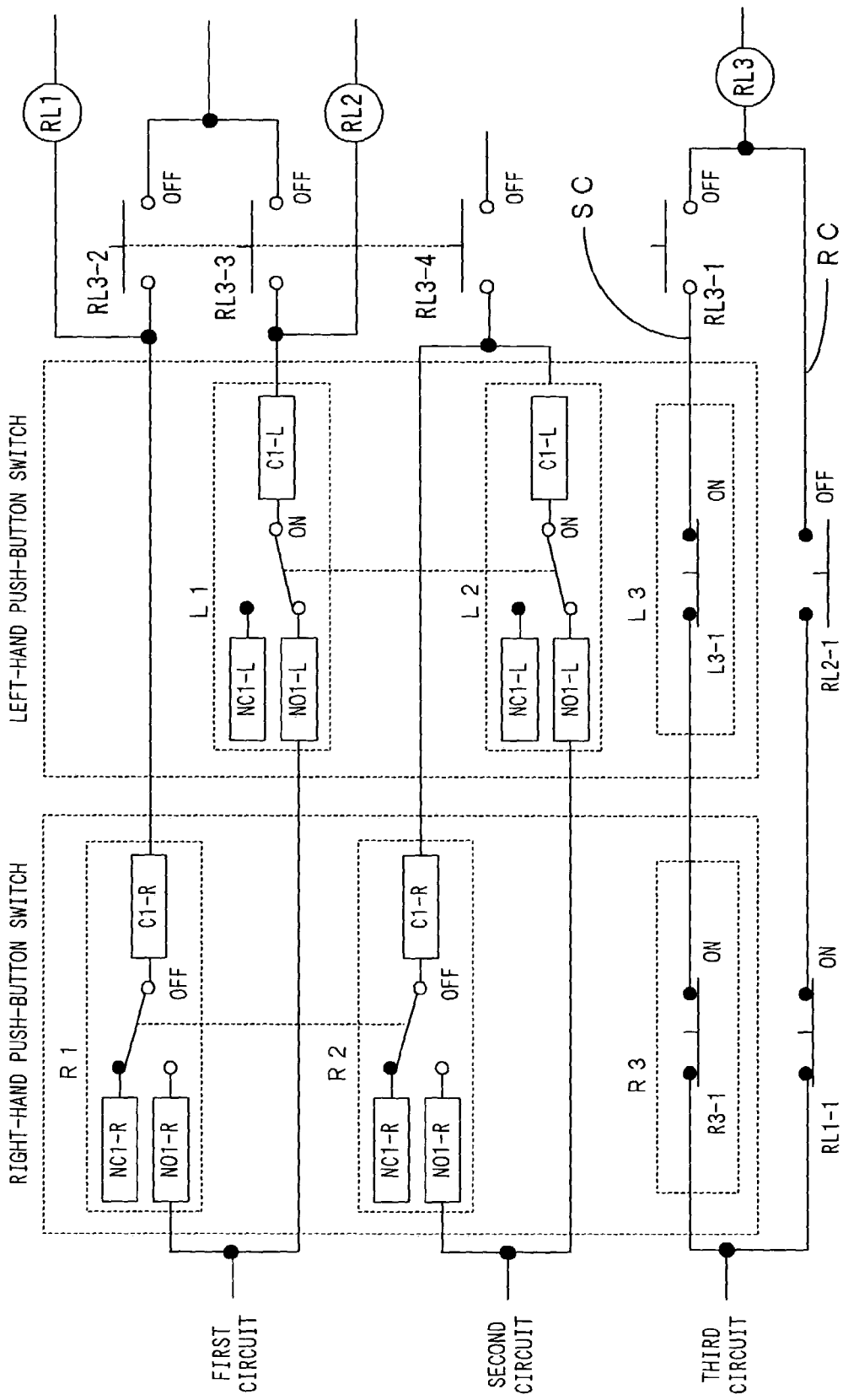
FIG. 4 is a circuit connection diagram illustrative of the operations of the first embodiment hereof.

In this case, if the right-hand push-button switch is returned to the first OFF state by decreasing the pressure thereon while the left-hand push-button switch is maintained in the ON state, as shown in FIG. 4, the relay contact circuit RC is out of conduction because the normally close contact RL2-1 of the second relay is OFF. As a result, the third relay RL3 stays de-energized. Accordingly, the first and second circuits are maintained in cutoff, so that the ON position of the left-hand push-button switch is disabled.

If, in this state, the left-hand push-button switch is returned to the first OFF state by decreasing the pressure thereon, the first, second and third circuits are brought into conduction, as shown in FIG. 1. Hence, switching ON either of the push-button switches enables the teaching operation to the industrial machine such as the industrial robot.

According to the first embodiment described above, the relay contact circuit RC may be opened by switching ON the left-hand push-button switch, for example. If, in this state, the right-hand push-button switch is shifted to the second OFF state, the series circuit SC is opened so that the third relay is electrically de-energized. This drives the first, second and third circuits into cutoff. Therefore, the left-hand push-button switch in the ON state can be disabled even if the right-hand push-button switch in this state is shifted to the first OFF state by decreasing the pressure thereon.

That is, once either one of the push-button switches is shifted to the second OFF state, the teaching pendant cannot be enabled for teaching operation before both of the push-button switches are returned to the first OFF state. Thus, the safety of the teaching pendant can be enhanced.

According to the above embodiment, the circuit connections are implemented using the push-button switches each employing two c-contacts but the present invention is not limited to this. It goes without saying that an equivalent effect can be attained by the use of push-button switches each employing one c-contact or three or more c-contacts.

The first embodiment described above employs the push-button switches of the snap action configuration but the present invention is not limited to this. For instance, push-button switches having a slow action configuration may also be employed. In short, the push-button switch may have any configuration that is adapted to be switched from OFF to ON and then to OFF according to the increased press-down on the push button.

(Second Embodiment)

Figure 5:
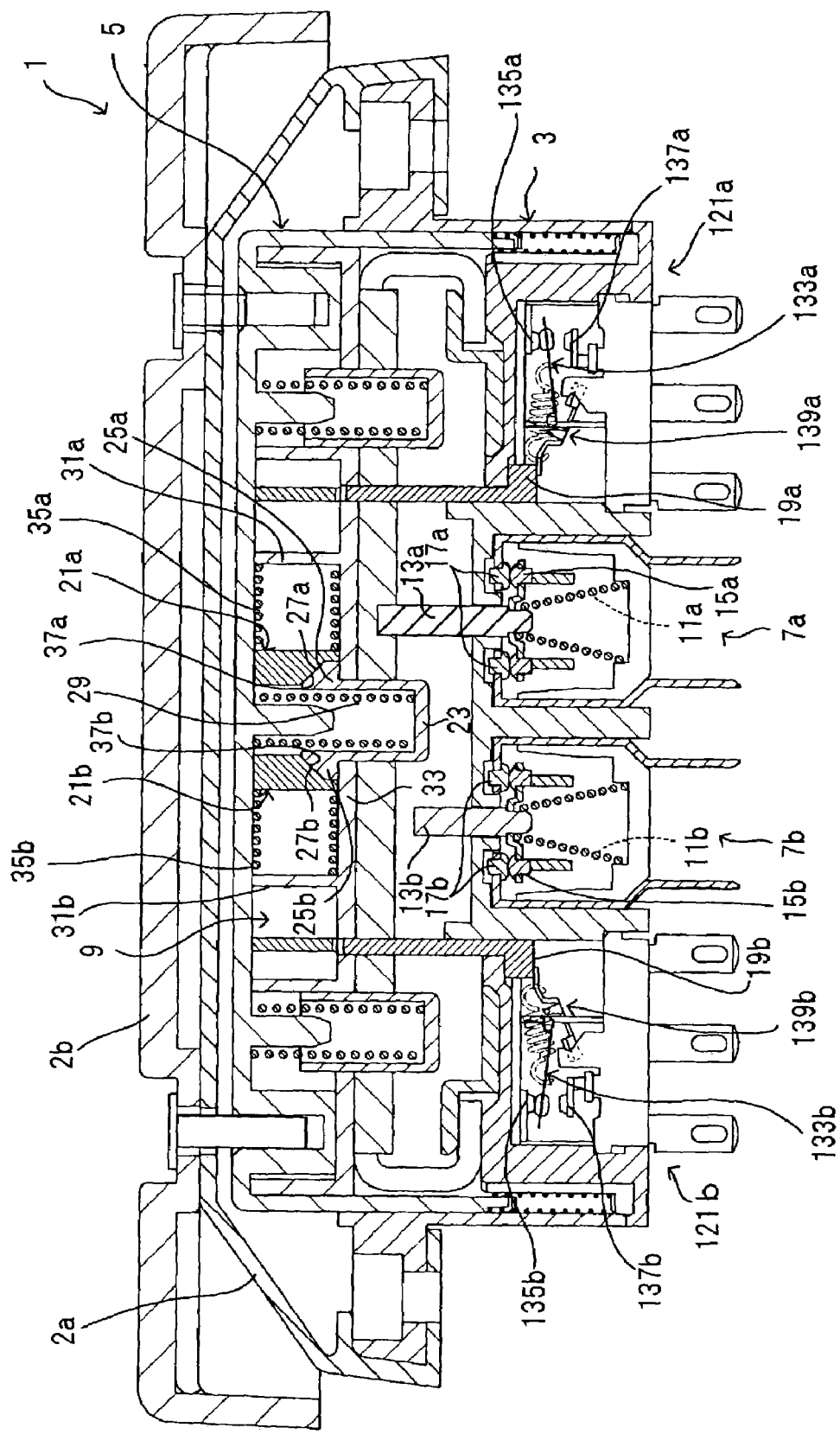
FIG. 5 is a sectional front elevation showing one state of a push-button switch according to a second embodiment of the present invention.
Figure 6:
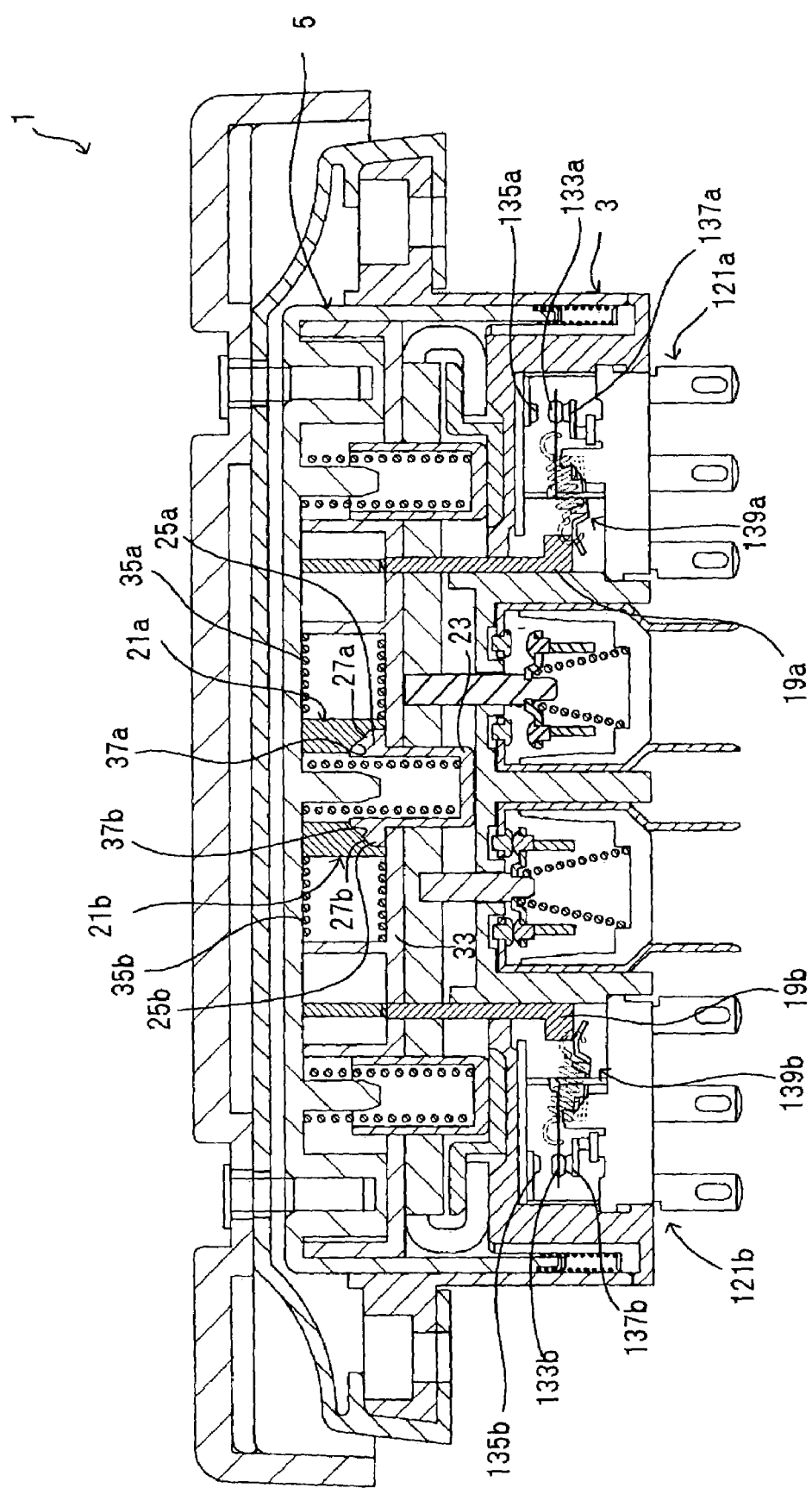
FIG. 6 is a sectional front elevation showing another state of the push-button switch according to the second embodiment hereof.
Figure 7:
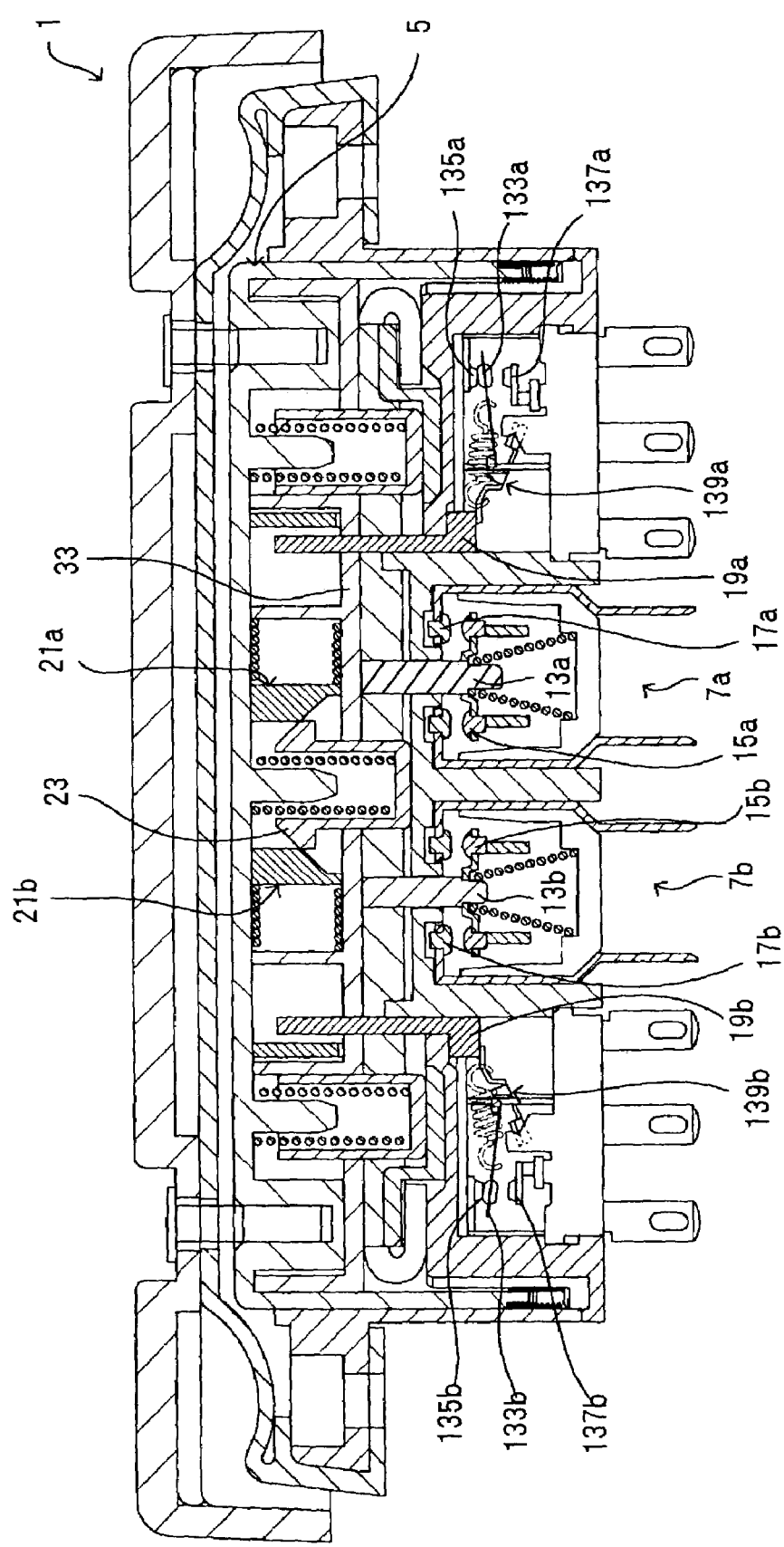
FIG. 7 is a sectional front elevation showing still another state of the push-button switch according to the second embodiment hereof.

A second embodiment of the present invention will be described with reference to FIGS. 5 to 11. FIGS. 5 to 7 are sectional front elevations each illustrating operations of a push-button switch in each different state, whereas FIGS. 8 to 11 are diagrams each illustrating circuit connections of a teaching pendant. In the figures, the same reference characters as those of the first embodiment described above represent identical or equivalent parts to those of the first embodiment, respectively.

In this embodiment, an essential configuration of the teaching pendant is substantially the same as that of the first embodiment and therefore, the following description principally discusses differences from the first embodiment so as to obviate redundant descriptions.

The teaching pendant of this embodiment differs from that of the first embodiment in the configuration of a push-button switch and a circuit connection configuration. In this embodiment, a rubber cover 2a and an external button 2b are mounted to a push button in a manner to cover the same for the purpose of improving the watertightness of the push-button switch, as shown in FIG. 5. However, the rubber cover 2a or the external button 2b is not necessarily provided.

As shown in FIG. 5, a push-button switch 1 is a three-position type switch which is adapted to be shifted from the first OFF state to the ON state and then to the second OFF state according to the increased press-down on the push button. The push-button switch 1 comprises a switch case 3 having a rectangular shape in plan; a push button 5 depressibly supported by the switch case 3; two normally close contacts 7a, 7b as auxiliary contacts and two c-contacts 121a, 121b disposed in the switch case 3; and a switching mechanism 9 disposed in the push button 5 and operatively associated with pressing-down on the push button 5 for switching the c-contacts 121a, 121b between an open position and a close position.

As seen in the figure, the two normally close contacts or the first normally close contact 7a and the second normally close contact 7b are located centrally downwardly of the switch case 3, whereas the pair of c-contacts 121a, 121b of the same configuration as in the first embodiment are disposed at opposite ends of the switch case as sandwiching the normally close contacts therebetween.

The normally close contacts 7a, 7b individually include a movable member 13a, 13b disposed in the switch case 3 and projecting toward the push button 5 (upwardly) as urged upward by a respective helical spring 11a, 11b disposed thereunder; a respective pair of movable terminals 15a, 15b attached to the movable member 13a, 13b; and a respective pair of stationary terminals 17a, 17b brought into or out of contact with the corresponding movable terminal 15a, 15b.

It is noted here that the movable member 13a of the first normally close contact 7a has a greater length than the movable member 13b of the second normally close contact 7b. In this case, instead of forming the movable member 13a of the first normally close contact 7a in the greater length, a projection may be provided so as to differentiate strokes of the movable member 13a of the first normally close contact 7a and the movable member 13b of the second normally close contact 7b. In an initial state, the movable members 13a, 13b are urged upward by the helical springs 11a, 11b so that the normally close contacts 7a, 7b are closed with the movable terminals 15a, 15b thereof contacting the stationary terminals 17a, 17b thereof.

The switching mechanism 9 comprises pressing pieces 19a, 19b for individually depressing operative members 139a, 139b of the c-contacts 121a, 121b; a pair of slide blocks 21a, 21b operatively associated with pressing-down on the push button 5 for pushing down the pressing pieces 19a, 19b; and a pressing shaft 23 engaged with the slide blocks 21a, 21b.

The pressing pieces 19a, 19b have a respective lower end thereof pressed against a respective end of the operative members 139a, 139b of the c-contacts 121a, 121b. The pressing shaft 23 is formed with a pair of flanges 25a, 25b at an upper end thereof, the flanges 25a, 25b each formed with a slope 27a, 27b at a lateral side thereof. The pressing shaft 23 has a hollow structure, such that a helical spring 29 anchored to an upper inside surface of the push button 5 has its lower end anchored to place in the pressing shaft 23.

The slide blocks 21a, 21b individually define therein a cavity vertically extended therethrough, through which each drooping member 31a, 31b is inserted. The drooping members 31a, 31b are located near the center of the push button 5. The slide blocks 21a, 21b are horizontally movably disposed in a space defined by a pressure plate 33 disposed in the push button 5 and the upper inside surface of the push button 5. The slide blocks 21a, 21b are urged toward the center of the push button 5 by means of helical springs 35a, 35b interposed between a respective one end of the slide blocks 21a, 21b and the respective drooping member 31a, 31b.

The slide blocks 21a, 21b are formed with slopes 37a, 37b at the respective one end thereof, the slopes 37a, 37b engaged with the corresponding slopes 27a, 27b at the flanges 25a, 25b of the pressing shaft 23. The other ends of the slide blocks 21a, 21b are adapted to abut against upper ends of the pressing pieces 19a, 19b.

When the push button 5 of the push-button switch 1 in the initial state or the first OFF state shown in FIG. 5 is depressed, the pressing pieces 19a, 19b are operatively associated with the pressing-down on the push button 5 to push down the operative members 139a, 139b of the c-contacts 121a, 121b, as shown in FIG. 6. Hence, the movable terminals 133a, 133b are moved away from the normally close stationary terminals 135a, 135b to come into contact with the normally open stationary terminals 137a, 137b, so that the push-button switch 1 is shifted to the ON state. At this time, the first normally close contact 7a is opened with the movable member 13a thereof pushed down by the pressing plate 33. Therefore, the shift from the first OFF state to the ON state of the push-button switch 1 can be determined by monitoring the open/close state of the first normally close contact 7a.

When the push button 5 of the push-button switch 1 in the ON state is further depressed, the slopes 37a, 37b of the slide blocks 21a, 21b slide on the slopes 27a, 27b of the pressing shaft 23 so that the slide blocks 21a, 21b are moved outwardly relative to the push button 5, as shown in FIG. 7. The movement releases the abutment relation between the individual other ends of the slide blocks 21a, 21b and the individual upper ends of the pressing pieces 19a, 19b. Hence, the pressing pieces 19a, 19b are moved upward to release the pressure on the operative members 139a, 139b so that the movable terminals 133a, 133b are moved away from the normally open stationary terminals 137a, 137b to come into contact with the normally close stationary terminals 135a, 135b. Thus, the push-button switch 1 in the ON state is shifted to the second OFF state.

At this time, the second normally close contact 7b is opened with the movable member 13b thereof pushed down by the pressing plate 33. Thus, that the shift from the ON state to the second OFF state of the push-button switch 1 can be determined by monitoring the open/close state of the second normally close contact 7b.

Next, description will be made on the circuit connections of the teaching pendant according to this embodiment.

Figure 8:
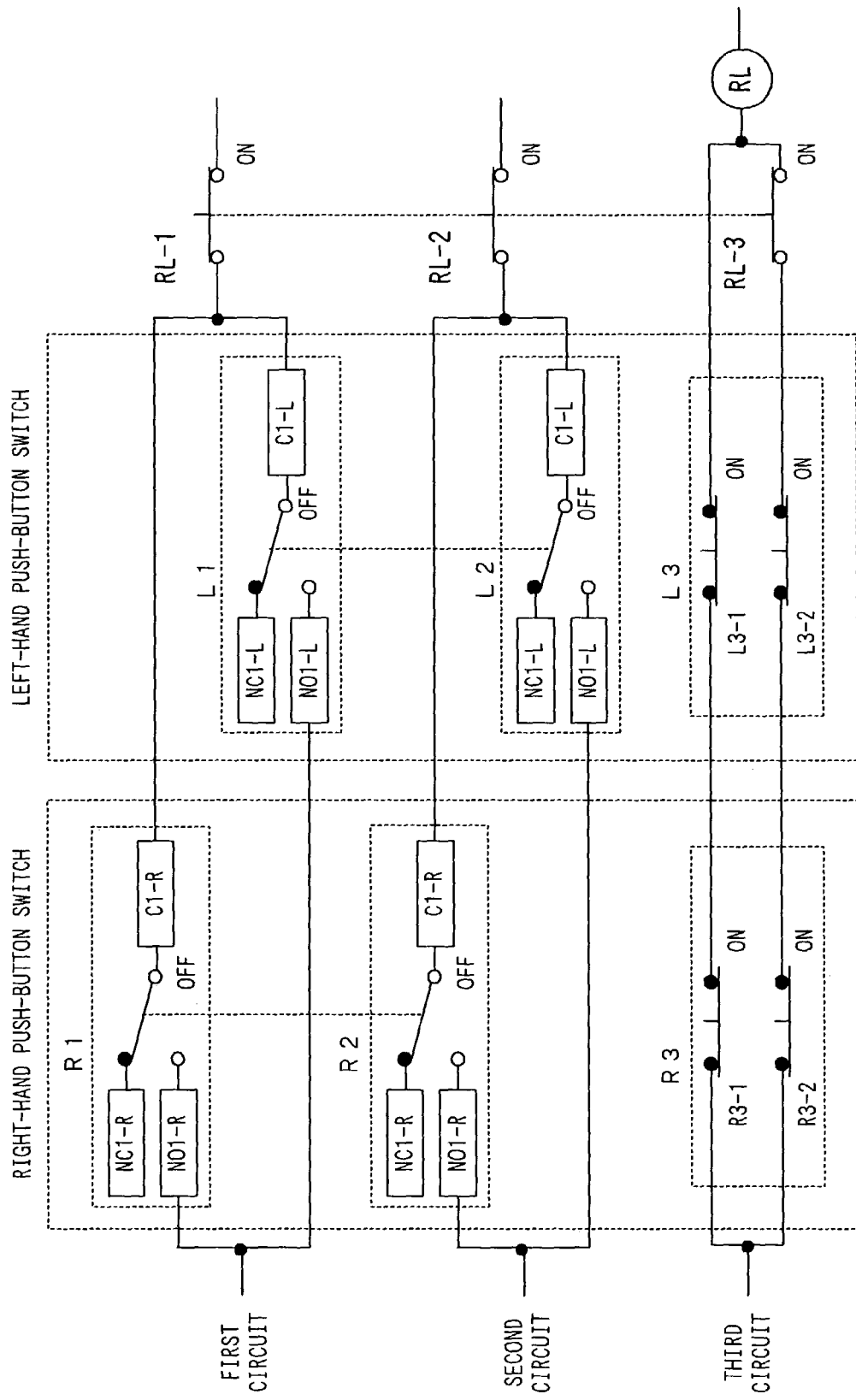
FIG. 8 is a circuit connection diagram illustrative of operations of the second embodiment hereof.

As shown in FIG. 8, the teaching pendant comprises three circuits including a first, a second and a third circuit, and a relay RL including three normally open contacts.

In the first circuit, one R1 of the c-contacts of the right-hand push-button switch is connected in parallel with one L1 of the c-contacts of the left-hand push-button switch to form a first parallel circuit, which is connected in series with a first normally close contact RL-1 of the relay RL.

In the second circuit, the other c-contact R2 of the right-hand push-button switch is connected in parallel with the other c-contact L2 of the left-hand push-button switch to form a second parallel circuit, which is connected in series with a second normally close contact RL-2 of the relay RL.

In the third circuit, a first normally close contact R3-1 of the right-hand push-button switch is connected in series with a first normally close contact L3-1 of the left-hand push-button switch to form a first series circuit, which is connected in parallel with a second series circuit wherein a second normally close contact R3-2 of the right-hand push-button switch, a second normally close contact L3-2 of the left-hand push-button switch and a third normally open contact of the relay RL are connected in series. The third circuit is connected in series with the relay RL, a coil of which is electrically energized by the close state of the first series circuit. It is noted here that R3-1 and L3-1 represent the first normally close contact 7a constituting the right-hand and the left-hand push-button switch, respectively, whereas R3-2 and L3-2 represent the second normally close contact 7b constituting the right-hand and the left-hand push-button switch, respectively. The relay RL is equivalent to a fourth relay of the present invention.

Next, operations of the teaching pendant according to the embodiment will be described with reference to FIGS. 8 to 11.

Figure 9:
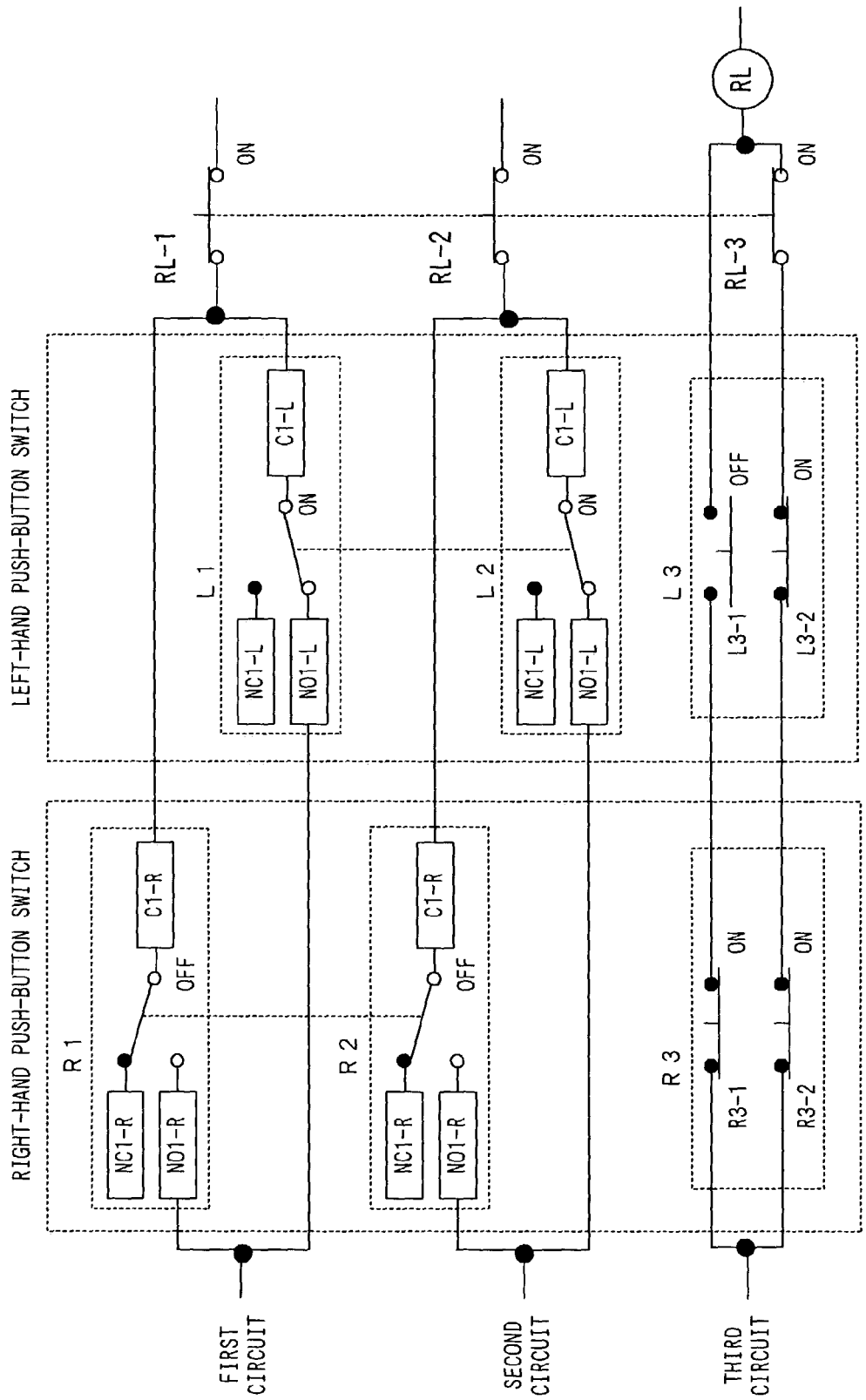
FIG. 9 is a circuit connection diagram illustrative of the operations of the second embodiment hereof.

When the left-hand push-button switch in the initial state (undepressed) shown in FIG. 8 is shifted to the ON state, the two c-contacts L1, L2 of the left-hand push-button switch are switched ON while the first normally close contact L3-1 is switched OFF (opened), as shown in FIG. 9. However, the relay RL of self-holding configuration is electrically energized so that the first, second and third circuits are maintained in conduction. Thus, the operator is allowed to perform the teaching operation to the industrial machine such as the industrial robot.

Figure 10:
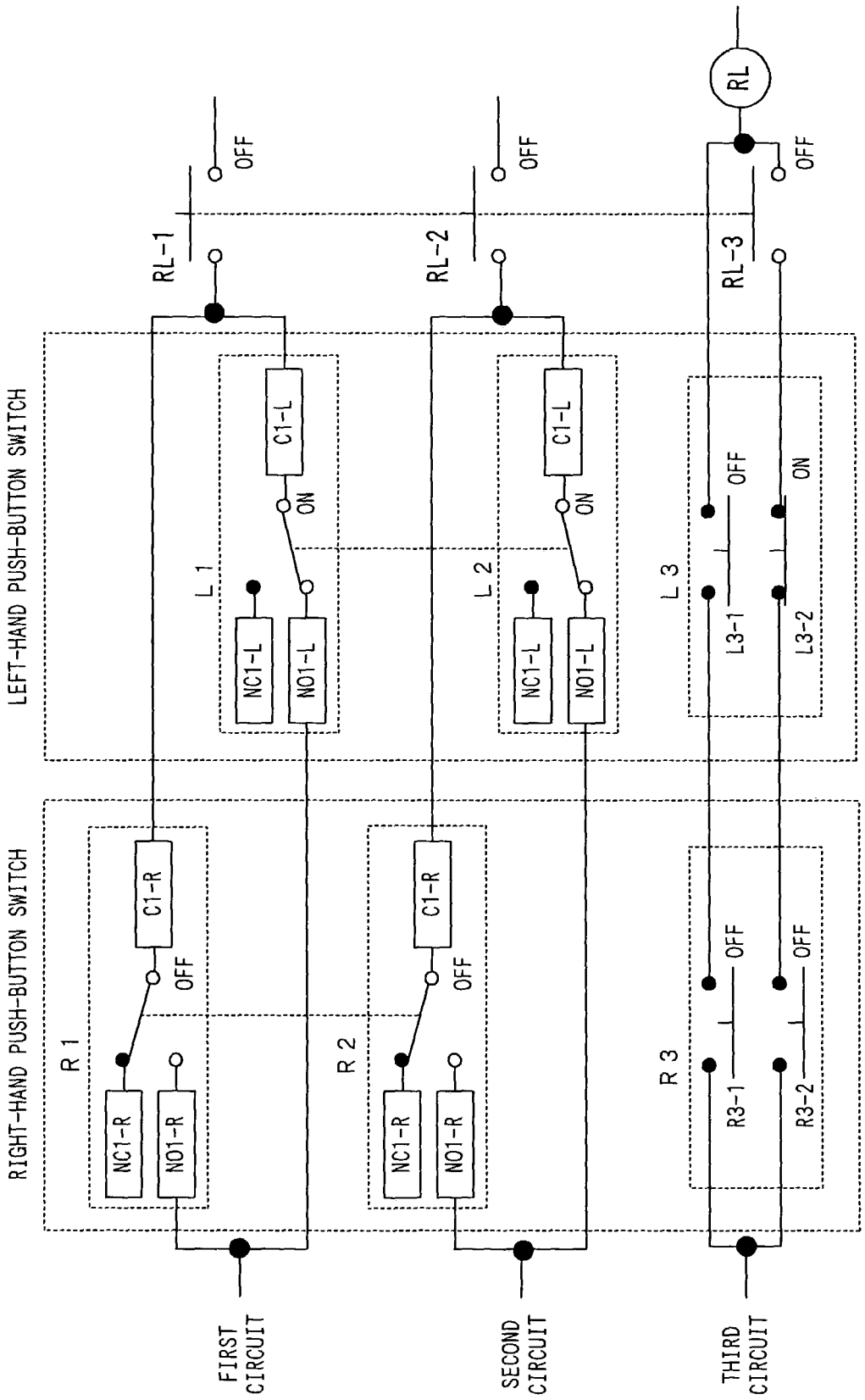
FIG. 10 is a circuit connection diagram illustrative of the operations of the second embodiment hereof.

If, in this state, the operator being aware of any potential danger shifts the right-hand push-button switch to the second OFF state by depressing the same, the third circuit is cut off because the first and second normally close contacts R3-1, R3-2 of the right-hand push-button switch in the third circuit are switched OFF, as shown in FIG. 10. Hence, the relay RL is electrically de-energized. Accordingly, the first to the third normally open contacts RL-1 to RL-3 of the relay RL are switched OFF so that the first and second circuits are cut off. Thus, the teaching pendant 101 is disabled for teaching operation.

Figure 11:
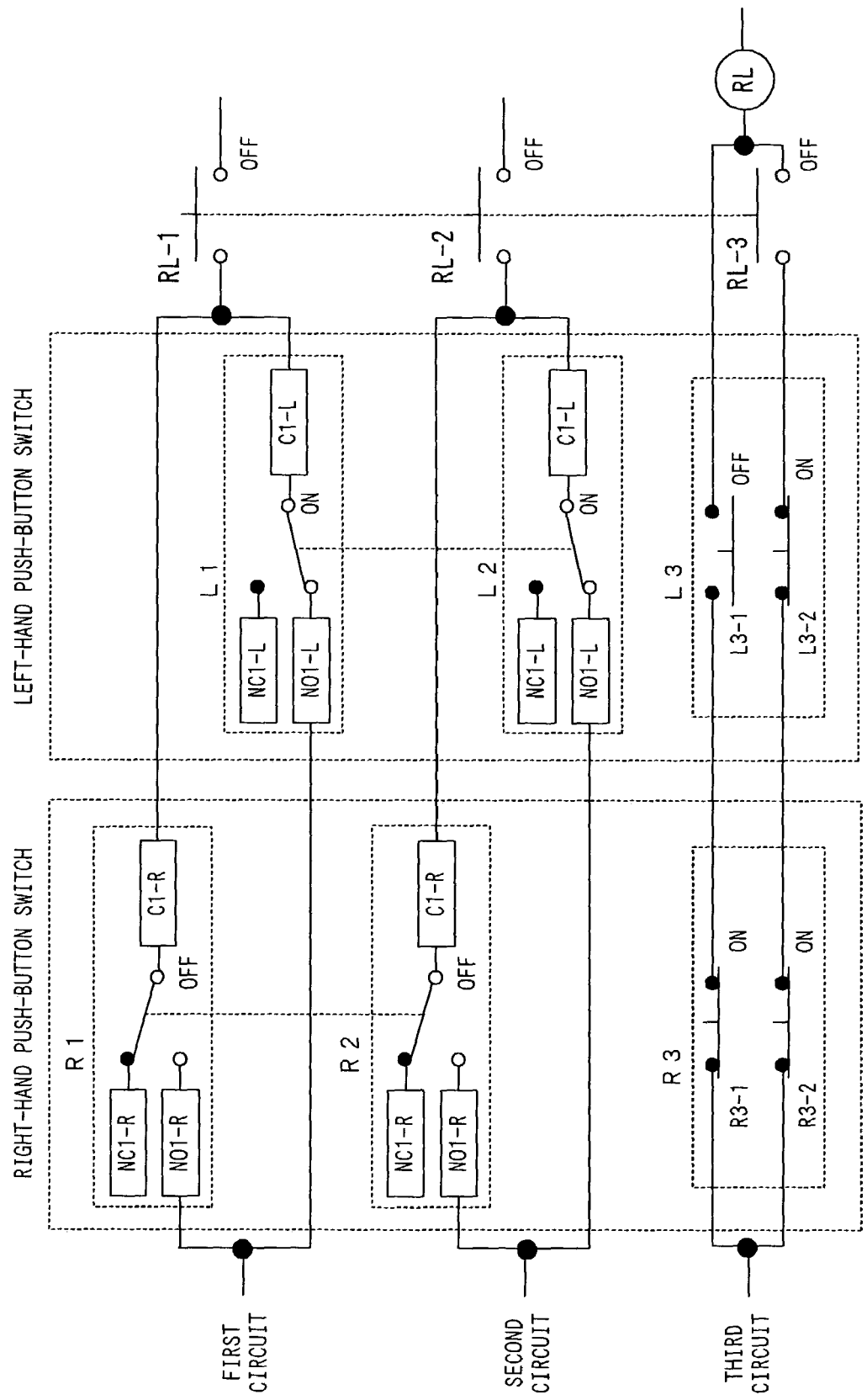
FIG. 11 is a circuit connection diagram illustrative of the operations of the second embodiment hereof.

In a case where, as shown in FIG. 11, the right-hand push-button switch is returned to the first OFF state by decreasing the pressure thereon while the left-hand push-button switch is maintained in the ON state, the first normally close contact R3-1 and the second normally close contact R3-2 of the right-hand push-button switch are sequentially switched ON, but the third normally close contact RL-3 of the relay RL and the first normally close contact L3-1 of the left-hand push-button switch are OFF. Hence, the third circuit is cutoff while the relay RL stays electrically de-energized. Accordingly, the first and second circuits are maintained in the cutoff state so that the left-hand push-button switch in the ON state is disabled.

If, in this state, the left-hand push-button switch is returned to the first OFF state by decreasing the pressure thereon, the first, second and third circuits are brought into conduction, as shown in FIG. 8. Thus, switching ON either of the push-button switches in this state enables the teaching operation to the industrial machine such as the industrial robot.

According to the second embodiment described above, the first normally close contact L3-1 of the left-hand push-button switch may be switched OFF by shifting the left-hand push-button switch to the ON state, for example. If, in this state, the right-hand push-button switch is shifted to the second OFF state, the two normally close contacts R3-1 and R3-2 thereof are switched OFF. Therefore, the third circuit is opened so that the relay RL is electrically de-energized. This drives the first, second and third circuits into cutoff.

Accordingly, the left-hand push-button switch in the ON state is disabled even though the right-hand push-button switch in the second OFF state is returned to the first OFF state. Thus, the teaching pendant 101 cannot be enabled for teaching operation before both of the push-button switches are returned to the first OFF state. Thus, the safety of the teaching pendant 101 can be enhanced.

Figure 12:
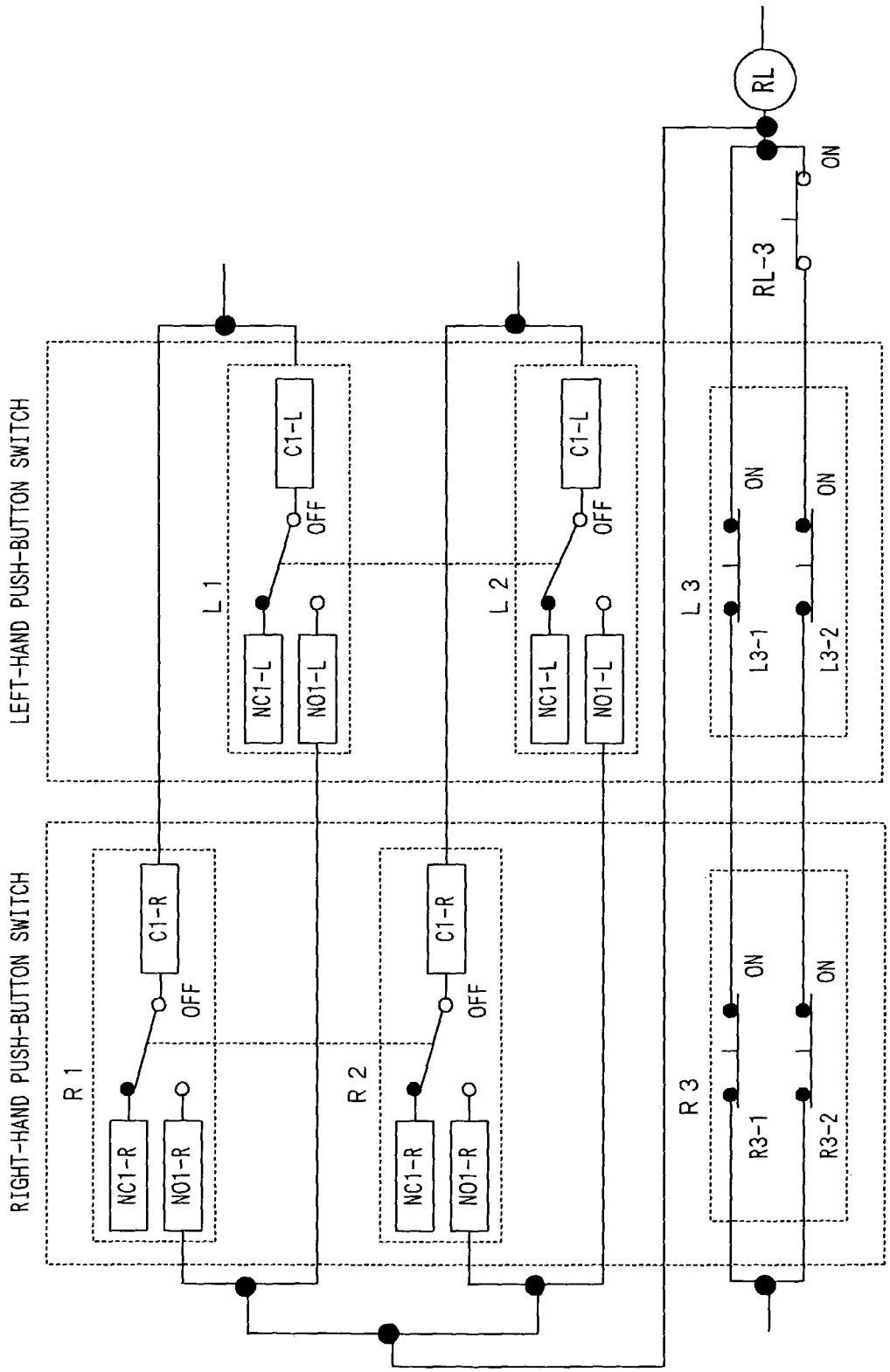
FIG. 12 is a diagram showing an exemplary modification of the circuit connections of the second embodiment hereof.

In the second embodiment described above, the first, the second and the third circuits are independently provided. In an alternative approach as shown in FIG. 12, the teaching pendant 101 may have a single circuit configuration wherein the first and the second circuits in parallel connection are connected in series with the third circuit, whereas the first and the second normally open contacts of the relay connected with the first and the second circuits are removed.

In such a single circuit configuration, once either one of the push-button switches is shifted to the second OFF state, the third normally close contact RL-3 of the relay RL is switched OFF thereby driving the first and the second parallel circuits into cutoff. As a result, this single circuit configuration can naturally achieve the same effect as the above teaching pendant of the three circuit configuration. Furthermore, this circuit configuration reduces the number of normally close contacts of the relay, thus contributing to a simplified structure and cost reduction of the teaching pendant. The relay RL in this single circuit configuration is equivalent to a fifth relay of the present invention.

(Third Embodiment)

A third embodiment of the present invention will be described with reference to FIGS. 13 to 17, which are diagrams each illustrating circuit connections of a teaching pendant. In the figures, the same reference characters as those of the second embodiment described above represent identical or equivalent parts to those of the second embodiment, respectively.

In this embodiment, an essential configuration of a push-button switch is substantially the same as that of the second embodiment and hence, the following description principally discusses differences from the second embodiment so as to obviate redundant descriptions.

Figure 13:
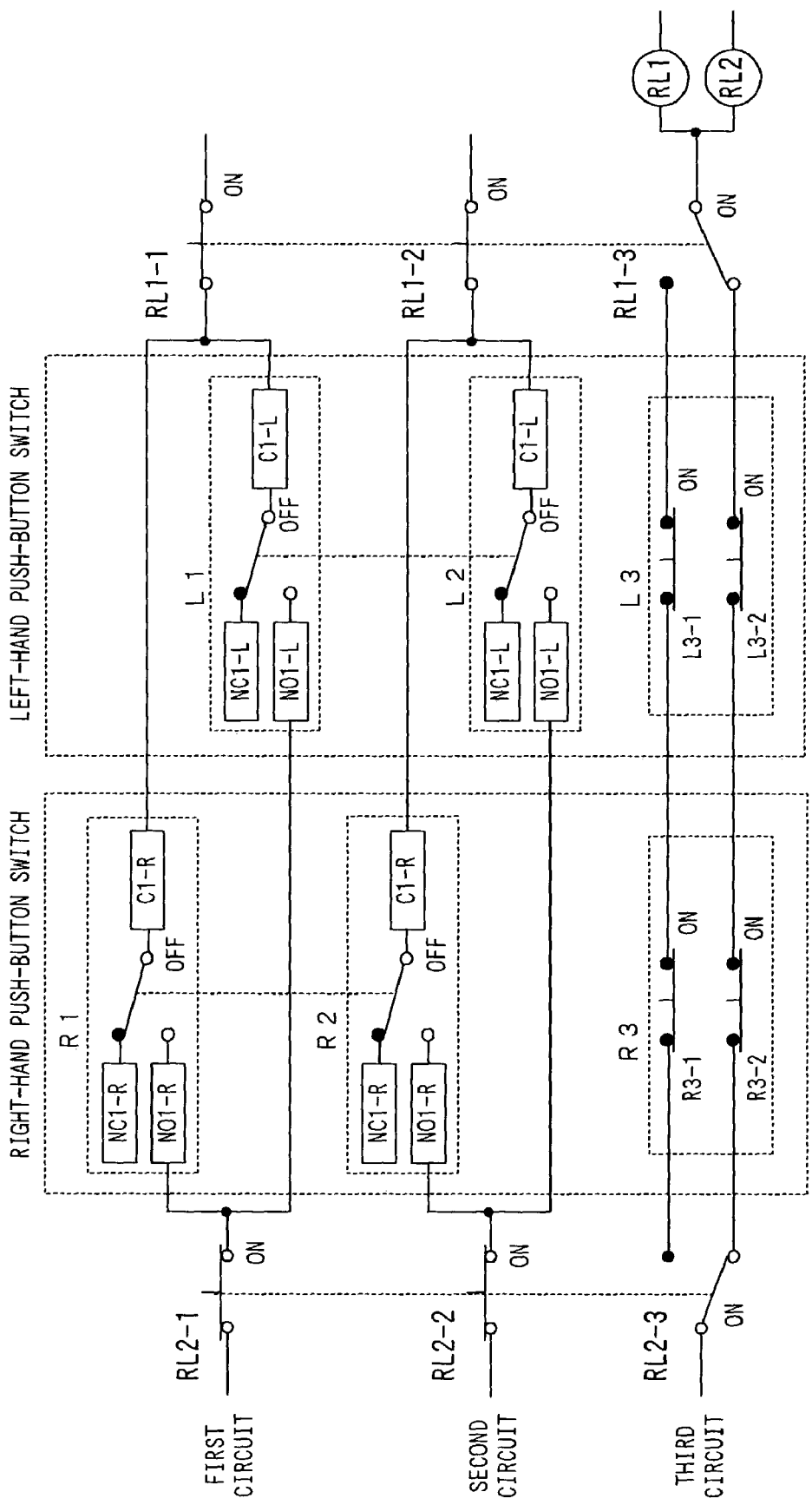
FIG. 13 is a circuit connection diagram illustrative of operations of a third embodiment of the present invention.

As shown in FIG. 13, the teaching pendant of this embodiment differs from the second embodiment in the circuit connections of the push-button switch.

As shown in FIG. 13, the teaching pendant 101 comprises three circuits including a first, a second and a third circuit, and a first relay RL1 and a second relay RL2 each including a first and second normally open contacts and a c-contact.

In the first circuit, one R1 of the c-contacts of the right-hand push-button switch is connected in parallel with one L1 of the c-contacts of the left-hand push-button switch to form a first parallel circuit, opposite ends of which are connected in series with the first normally open contact RL1-1 of the first relay RL1 and the first normally open contact RL2-1 of the second relay RL2, respectively.

In the second circuit, the other c-contact R2 of the right-hand push-button switch is connected in parallel with the other c-contact L2 of the left-hand push-button switch to form a second parallel circuit, opposite ends of which are connected in series with the second normally open contact RL1-2 of the first relay RL1 and the second normally open contact RL2-2 of the second relay RL2, respectively.

The third circuit includes a first series circuit wherein the first normally close contact R3-1 of the right-hand push-button switch is connected in series with the first normally close contact L3-1 of the left-hand push-button switch, and a second series circuit wherein the second normally close contact R3-2 of the right-hand push-button switch is connected in series with the second normally close contact L3-2 of the left-hand push-button switch. A normally close terminal of a c-contact RL1-3 of the first relay RL1 and a normally close terminal of a c-contact RL2-3 of the second relay RL2 are connected with opposite ends of the first series circuit, respectively. On the other hand, a normally open terminal of the c-contact RL1-3 of the first relay RL1 and a normally open terminal of the c-contact RL2-3 of the second relay RL2 are connected with opposite ends of the second series circuit, respectively. In the third circuit, the first relay RL1 and the second relay RL2 in parallel connection are connected in series with a common terminal for the c-contact RL1-3 of the first relay RL1. It is noted here that the first relay RL1 and the second relay RL2 are equivalent to a sixth relay and a seventh relay of the present invention.

In the initial state, the first relay RL1 and the second relay RL2 of the self-holding configuration are electrically energized so that the normally open contacts RL1-1, RL1-2, RL2-1, RL2-2 and the c-contacts RL1-3, RL2-3 of the relays RL1, RL2 are ON.

Next, operations of the teaching pendant of this embodiment will be described with reference to FIGS. 13 to 16.

Figure 14:
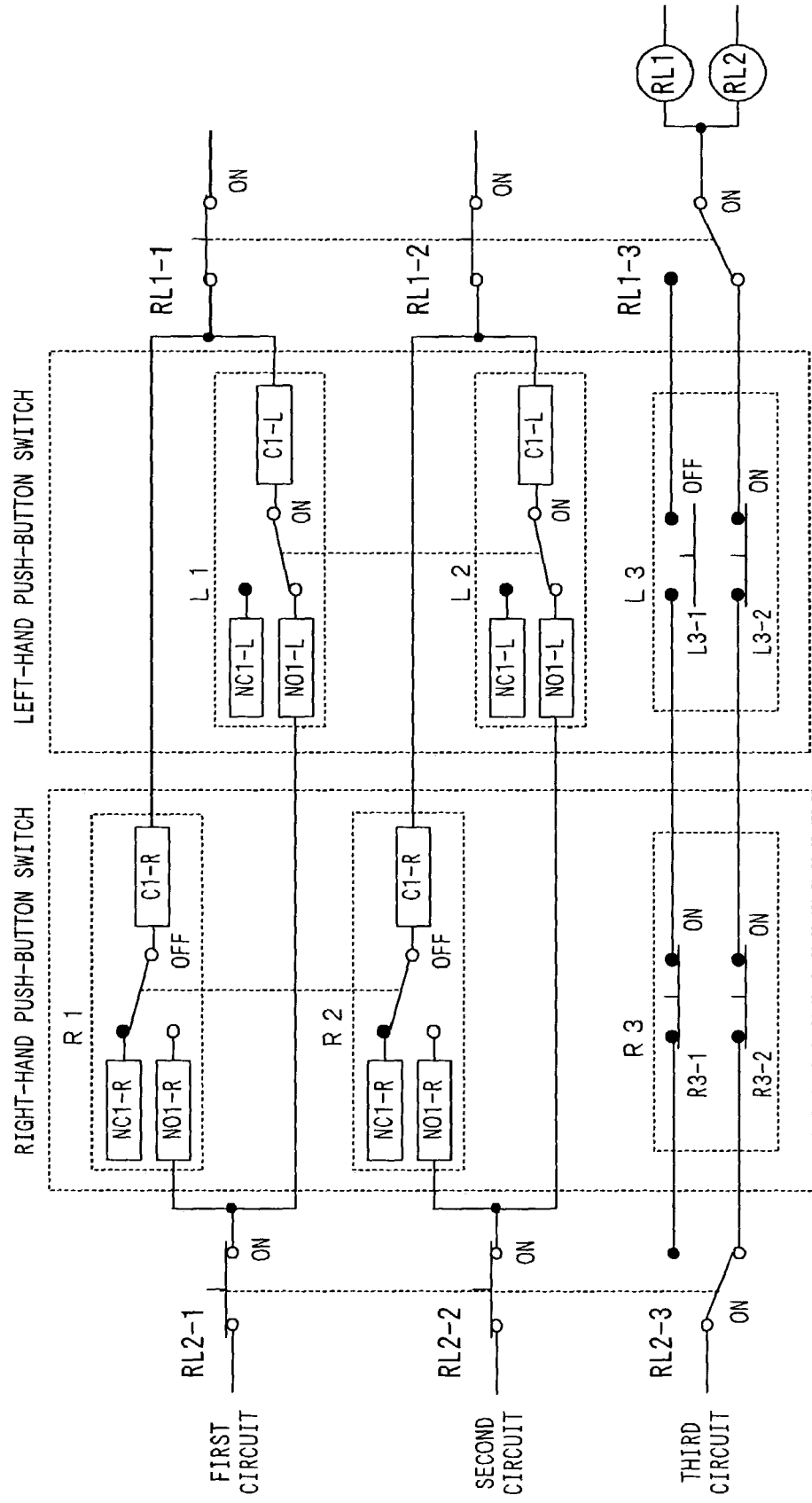
FIG. 14 is a circuit connection diagram illustrative of the operations of the third embodiment hereof.

When the left-hand push-button switch in the initial state (undepressed) shown in FIG. 13 is shifted to the ON state, the two c-contacts L1, L2 of the left-hand push-button switch are switched ON while the first normally close contact L3-1 thereof is switched OFF (opened), as shown in FIG. 14. However, the first relay RL1 and the second relay RL2 of the self-holding configuration are electrically energized so that the first, second and third circuits are maintained in conduction. Thus, the operator is allowed to perform the teaching operation to the industrial machine such as the industrial robot.

Figure 15:
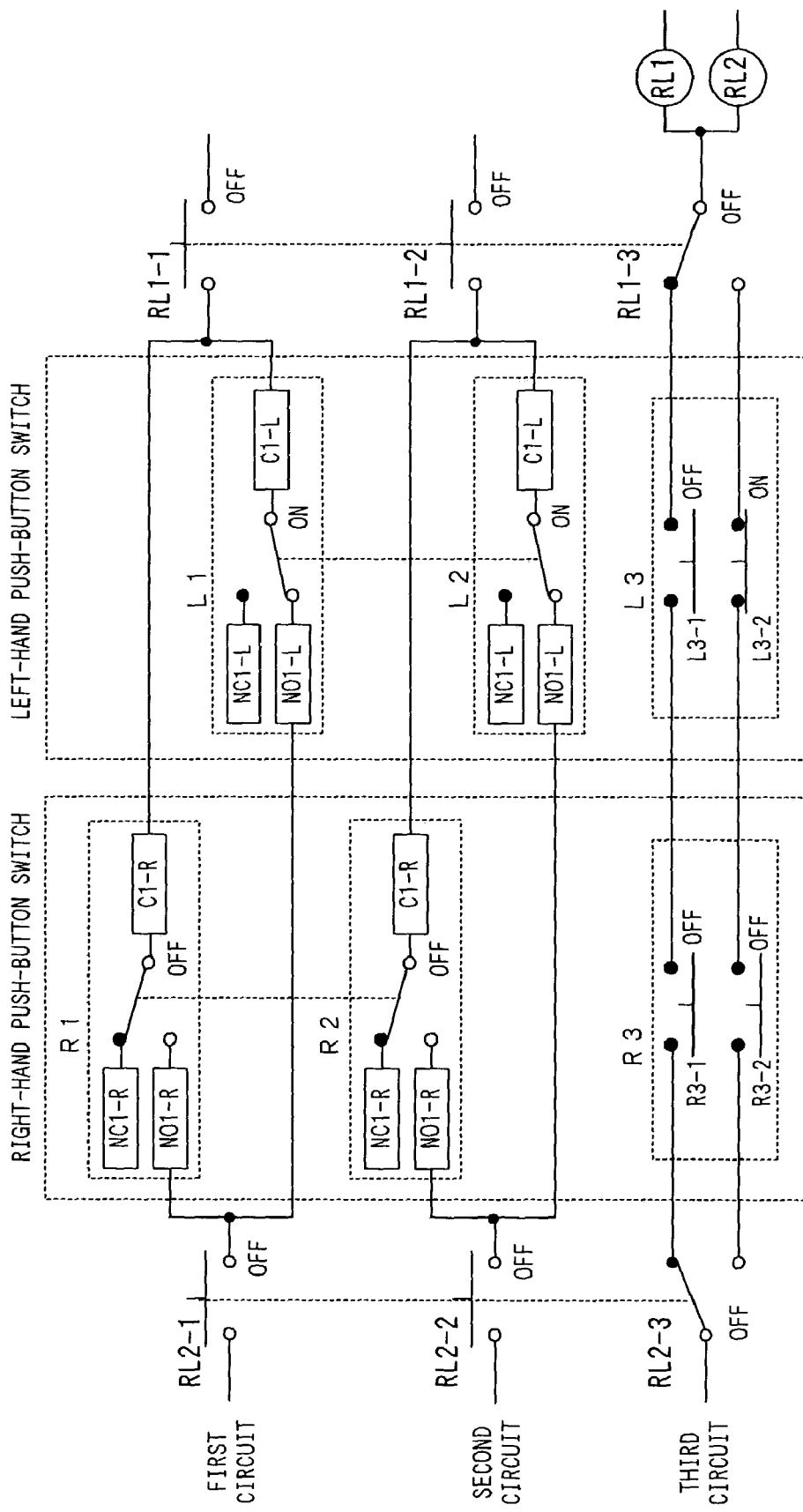
FIG. 15 is a circuit connection diagram illustrative of the operations of the third embodiment hereof.

If, in this state, the operator being aware of any potential danger shifts the right-hand push-button switch to the second OFF state, the third circuit is driven into cutoff because, as shown in FIG. 15, the first and second normally close contacts R3-1, R3-2 of the right-hand push-button switch in the third circuit are switched OFF. Hence, the first relay RL1 and the second relay RL2 are electrically de-energized. Accordingly, the two normally open contacts RL1-1, RL1-2 and the c-contact RL1-3 of the first relay RL1 and the two normally open contacts RL2-1, RL2-2 and the c-contact RL2-3 of the second relay RL2 are switched OFF so that the first and second circuits are cut off. Thus, the teaching pendant is disabled for teaching operation.

Figure 16:
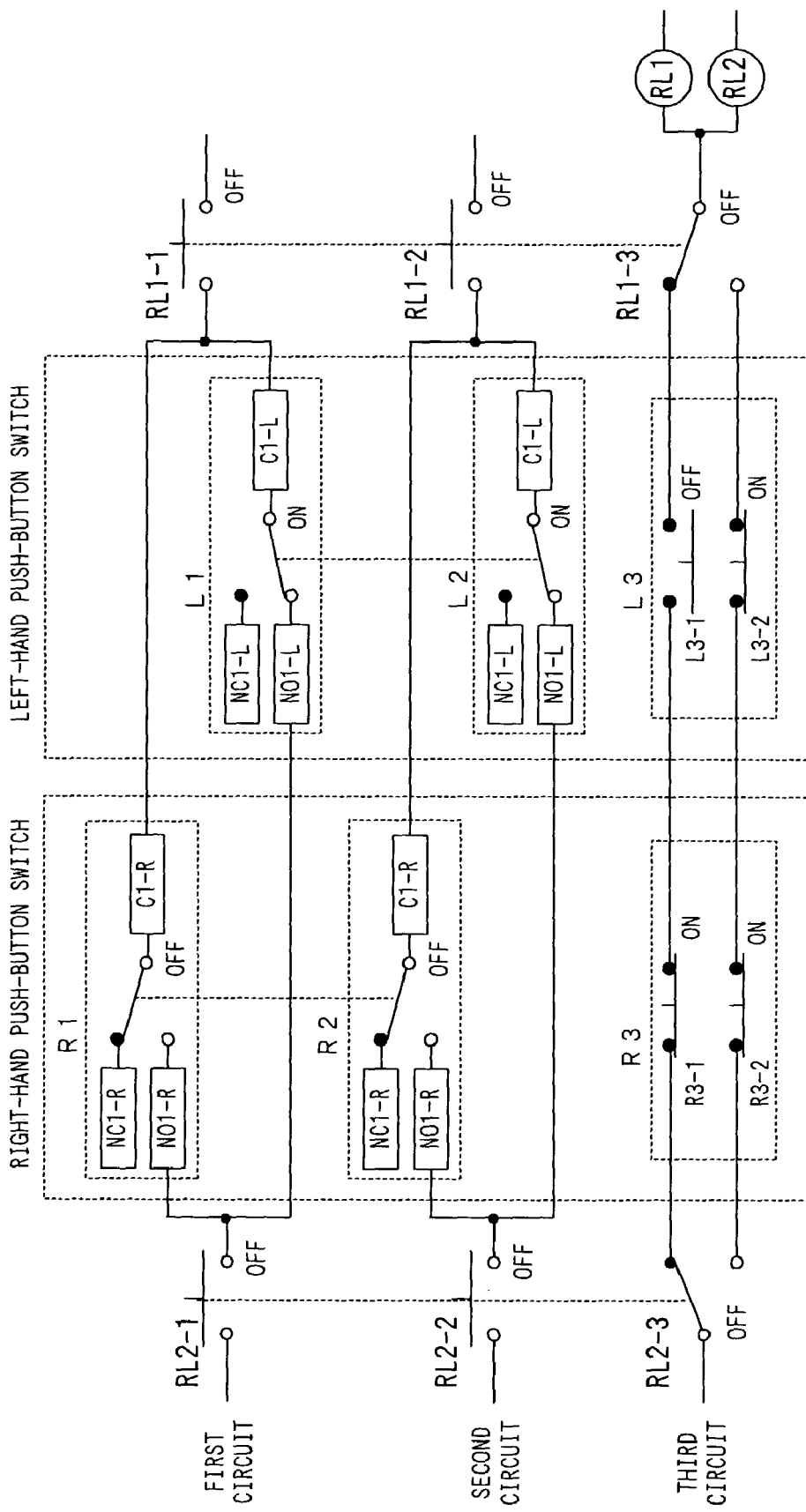
FIG. 16 is a circuit connection diagram illustrative of the operations of the third embodiment hereof.

In a case where, as shown in FIG. 16, the right-hand push-button switch is returned to the first OFF state by decreasing the pressure thereon while the left-hand push-button switch is maintained in the ON state, the first normally close contact R3-1 and the second normally close contact R3-2 of the right-hand push-button switch are sequentially switched ON, but the first normally close contact L3-1 of the left-hand push-button switch is OFF. Hence, the first and second relays RL1, RL2 stay electrically de-energized so that the first and second circuits are maintained in the cutoff state. Thus, the left-hand push-button switch in the ON state is disabled.

If, in this state, the left-hand push-button switch is returned to the first OFF state by decreasing the pressure thereon, the first, second and third circuits are brought into conduction, as shown in FIG. 13, wherein switching ON either of the push-button switches enables the teaching operation to the industrial machine such as the industrial robot.

According to the third embodiment described above, the same effect as the second embodiment can naturally be obtained and in addition, the following effect can also be attained.

Figure 17:
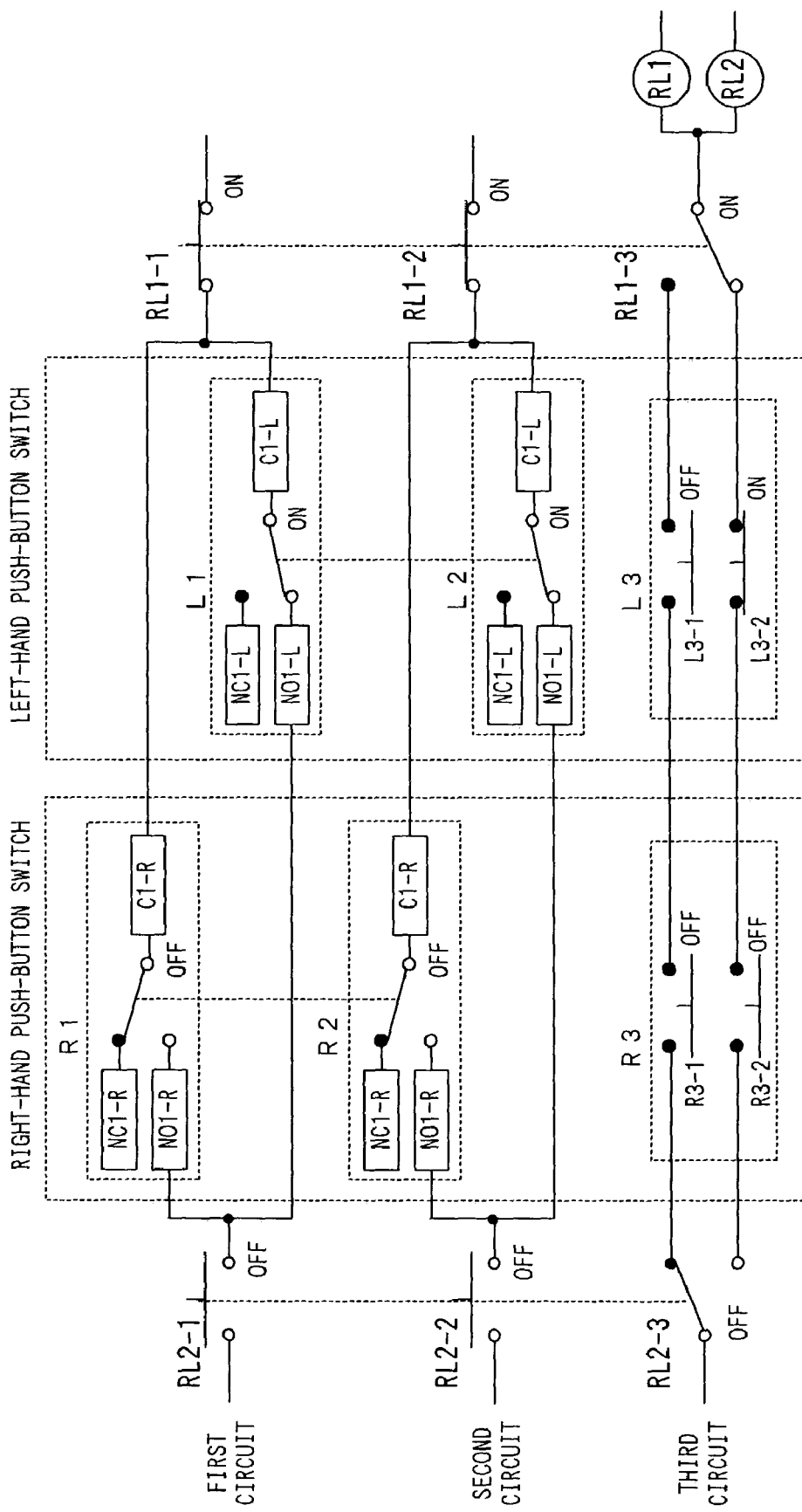
FIG. 17 is a circuit connection diagram illustrative of the operations of the third embodiment hereof.

In the event that the normally open contacts RL1-1, RL1-2 and the c-contact RL1-3 of the first relay RL1 are fused during the ON state of the left-hand push-button switch, for example, these contacts stay in the ON state even though the first and second relays are electrically de-energized by shifting the right-hand push-button switch to the second OFF state, as shown in FIG. 17. At this time, however, the second relay RL2 is electrically de-energized so that the normally open contacts RL2-1, RL2-2 and the c-contact RL2-3 of the second relay RL2 are OFF. Thus, the first to third circuits are cut off. Accordingly, the left-hand push-button switch in the ON state is disabled even if the right-hand push-button switch is returned to the first OFF state. Thus, the teaching pendant 101 is prevented from being enabled for teaching operation.

Figure 18:
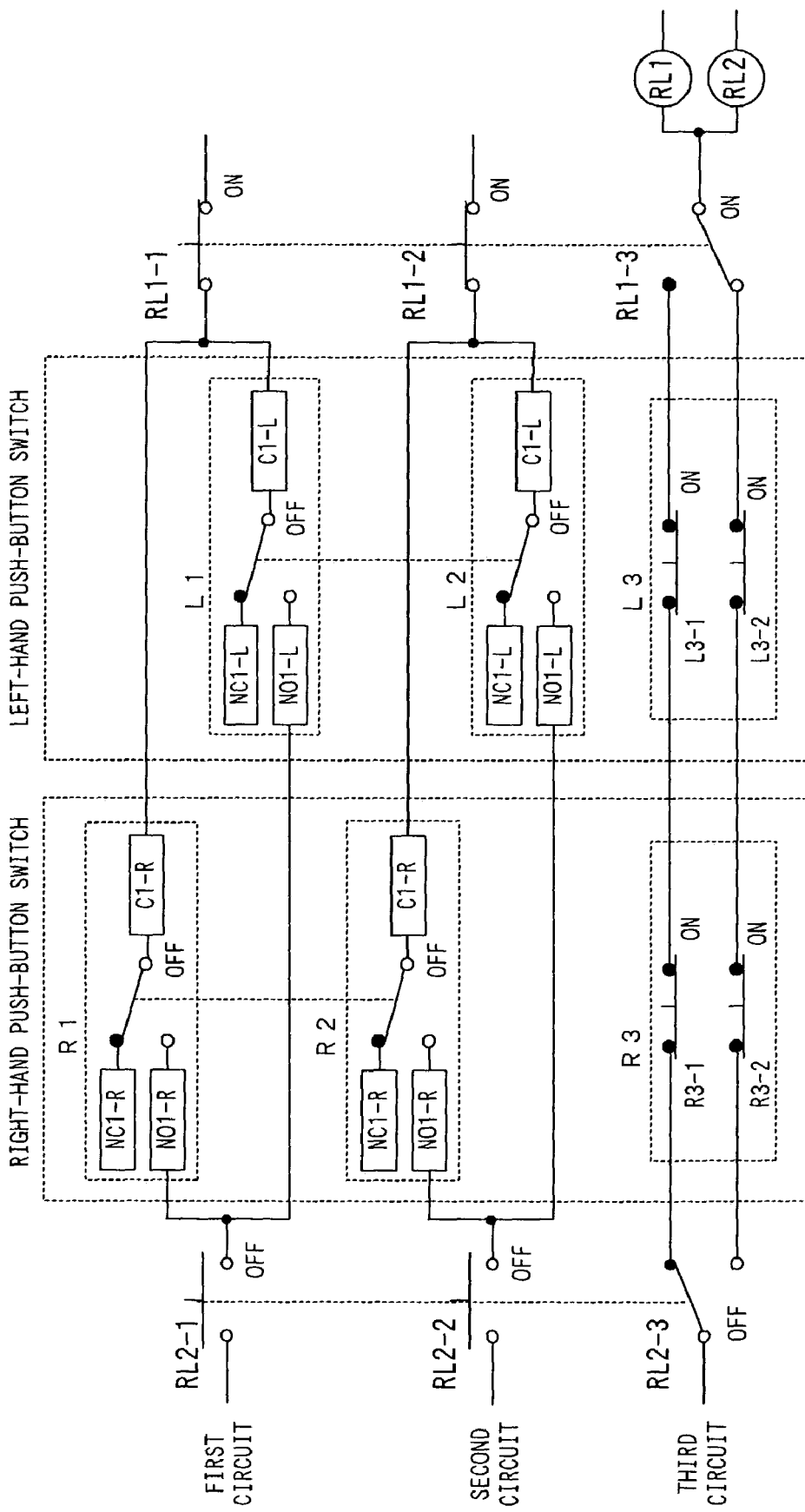
FIG. 18 is a circuit connection diagram illustrative of the operations of the third embodiment hereof.

If, in this state, both the left-hand and right-hand push-button switches are returned to the first OFF state by decreasing the pressure thereon, the first relay RL1 and the second relay RL2 of the self-holding configuration are not electrically energized because the c-contact RL1-3 of the first relay RL1 is fused to stay in the ON state, as shown in FIG. 18. Hence, the c-contact RL2-3 of the second relay RL2 is maintained in the OFF state, thus holding the third circuit in the cutoff state. Therefore, even if the push-button switch in this state is pressed ON, the teaching pendant 101 cannot be enabled for teaching operation because of the disconnected third circuit.

In the event of either one of the relays suffering fused contacts, the above arrangement prevents the teaching pendant from being enabled for teaching operation in spite of both the push-button switches returned to the first OFF state. Thus, the arrangement provides for an easy determination of any failed contact, resulting in further enhanced safety of the teaching pendant.

Figure 19:
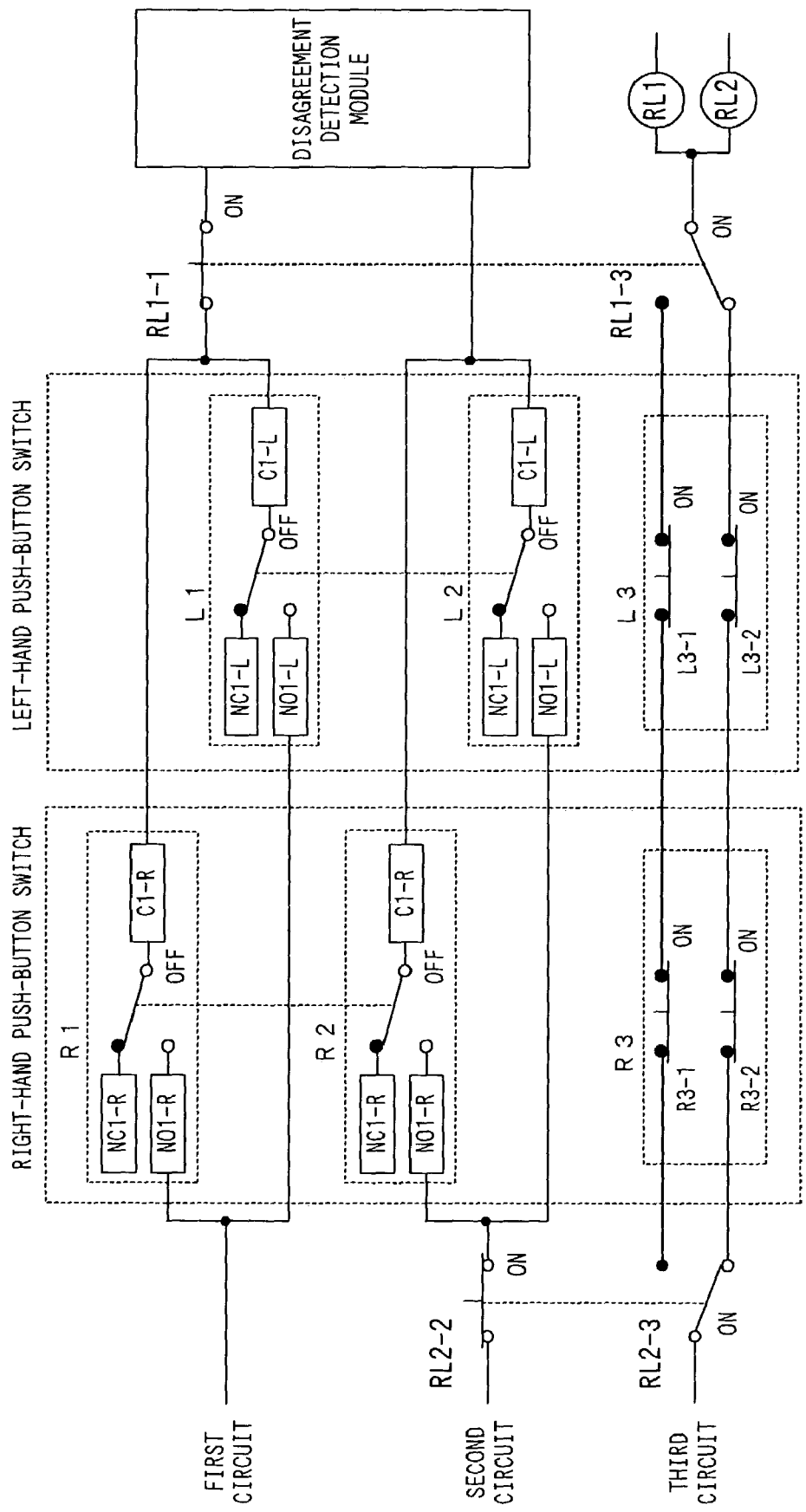
FIG. 19 is a diagram showing an exemplary modification of the circuit connections of the third embodiment hereof.

As shown in FIG. 19, an alternative arrangement may be made such that only one normally open contact is connected with the first circuit and the second circuit, respectively, whereas a disagreement detection module is provided for detecting disagreement between open/close positions of the first circuit and second circuits. This arrangement can naturally obtain the same effect as the foregoing embodiments and besides, permits the first and second circuits to be monitored for easy detection of disagreement in the open/close positions, or in other words, the occurrence of any fused contact in either of the circuits. Furthermore, the normally open contacts of the relays are decreased.

(Fourth Embodiment)

A fourth embodiment of the present invention will be described with reference to FIGS. 20 to 23, which are diagrams each showing circuit connections of a teaching pendant. In the figures, the same reference characters as those of the second embodiment described above represent identical or equivalent parts, respectively.

Since an essential configuration of a push-button switch of this embodiment is substantially the same as that of the second embodiment, the following description principally discusses differences from the second embodiment so as to obviate redundant descriptions.

Figure 20:
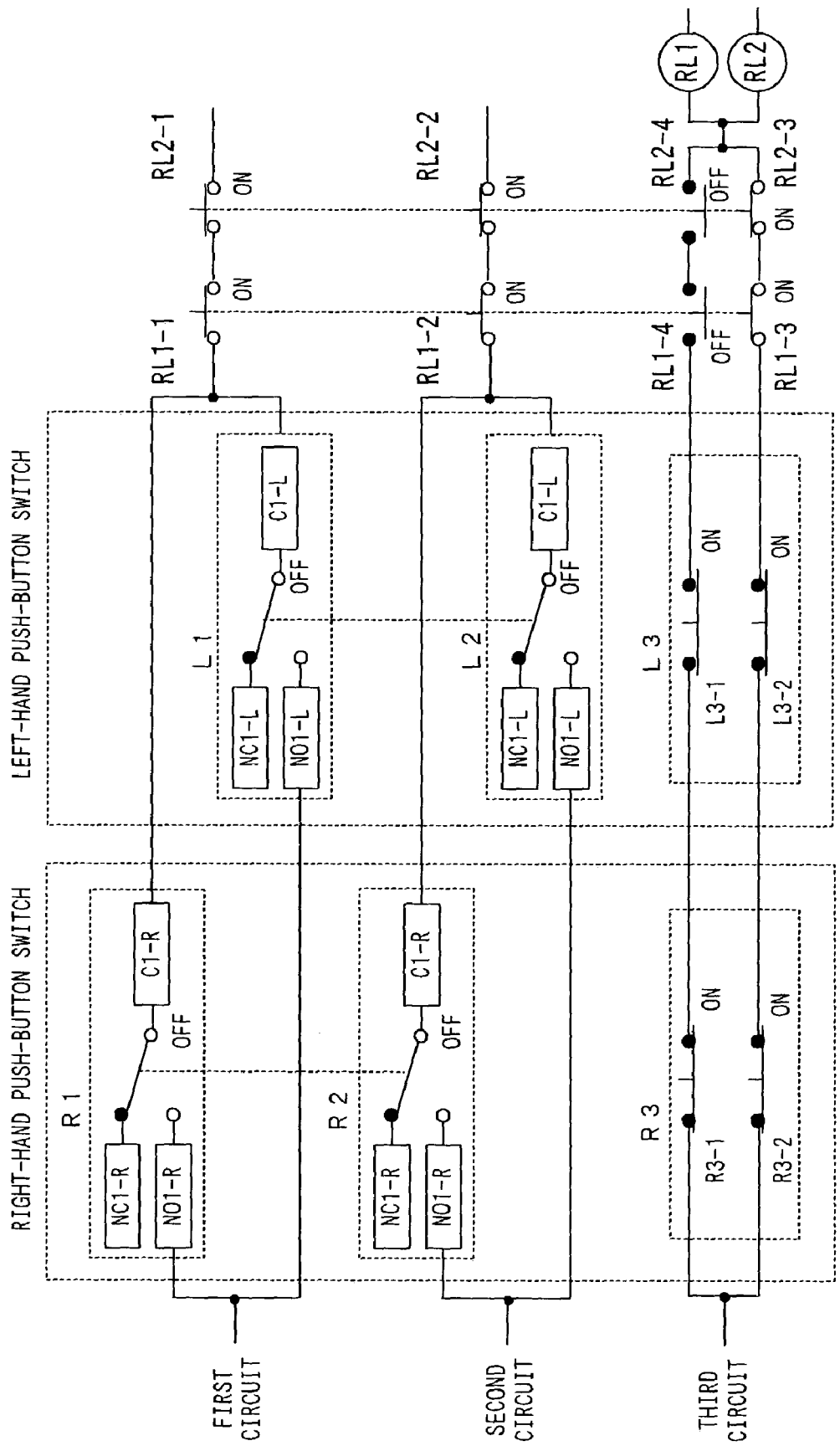
FIG. 20 is a circuit connection diagram illustrative of operations of a fourth embodiment of the present invention.

As shown in FIG. 20, a teaching pendant of this embodiment differs from that of the second embodiment in circuit connections of the push-button switch.

Specifically, the teaching pendant comprises three circuits including a first, a second and a third circuits, and a first relay RL1 and a second relay RL2 each including a first, a second and a third normally open contacts and a normally close contact.

In the first circuit, one R1 of c-contacts of a right-hand push-button switch is connected in parallel with one L1 of c-contacts of a left-hand push-button switch to form a first parallel circuit, which is connected in series with a first normally open contact RL1-1 of the first relay RL1 and a first normally open contact RL2-1 of the second relay RL2.

In the second circuit, the other c-contact R2 of the right-hand push-button switch is connected in parallel with the other c-contact L2 of the left-hand push-button switch to form a second parallel circuit, which is connected in series with a second normally open contact RL1-2 of the first relay RL1 and a second normally open contact RL2-2 of the second relay RL2.

The third circuit includes a first series circuit wherein a first normally close contact R3-1 of the right-hand push-button switch, a first normally close contact L3-1 of the left-hand push-button switch, a normally close contact RL1-4 of the first relay RL1, and a normally close contact RL2-4 of the second relay RL2 are connected in series, and a second series circuit wherein a second normally close contact R3-2 of the right-hand push-button switch, a second normally close contact L3-2 of the left-hand push-button switch, a third normally open contact RL1-3 of the first relay RL1, and a third normally open contact RL2-3 of the second relay RL2 are connected in series. The first series circuit and the second series circuit are connected in parallel. The first relay RL1 and the second relay RL2 in parallel connection are connected in series with the third circuit.

It is noted here that the third normally open contacts RL1-3, RL2-3 and the normally close contacts RL1-4, RL2-4 of the first and second relays RL1, RL2 are of a so-called forcefully guided relay configuration for simultaneous switch ON/OFF. For instance, whenever the third normally open contact RL1-3 of the first relay RL1 is switched ON, the normally close contact RL1-4 thereof is switched OFF.

In an initial state (where the push-button switches are undepressed), the first and second relays RL1, RL2 of the self-holding configuration are electrically energized so that the normally open contacts RL1-1 to RL1-3, RL2-1 to RL2-3 of the relays RL1, RL2 are ON while the normally close contacts RL1-4, RL2-4 are OFF. It is noted that the first relay RL1 and the second relay RL2 of this embodiment are equivalent to a tenth relay and an eleventh relay of the present invention.

Now referring to FIGS. 20 to 23, operations of the teaching pendant of this embodiment will be described.

Figure 21:
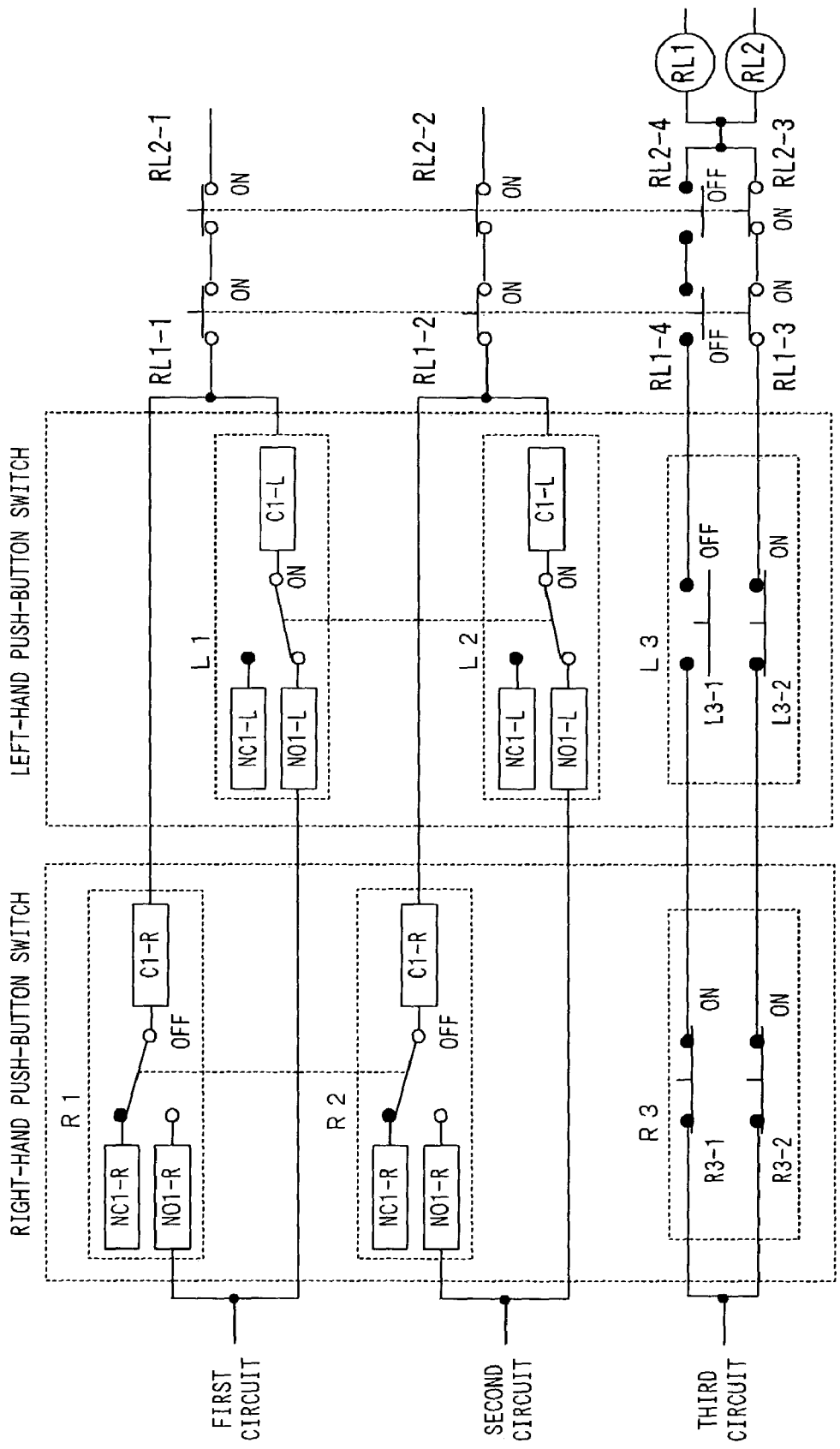
FIG. 21 is a circuit connection diagram illustrative of the operations of the fourth embodiment hereof.

When the left-hand push-button switch in the initial state (undepressed) shown in FIG. 20 is shifted to the ON state, the two c-contacts L1, L2 of the left-hand push-button switch are switched ON while the first normally close contact L3-1 thereof is switched OFF, as shown in FIG. 21. However, the first, second and third circuits are maintained in conduction because the first relay RL1 and the second relay RL2 of the self-holding configuration are electrically energized. Thus, the operator is allowed to perform the teaching operation to the industrial machine such as the industrial robot.

Figure 22:
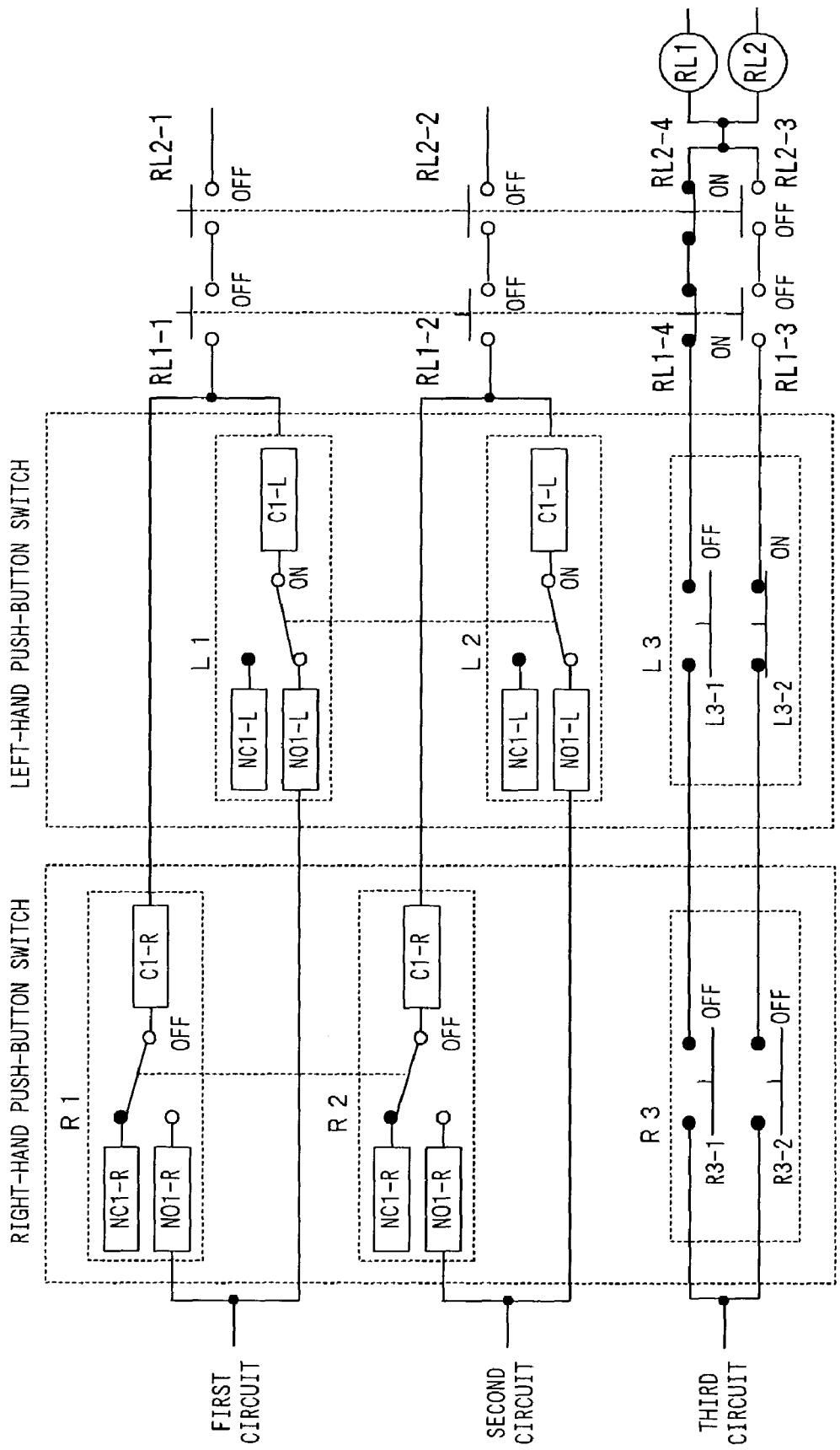
FIG. 22 is a circuit connection diagram illustrative of the operations of the fourth embodiment hereof.

If, in this state, the operator being aware of any potential danger shifts the right-hand push-button switch to the second OFF state, the third circuit is driven into cutoff because the first and second normally close contacts R3-1, R3-2 of the right-hand push-button switch in the third circuit are switched OFF, as shown in FIG. 22. Hence, the first relay RL1 and the second relay RL2 are electrically de-energized. Accordingly, the three normally open contacts RL1-1, RL1-2, RL1-3 of the first relay RL1 and the three normally open contacts RL2-1, RL2-2, RL2-3 of the second relay RL2 are switched OFF so that the first and second circuits are driven into cutoff. Thus, the teaching pendant 101 is disabled for teaching operation.

Figure 23:
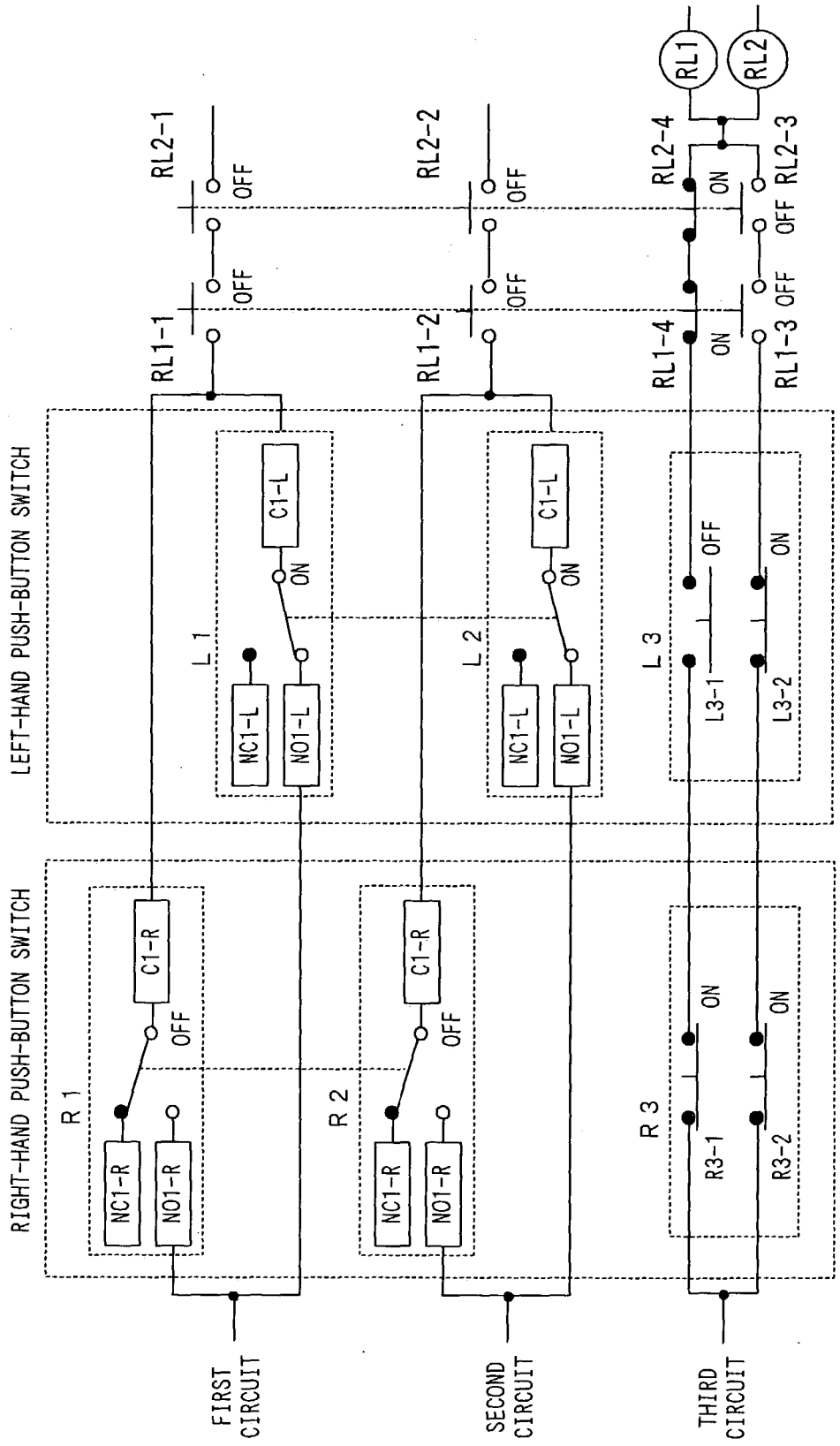
FIG. 23 is a circuit connection diagram illustrative of the operations of the fourth embodiment hereof.

In a case where, as shown in FIG. 23, the right-hand push-button switch is returned to the first OFF state by decreasing the pressure thereon while the left-hand push-button switch is maintained in the ON state, the first normally close contact R3-1 and the second normally close contact R3-2 of the right-hand push-button switch are sequentially switched ON, but the first normally close contact L3-1 of the left-hand push-button switch as well as the third normally open contact RL1-3 of the first relay RL1 and the third normally open contact RL2-3 of the second relay RL2 are OFF. Hence, the first and second relays RL1, RL2 stay electrically de-energized. As a result, the first and second circuits are maintained in the cutoff state so that the left-hand push-button switch in the ON state is disabled.

If, in this state, the left-hand push-button switch is returned to the first OFF state by decreasing the pressure thereon, the first, second and third circuits are brought into conduction, as shown in FIG. 20, wherein switching ON either of the push-button switches enables the teaching operation to the industrial machine such as the industrial robot.

According to the fourth embodiment described above, the same effect as the second embodiment can naturally be obtained and in addition, the following effect can also be attained.

Figure 24:
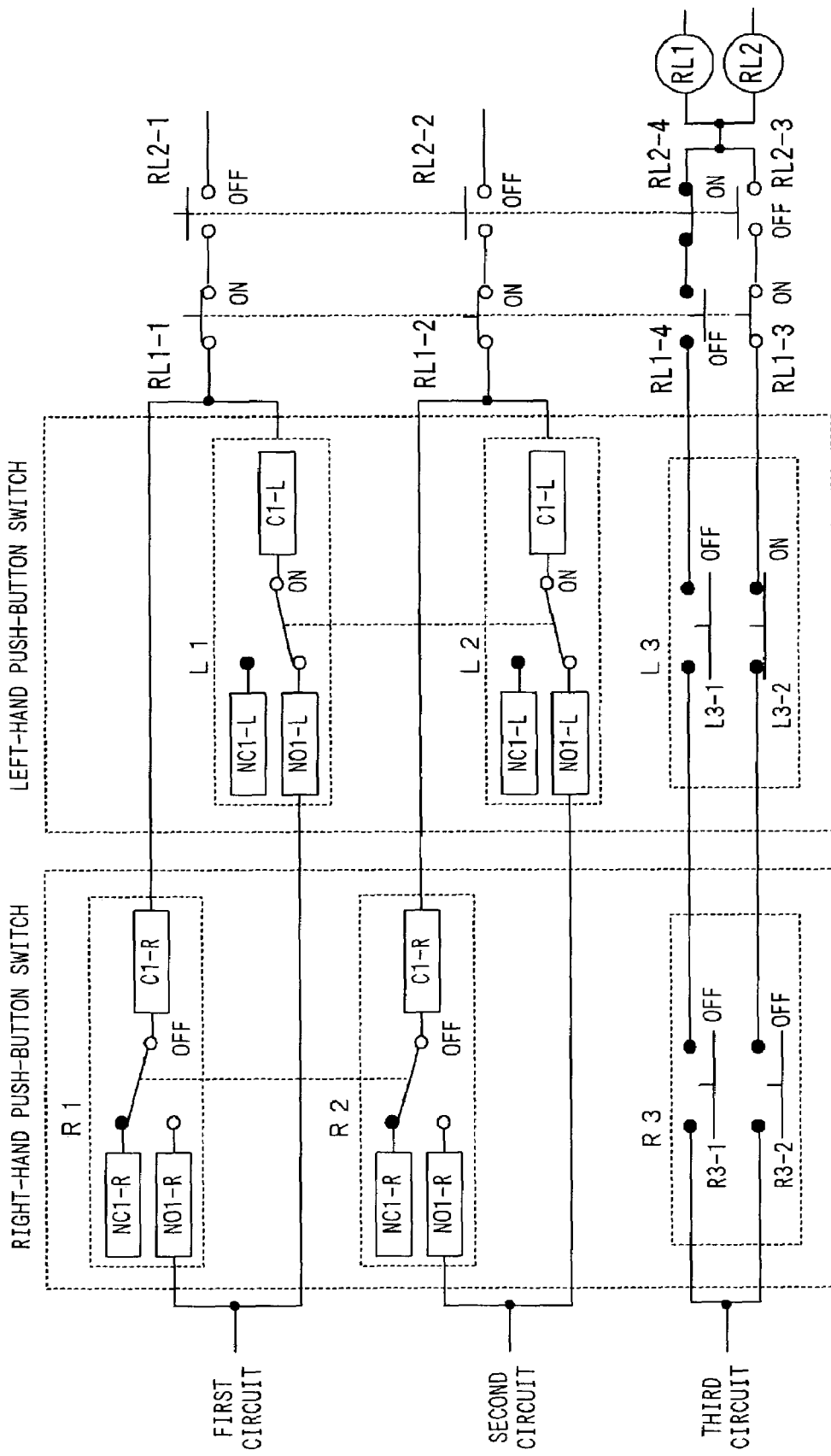
FIG. 24 is a circuit connection diagram illustrative of the operations of the fourth embodiment hereof.

In the event that the normally open contacts RL1-1 to RL1-3 and the normally close contact RL1-4 of the first relay RL1 are fused during the ON state of the left-hand push-button switch, for example, the normally close contacts RL1-1 to RL1-3 of the first relay RL1 stay in the ON state while the normally close contact RL1-4 thereof stay in the OFF state even though the first and second relays RL1, RL2 are electrically de-energized by shifting the right-hand push-button switch to the second OFF state, as shown in FIG. 24. At this time, however, the normally open contacts RL2-1 to RL2-3 of the second relay RL2 are OFF so that the first to third circuits are cut off. Accordingly, the left-hand push-button switch in the ON state is disabled even though the right-hand push-button switch in this state is returned to the first OFF state. Thus, the teaching pendant 101 is prevented from being enabled for teaching operation.

Figure 25:
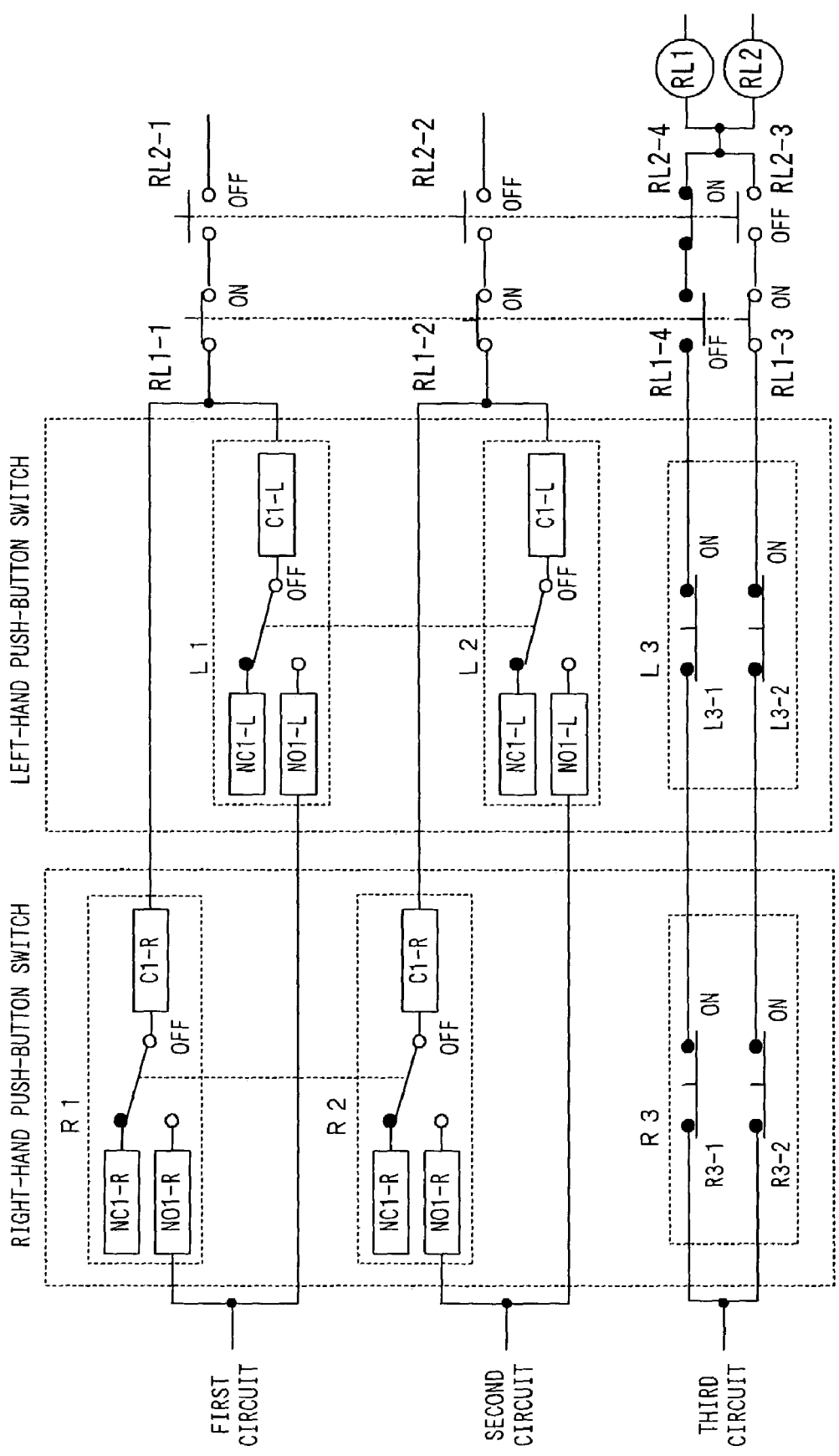
FIG. 25 is a circuit connection diagram illustrative of the operations of the fourth embodiment hereof.

If, in this state, both the left-hand and right-hand push-button switches are returned to the first OFF state, the first and the second series circuits of the third circuit are opened, as shown in FIG. 25. Hence, the first relay RL1 and the second relay RL2 cannot effect the self-holding function so that the third circuit stays in the cutoff state. Accordingly, even if either of the push-button switches in this state is pressed ON, the teaching pendant cannot be enabled for teaching operation because of the disconnected third circuit.

In the event of either one of the relays suffering any fused contact, the above arrangement prevents the teaching pendant from being enabled for teaching operation in spite of both the push-button switches returned to the first OFF state. Thus, this arrangement provides for an easy determination of any failed contacts, resulting in further enhanced safety of the teaching pendant.

Figure 26:
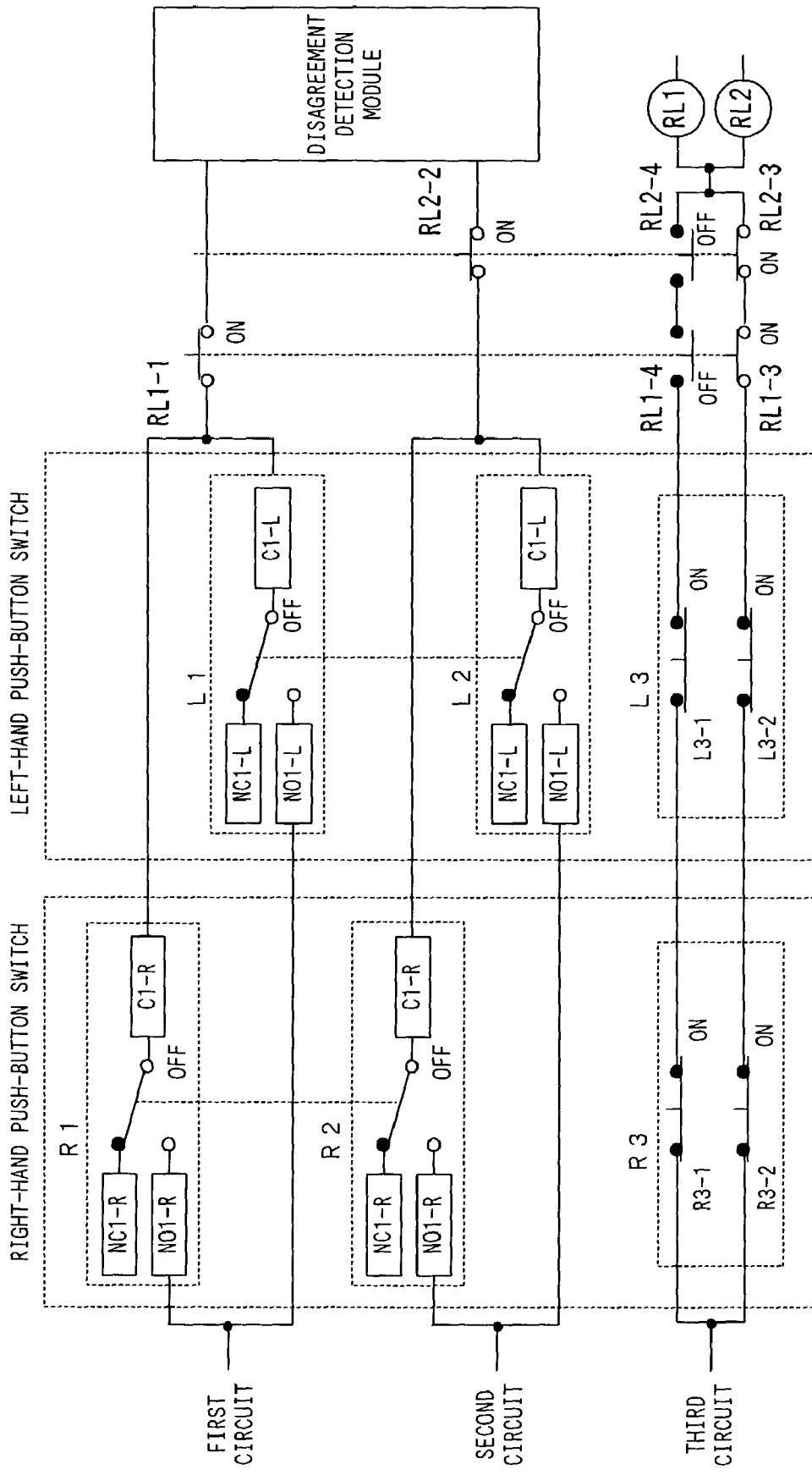
FIG. 26 is a diagram showing an exemplary modification of the circuit connections of the fourth embodiment hereof.

As shown in FIG. 26, an alternative arrangement may be made such that only one normally open contact is connected with the first circuit and the second circuit, respectively, whereas a disagreement detection module is provided for detecting disagreement between open/close positions of the first and second circuits. This arrangement can naturally obtain the same effect as the foregoing embodiments and besides, permits the first and second circuits to be monitored for easy detection of disagreement in the open/close positions, or in other words, the occurrence of any fused contact in either of the circuits. Furthermore, the normally open contacts of the relays are decreased.

(Fifth Embodiment)

A fifth embodiment of the present invention will be described with reference to FIG. 27, which is a diagram showing circuit connections between push-button switches of a teaching pendant and a safety relay module. In the figure, the same reference characters as those of the fourth embodiment described above represent identical or equivalent parts, respectively.

Since an essential configuration of the push-button switch of this embodiment is substantially the same as that of the fourth embodiment described above, the following description principally discusses differences from the fourth embodiment so as to obviate redundant descriptions.

Figure 27:
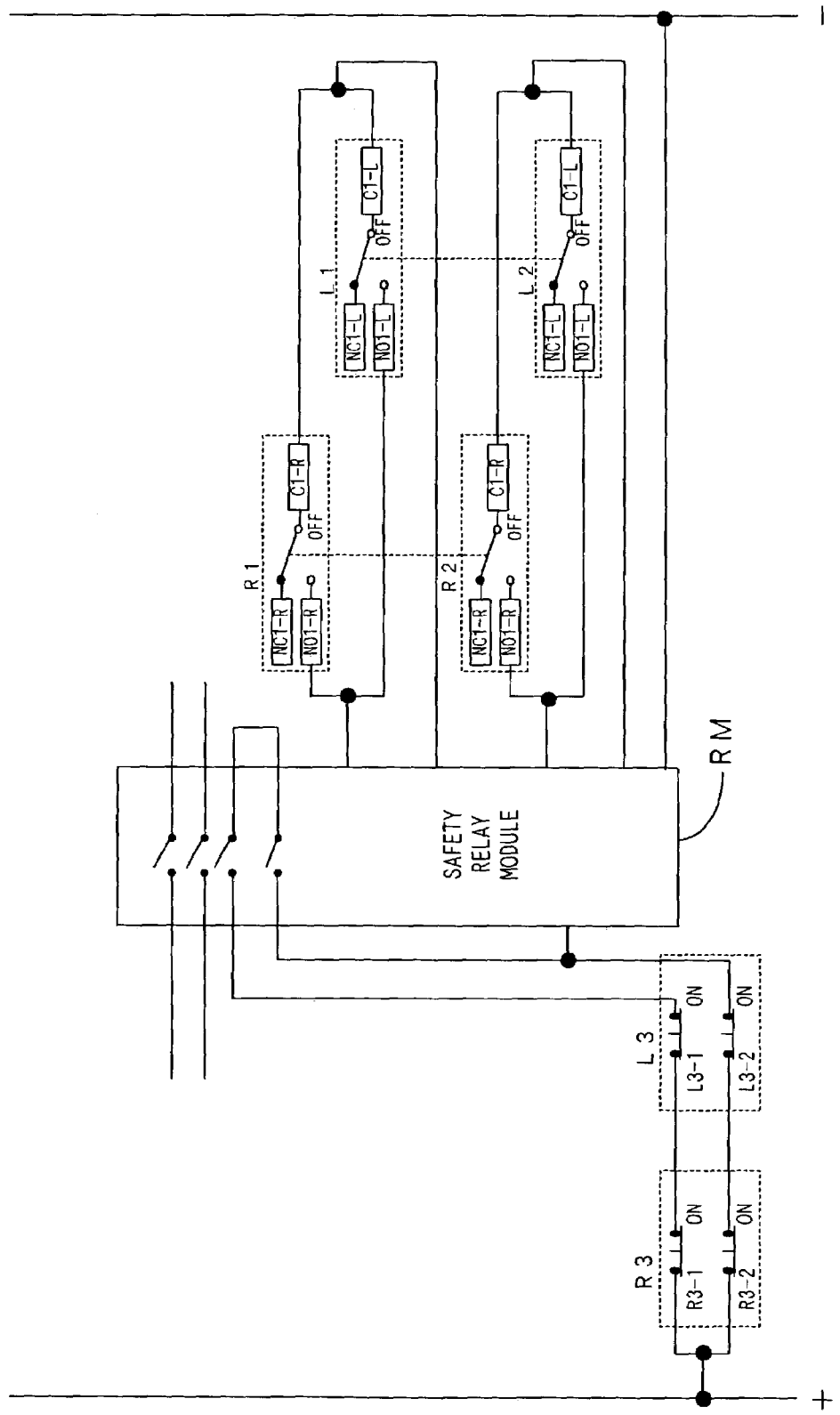
FIG. 27 is a diagram showing circuit connections according to a fifth embodiment of the present invention.

As shown in FIG. 27, this embodiment employs a safety relay module as means for controlling the enable state of the teaching pendant, the safety relay module comprising a relay box disposed externally of the teaching pendant. Specifically, the fourth embodiment described above has the arrangement wherein the teaching pendant contains therein the relay circuit for controlling the enable state thereof, whereas this embodiment does not contain therein the relay circuit but employs the external safety module.

As shown in FIG. 27, an enabler for the teaching pendant has an arrangement wherein both a first series circuit and a second series circuit are connected with a positive line (+) at respective one end thereof, and are connected with a safety relay module RM at the respective other end thereof. The first series circuit includes a first normally close contact R3-1 of a right-hand push-button switch and a first normally close contact L3-1 of a left-hand push-button switch connected in series. The second series circuit includes a second normally close contact R3-2 of the right-hand push-button switch and a second normally close contact L3-2 of the left-hand push-button switch connected in series.

Further, the safety relay module RM is connected with opposite ends of a first parallel circuit wherein one R1 of c-contacts of the right-hand push-button switch is connected in parallel with one L1 of c-contacts of the left-hand push-button switch, and with opposite ends of a second parallel circuit wherein the other c-contact R2 of the right-hand push-button switch is connected in parallel with the other c-contact L2 of the left-hand push-button switch. Incidentally, the safety relay module RM is connected to a negative line (−).

The safety relay module RM contains therein a relay circuit having substantially the same forcefully guided relay and relay contacts as those of the fourth embodiment described above. For example, the safety relay module is normally used for checking safety operations of a teaching pendant or emergency switch, or for checking operations of other circuits.

Using the known safety relay module RM, this embodiment can naturally achieve the equal effect to that of the fourth embodiment described above. In addition, this embodiment provides simplified circuit connections in the teaching pendant, facilitating maintenance work for the teaching pendant.

(Sixth Embodiment)

A sixth embodiment of the present invention will be described with reference to FIG. 28, which is a diagram showing circuit connections of a teaching pendant. In the figure, the same reference characters as those of the first embodiment described above represent identical or equivalent parts, respectively.

Since an essential configuration of a push-button switch of this embodiment is substantially the same as that of the first embodiment, the following description principally discusses differences from the first embodiment so as to obviate redundant descriptions.

Figure 28:
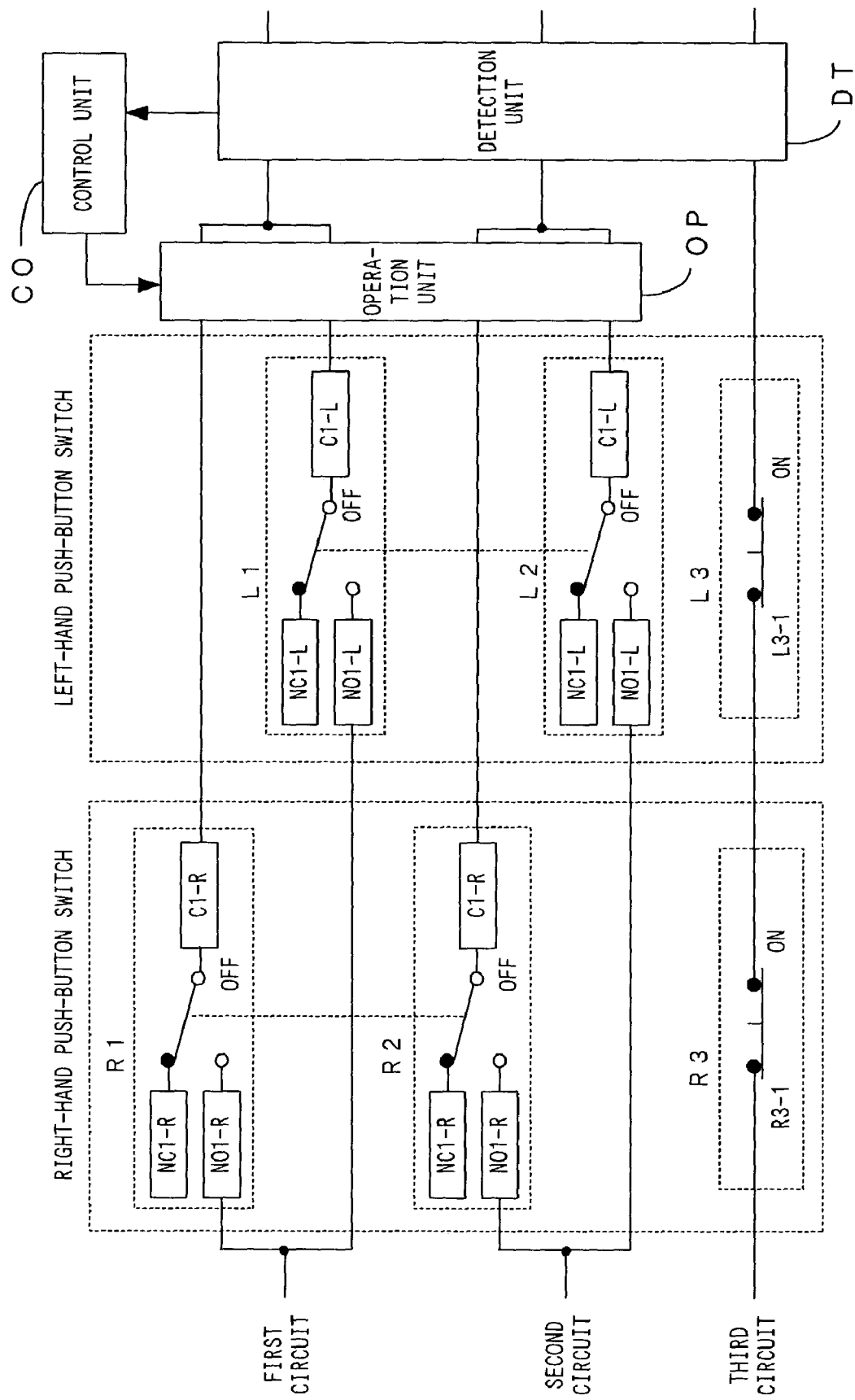
FIG. 28 is a diagram showing circuit connections according to a sixth embodiment of the present invention.

As shown in FIG. 28, the teaching pendant has substantially the same configuration as that of the first embodiment that includes the first, second and third circuits, which are controlled by a detection unit DT, a control unit CO and an operation unit OP which each comprise electronic circuits.

In the first circuit, one R1 of c-contacts of a right-hand push-button switch is connected in parallel with one L1 of c-contacts of a left-hand push-button switch to form a first parallel circuit. In the second circuit, the other c-contact R2 of the right-hand push-button switch is connected in parallel with the other c-contact L2 of the left-hand push-button switch to form a second parallel circuit. In the third circuit, a normally close contact R3 of the right-hand push-button switch is connected in series with a normally close contact L3 of the left-hand push-button switch.

Circuit connections of the first and second parallel circuits are provided with the operation unit OP for operatively opening or closing these circuits. The first, second and third circuits are connected in series with the detection unit DT for detecting the open or close states of these circuits.

The open or close states of the first to third circuits so detected by the detection unit DT are inputted to the control unit CO which, in turn, controls the operation unit OP for effecting the similar control provided by the relay circuit of the first embodiment described above.

The operation unit OP may employ a switching element such as a bipolar transistor or a unipolar transistor like a field-effect transistor.

Thus as with the first embodiment, the sixth embodiment ensures that once either one of the push-button switches is manually shifted to the second OFF state, the teaching pendant cannot be enabled for teaching operation despite the ON state of the other push-button switch before both the push-button switches are returned to the first OFF state.

In addition, the enabler comprises the electronic circuits which, unlike the relay circuit, are free from the fear of contacts becoming fused. Thus, the embodiment provides a unique effect to ensure positive operations.

(Seventh Embodiment)

A seventh embodiment of the present invention will be described with reference to FIG. 29, which is a diagram showing circuit connections of a teaching pendant. In the figure, the same reference characters as those of the second embodiment described above represent identical or equivalent parts, respectively.

In this embodiment, an essential configuration of a push-button switch is substantially the same as that of the second embodiment and hence, the following description principally discusses differences from the second embodiment so as to obviate redundant descriptions.

Figure 29:
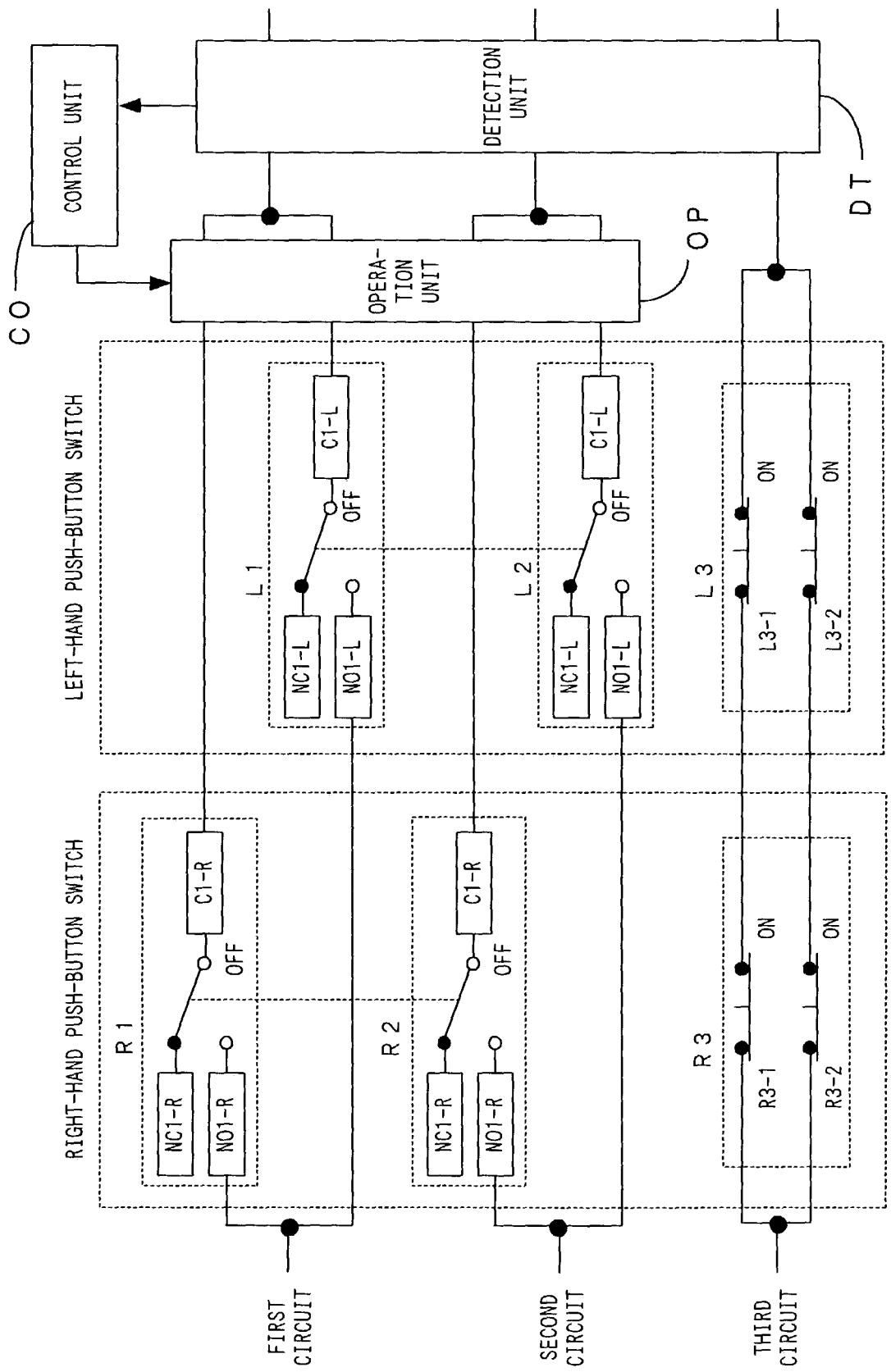
FIG. 29 is a diagram showing circuit connections according to a seventh embodiment of the present invention.
Figure 30:
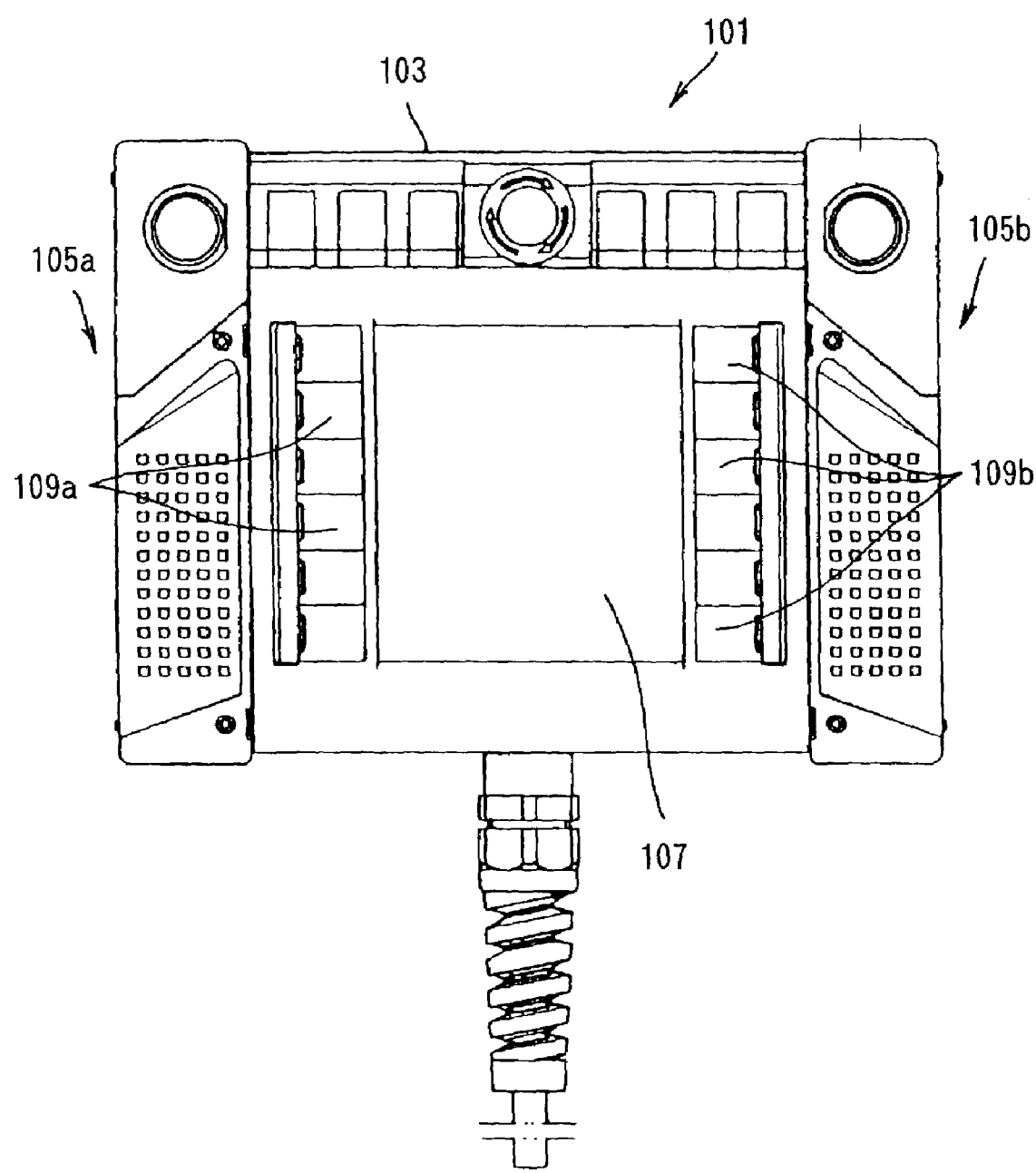
FIG. 30 is a front elevation showing a conventional teaching pendant.
Figure 31:
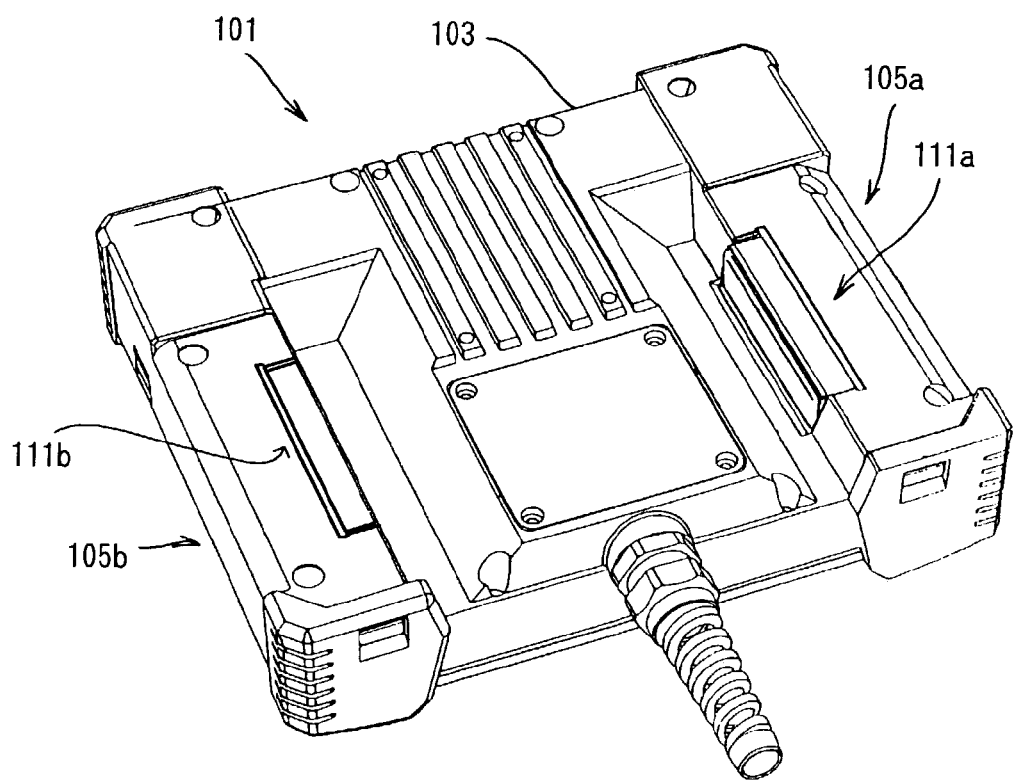
FIG. 31 is a perspective view of the conventional teaching pendant as seen from the rear side thereof.

As shown in FIG. 29, the teaching pendant has substantially the same configuration as that of the second embodiment that includes the first, second and third circuits, which are controlled by a detection unit DT, a control unit CO and an operation unit OP which each comprise electronic circuits.

In the first circuit, one R1 of c-contacts of a right-hand push-button switch is connected in parallel with one L1 of c-contacts of a left-hand push-button switch to form a first parallel circuit. In the second circuit, the other c-contact R2 of the right-hand push-button switch is connected in parallel with the other c-contact L2 of the left-hand push-button switch to form a second parallel circuit. In the third circuit, a first series circuit and a second series circuit are connected in parallel, the first series circuit wherein a first normally close contact R3-1 of the right-hand push-button switch is connected in series with a first normally close contact L3-1 of the left-hand push-button switch, the second series circuit wherein a second normally close contact R3-2 of the right-hand push-button switch is connected in series with a second normally close contact L3-2 of the left-hand push-button switch.

Circuit connections of the first and second parallel circuits are provided with the operation unit OP for operatively opening or closing these circuits. The first, second and third circuits are connected in series with the detection unit DT for detecting the open or close states of these circuits.

The open or close states of the first to third circuits so detected by the detection unit DT are inputted to the control unit CO which, in turn, controls the operation unit OP for effecting the similar control provided by the relay circuit of the second embodiment (and the third and fourth embodiments).

Similarly to the sixth embodiment, the operation unit OP may preferably employ a switching element such as a bipolar transistor or a unipolar transistor like a field-effect transistor.

Thus as with the second embodiment, the seventh embodiment ensures that once either one of the push-button switches is manually shifted to the second OFF state, the teaching pendant cannot be enabled for teaching operation despite the ON state of the other push-button switch before both the push-button switches are returned to the first OFF state.

In this case as well, the enabler comprises the electronic circuits which, unlike the relay circuit, are free from the fear of contacts becoming fused. Thus, the embodiment provides a unique effect to ensure positive operations.

Although the foregoing embodiments employ the push-button switches of the snap action configuration, a push-button switch of a so-called slow action configuration may be used. A specific applicable configuration of the primary contact of the slow-action type switch may be exemplified by a configuration shown in FIG. 38 accompanying a description of Japanese Patent Application No. 2000-232229 filed by the present applicant.

The foregoing embodiments illustrate the double-safety configuration based on the two parallel circuits as the safety measure. However, the provision of a single parallel circuit may serve the principle of operation of the present invention.

In addition, modification may properly be made to each of the foregoing embodiments such that the normally close contact of the relay is replaced by the normally open contact or vise versa as required to obtain an equivalent operation or working effect to that of each of the foregoing embodiments.

It is to be understood that the present invention is not limited to the foregoing embodiments and various other changes and modifications may be made thereto within the scope of the present invention.

INDUSTRIAL APPLICABILITY

As mentioned supra, the enabler for teaching pendant according to the present invention ensures that once either one of the push-button switches is shifted to the second OFF state, the inhibition means inhibits the enable state despite the ON state of the other push-button switch until both the push-button switches are shifted to the first OFF state. Thus, the safety during operations can be enhanced.

Furthermore, the enabler for teaching pendant according to the present invention is arranged such that after the detection unit has determined both the parallel circuit and the series circuit to be opened, the retention unit holds the parallel circuit in the open state until the series circuit is closed with the parallel circuit opened. Accordingly, in a case, for example, where the left-hand push-button switch is in the ON state or the parallel circuit is closed, despite the right-hand push-button switch shifted to the second OFF state where the parallel circuit and the series circuit are opened, the enable state is never established before both of the push-button switches are released. Thus, the teaching pendant can be enhanced in safety feature.

In addition, the enabler for teaching pendant according to the present invention ensures that once either one of the push-button switches is shifted to the second OFF state, the enable state cannot be established despite the ON state of the other push-button switch before both the push-button switches are returned to the first OFF state. Thus, the teaching pendant can be enhanced in safety feature.

In a case where the right-hand push-button switch is ON, for example, the second relay is electrically de-energized to open the normally close contact thereof, so that the relay contact circuit is opened. If, at this time, the left-hand push-button switch is shifted to the second OFF state, the auxiliary contact of the left-hand push-button switch is opened.

Therefore, before both the right-hand and the left-hand push-button switches are returned to the first OFF state, the third relay is not electrically de-energized while the first and second circuits are cut off. Thus, once either one of the push-button switches is shifted to the second OFF state, the enable state cannot be established despite the ON state of the other push-button switch, before both the push-button switches are returned to the first OFF state. Thus, the teaching pendant can be enhanced in safety feature.

The invention claimed is:

1. An enabler for teaching pendant comprising a push-button switch capable of being shifted from a first OFF state (undepressed) to an ON state and then to a second OFF state as operatively associated with push-button depressions and of establishing an enable state when assuming said ON state, the enable state where a predetermined operation of an industrial machine is permitted;

wherein said push-button switch comprises a switch case; a push button depressibly supported by said case; at least one primary contact including a stationary terminal disposed in said case, and a movable terminal shifted from an away position to a contact position and then to the away position relative to said stationary terminal as operatively associated with pressing-down on said push button; and at least one auxiliary contact disposed in said case and designed to be closed when said primary contact is in said first OFF state and to be opened when said primary contact is in said second OFF state;

wherein a left-hand operation section to be gripped by the left hand and a right-hand operation section to be gripped by the right hand are provided at a pendant body;

wherein said push-button switches for left hand and for right hand are disposed at individual inside portions of said both operation sections in order to be manipulated by gripping;

wherein said left-hand push-button switch and said right-hand push-button switch are electrically connected in a manner that the enable state is established by switching ON at least either one of said left-hand push-button switch and said right-hand push-button switch; and wherein inhibition means is provided for inhibiting the enable state for a period of time between when at least either one of said left-hand push-button switch and said right-hand push-button switch is shifted to said second OFF state and when both said left-hand push-button switch and said right-hand push-button switch are returned to said first OFF state.

2. The enabler for teaching pendant as claimed in claim 1, wherein said at least one primary contact of said left-hand push-button switch is connected in parallel with said at least one primary contact of said right-hand push-button switch to form a parallel circuit;

wherein said auxiliary contact of said left-hand push-button switch is connected in series with said auxiliary contact of said right-hand push-button switch to form a series circuit; and wherein said inhibition means comprises:

a detection unit for detecting an open or close state of said parallel circuit and an open or close state of said series circuit; and a retention unit for retaining said parallel circuit in the open state for a period of time between when said detection unit detects the open state of said parallel circuit and the open state of said series circuit, and when said detection unit detects the open state of said parallel circuit and the close state of said series circuit.

3. The enabler for teaching pendant as claimed in claim 1, wherein said left-hand and right-hand push-button switches include two of said primary contacts, respectively;

wherein one of said primary contacts of said left-hand push-button switch is connected in parallel with one of said primary contacts of said right-hand push-button switch to form a first parallel circuit;

wherein the other of said primary contacts of said left-hand push-button switch is connected in parallel with the other of said primary contacts of said right-hand push-button switch to form a second parallel circuit;

wherein said auxiliary contact of said left-hand push-button switch is connected in series with said auxiliary contact of said right-hand push-button switch to form a series circuit; and wherein said inhibition means comprises:

a first relay, a coil of which is electrically energized by switching ON said primary contact of said left-hand push-button switch in said first or second parallel circuit;

a second relay, a coil of which is electrically energized by switching ON said primary contact of said right-hand push-button switch in said first or second parallel circuit;

a relay contact circuit having a respective normally close contact of said first and second relays connected in series, and connected in parallel with said series circuit;

a third relay, a coil of which is electrically energized by switching ON said both normally close contacts in said relay contact circuit;

a first normally open contact of said third relay connected in series with said series circuit;

a second normally open contact of said third relay connected in series with said primary contact of said left-hand push-button switch in said first or second parallel circuit, thus serving to conduct the coil of said first relay;

a third normally open contact of said third relay connected in series with said primary contact of said right-hand push-button switch in said first or second parallel circuit, thus serving to conduct the coil of said second relay; and a fourth normally open contact of said third relay connected in series with said second or first parallel circuit, not serving to conduct the coil of said first nor second relay.

4. The enabler for teaching pendant as claimed in claim 2, wherein said left-hand and right-hand push-button switches include two of said primary contacts, respectively;

wherein one of said primary contacts of said left-hand push-button switch is connected in parallel with one of said primary contacts of said right-hand push-button switch to form-a first parallel circuit;

wherein the other of said primary contacts of said left-hand push-button switch is connected in parallel with the other of said primary contacts of said right-hand push-button switch to form a second parallel circuit;

wherein said detection unit comprises:

a first relay, a coil of which is electrically energized by switching ON said primary contact of said left-hand push-button switch in said first or second parallel circuit;

a second relay, a coil of which is electrically energized by switching ON said primary contact of said right-hand push-button switch in said first or second parallel circuit;

a relay contact circuit having a respective normally close contact of said first and second relays connected in series, and connected in parallel with said series circuit;

a third relay, a coil of which is electrically energized by switching ON said both normally close contacts in said relay contact circuit; and a first normally open contact of said third relay connected in series with said series circuit; and wherein said retention unit comprises:

a second normally open contact of said third relay connected in series with said primary contact of said left-hand push-button switch in said first or second parallel circuit, thus serving to conduct the coil of said first relay;

a third normally open contact of said third relay connected in series with said primary contact of said right-hand push-button switch in said first or second parallel circuit, thus serving to conduct the coil of said second relay; and a fourth normally open contact of said third relay connected in series with said second or first parallel circuit, not serving to conduct the coil of said first nor second relay.

5. The enabler for teaching pendant as claimed in claim 1, wherein said both push-button switches each comprise, as said auxiliary contact, a first auxiliary contact which is closed when said both primary contacts are in said first OFF state and which is opened in said ON state and in said second OFF state, and a second auxiliary contact which is closed when said both primary contacts are in said first OFF state and in said ON state and which is opened in said second OFF state;

wherein said at least one primary contact of said left-hand push-button switch is connected in parallel with said at least one primary contact of said right-hand push-button switch to form a parallel circuit;

wherein said first auxiliary contact of said left-hand push-button switch is connected in series with said first auxiliary contact of said right-hand push-button switch to form a first series circuit;

wherein said second auxiliary contact of said left-hand push-button switch is connected in series with said second auxiliary contact of said right-hand push-button switch to form a second series circuit; and wherein said inhibition means comprises:

a detection unit for detecting an open or close state of said parallel circuit and an open or close state of said first or second series circuit; and a retention unit for retaining said parallel circuit in the open state for a period of time between when said detection unit detects the open state of said parallel circuit and the open state of said second series circuit, and when said detection unit detects the open state of said parallel circuit and the close state of said first series circuit.

6. The enabler for teaching pendant as claimed in claim 1, wherein said both push-button switches each comprise, as said auxiliary contact, a first auxiliary contact which is closed when said both primary contacts are in said first OFF state and which is opened in said ON state and in said second OFF state, and a second auxiliary contact which is closed when said both primary contacts are in said first OFF state and in said ON state and which is opened in said second OFF state, wherein said at least one primary contact of said left-hand push-button switch is connected in parallel with said at least one primary contact of said right-hand push-button switch to form a parallel circuit;

wherein said first auxiliary contact of said left-hand push-button switch is connected in series with said first auxiliary contact of said right-hand push-button switch to form a first series circuit;

wherein said second auxiliary contact of said left-hand push-button switch is connected in series with said second auxiliary contact of said right-hand push-button switch to form a second series circuit which is connected in parallel with said first series circuit, and wherein said inhibition means comprises:

a fourth relay, a coil of which is electrically energized by switching ON said both auxiliary contacts in said first series circuit;

a first normally open contact of said fourth relay connected in series with said second series circuit; and a second normally open contact of said fourth relay connected in series with said parallel circuit.

7. The enabler for teaching pendant as claimed in claim 1, wherein said both push-button switches each comprise, as said auxiliary contact, a first auxiliary contact which is closed when said both primary contacts are in said first OFF state and which is opened in said ON state and in said second OFF state, and a second auxiliary contact which is closed when said both primary contacts are in said first OFF state and in said ON state and which is opened in said second OFF state;

wherein said at least one primary contact of said left-hand push-button switch is connected in parallel with said at least one primary contact of said right-hand push-button switch to form a parallel circuit;

wherein said first auxiliary contact of said left-hand push-button switch is connected in series with said first auxiliary contact of said right-hand push-button switch to form a first series circuit;

wherein said second auxiliary contact of said left-hand push-button switch is connected in series with said second auxiliary contact of said right-hand push-button switch to form a second series circuit which is connected in parallel with said first series circuit;

wherein said inhibition means comprises:

a fifth relay, a coil of which is electrically energized by switching ON said both auxiliary contacts in said first series circuit; and a normally open contact of said fifth relay connected in series with said second series circuit, and wherein said parallel circuit is connected in series with said first series circuit.

8. The enabler for teaching pendant as claimed in claim 1, wherein said both push-button switches each comprise, as said auxiliary contact, a first auxiliary contact which is closed when said both primary contacts are in said first OFF state and which is opened in said ON state and in said second OFF state, and a second auxiliary contact which is closed when said both primary contacts are in said first OFF state and in said ON state and which is opened in said second OFF state;

wherein said at least one primary contact of said left-hand push-button switch is connected in parallel with said at least one primary contact of said right-hand push-button switch to form a parallel circuit;

wherein said first auxiliary contact of said left-hand push-button switch is connected in series with said first auxiliary contact of said right-hand push-button switch to form a first series circuit;

wherein said second auxiliary contact of said left-hand push-button switch is connected in series with the second auxiliary contact of said right-hand push-button switch to form a second series circuit;

wherein said inhibition means comprises a sixth relay including a normally open contact and a c-contact, and a seventh relay including a normally open contact and a c-contact;

wherein said normally open contact of said sixth relay and said normally open contact of said seventh relay are connected in series with said parallel circuit;

wherein a normally close terminal of said c-contact of said sixth relay and a normally close terminal of said c-contact of said seventh relay are connected to opposite ends of said first series circuit; and wherein a normally open terminal of said c-contact of said sixth relay and a normally open terminal of said c-contact of said seventh relay are connected to opposite ends of said second series circuit.

9. The enabler for teaching pendant as claimed in claim 1, wherein said left-hand and said right-hand push-button switches include two of said primary contacts, respectively;

wherein said both push-button switches each comprise, as said auxiliary contact, a first auxiliary contact which is closed when said both primary contacts are in said first OFF state and which is opened in said ON state and in said second OFF state, and a second auxiliary contact which is closed when said both primary contacts are in said first OFF state and in said ON state and which is opened in said second OFF state;

wherein one of said primary contacts of said left-hand push-button switch is connected in parallel with one of said primary contacts of said right-hand push-button switch to form a first parallel circuit;

wherein the other of said primary contacts of said left-hand push-button switch is connected in parallel with the other of said primary contacts of said right-hand push-button switch to form a second parallel circuit;

wherein said first auxiliary contact of said left-hand push-button switch is connected in series with said first auxiliary contact of said right-hand push-button switch to form a first series circuit;

wherein said second auxiliary contact of said left-hand push-button switch is connected in series with said second auxiliary contact of said right-hand push-button switch to form a second series circuit;

wherein said inhibition means comprises an eighth relay including a normally open contact and a c-contact, and a ninth relay including a normally open contact and a c-contact;

wherein either one of said normally open contact of said eighth relay and said normally open contact of said ninth relay is connected in series with said first parallel circuit;

wherein the remaining normally open contact of said eighth or ninth relay is connected in series with said second parallel circuit;

wherein a normally close terminal of said c-contact of said eighth relay and a normally close terminal of said c-contact of said ninth relay are connected to opposite ends of said first series circuit; and wherein a normally open terminal of said c-contact of said eighth relay and a normally open terminal of said c-contact of said ninth relay are connected to opposite ends of said second series circuit.

10. The enabler for teaching pendant as claimed in claim 1, wherein said both push-button switches each comprise, as said auxiliary contact, a first auxiliary contact which is closed when said both primary contacts are in said first OFF state and which is opened in said ON state and in said second OFF state, and a second auxiliary contact which is closed when said both primary contacts are in said first OFF state and in said ON state and which is opened in said second OFF state;

wherein said at least one primary contact of said left-hand push-button switch is connected in parallel with said at least one primary contact of said right-hand push-button switch to form a parallel circuit;

wherein said first auxiliary contact of said left-hand push-button switch is connected in series with said first auxiliary contact of said right-hand push-button switch to form a first series circuit;

wherein said second auxiliary contact of said left-hand push-button switch is connected in series with said second auxiliary contact of said right-hand push-button switch to form a second series circuit;

wherein said inhibition means comprises a tenth relay including a first and a second normally open contact and a normally close contact, said second normally open contact and said normally close contact of which are simultaneously switched, and an eleventh relay including a first and a second normally open contact and a normally close contact, said second normally open contact and said normally close contact of which are simultaneously switched;

wherein said first normally open contact of said tenth relay and said first normally open contact of said eleventh relay are connected in series with said parallel circuit;

wherein said normally close contact of said tenth relay and said normally close contact of said eleventh relay are connected in series with said first series circuit; and wherein said second normally open contact of said tenth relay and said second normally open contact of said eleventh relay are connected in series with said second series circuit.

11. The enabler for teaching pendant as claimed in claim 1, wherein said left-hand and said right-hand push-button switches include two of said primary contacts, respectively;

wherein said both push-button switches each comprise, as said auxiliary contact, a first auxiliary contact which is closed when said both primary contacts are in said first OFF state and which is opened in said ON state and in said second OFF state, and a second auxiliary contact which is closed when said both primary contacts are in said first OFF state and in said ON state and which is opened in said second OFF state;

wherein one of said primary contacts of said left-hand push-button switch is connected in parallel with one of said primary contacts of said right-hand push-button switch to form a first parallel circuit;

wherein the other of said primary contacts of said left-hand push-button switch is connected in parallel with the other of said primary contacts of said right-hand push-button switch to form a second parallel circuit;

wherein said first auxiliary contact of said left-hand push-button switch is connected in series with said first auxiliary contact of said right-hand push-button switch to form a first series circuit;

wherein said second auxiliary contact of said left-hand push-button switch is connected in series with said second auxiliary contact of said right-hand push-button switch to form a second series circuit;

wherein said inhibition means comprises a twelfth relay including a first and a second normally open contact and a normally close contact, said second normally open contact and said normally close contact of which are simultaneously switched, and a thirteenth relay including a first and a second normally open contact and a normally close contact, said second normally open contact and said normally close contact of which are simultaneously switched;

wherein either one of said first normally open contact of said twelfth relay and said first normally open contact of said thirteenth relay is connected in series with said first parallel circuit;

wherein the remaining first normally open contact of said twelfth or thirteenth relay is connected in series with said second parallel circuit;

wherein said normally close contact of said twelfth relay and said normally close contact of said thirteenth relay are connected in series with said first series circuit; and wherein said second normally open contact of said twelfth relay and said second normally open contact of said thirteenth relay are connected in series with said second series circuit.

12. The enabler for teaching pendant as claimed in any one of claims 3, 4 and 6 to 11, wherein said relays are disposed on a circuit substrate in said pendant body.

13. The enabler for teaching pendant as claimed in claim 2 or 5, wherein said detection unit is disposed on a circuit substrate in said pendant body.

14. The enabler for teaching pendant as claimed in any one of claims 3, 4 and 6 to 11, wherein said relays are disposed in said switch case of said left-hand or right-hand push-button switch.

15. The enabler for teaching pendant as claimed in claim 2 or 5, wherein said detection unit is disposed in said switch case of said left-hand or right-hand push-button switch.

16. The enabler for teaching pendant as claimed in any one of claims 3, 4 and 6 to 11, wherein said relays are disposed in a relay box provided externally of said pendant body.

17. The enabler for teaching pendant as claimed in claim 2 or 5, wherein said detection unit is disposed in a relay box provided externally of said pendant body.

* * * * *